United States Patent [19]
Hirai

[11] Patent Number: 5,914,876
[45] Date of Patent: Jun. 22, 1999

[54] NUMERICAL CONTROLLER HAVING EXPANDED CONTROL WORD SET

[75] Inventor: Hayao Hirai, Aichi, Japan

[73] Assignee: Mitsubishi Denki Kabushiki Kaisha, Tokyo, Japan

[21] Appl. No.: 08/659,234

[22] Filed: Jun. 5, 1996

Related U.S. Application Data

[63] Continuation of application No. 08/037,526, Mar. 22, 1993, which is a continuation of application No. 07/542,609, Jun. 25, 1990.

[30] Foreign Application Priority Data

Jun. 23, 1989 [JP] Japan .................................. 1-159611

[51] Int. Cl.⁶ .................................................. G06F 19/00
[52] U.S. Cl. ........................... 364/192; 364/474.23
[58] Field of Search ................................ 364/191, 192, 364/193, 474.22, 474.23, 474.25, 474.27, 474.28, 474.29; 318/568.1, 567

[56] References Cited

U.S. PATENT DOCUMENTS

| | | | |
|---|---|---|---|
| 4,510,565 | 4/1985 | Dummermuth | 364/147 X |
| 4,513,379 | 4/1985 | Wilson et al. | 364/474.23 |
| 4,587,608 | 5/1986 | Kishi et al. | 364/474.23 |
| 4,591,968 | 5/1986 | Nozawa et al. | 364/474.23 |
| 4,606,001 | 8/1986 | Rieben et al. | 364/474.25 |
| 4,692,872 | 9/1987 | Kiya | 364/474.23 |
| 4,862,380 | 8/1989 | Kawamura et al. | 364/474.11 |
| 4,870,595 | 9/1989 | Otsuki | 364/474.23 |
| 4,888,534 | 12/1989 | Kuchiki | 364/474.23 |
| 4,890,234 | 12/1989 | Tanaka et al. | 364/474.23 |
| 4,914,364 | 4/1990 | Hirai | 364/474.29 X |
| 5,005,135 | 4/1991 | Morser et al. | 364/474.35 |

FOREIGN PATENT DOCUMENTS

| | | |
|---|---|---|
| 0091774A1 | 10/1983 | European Pat. Off. . |
| 59-157712 | 9/1984 | Japan . |

*Primary Examiner*—Paul P. Gordon
*Attorney, Agent, or Firm*—Sughrue, Mion, Zinn Macpeak & Seas, PLLC

[57] ABSTRACT

In a numerically controlled system including one or more multiple axis, multiple function controlled machines, of the type wherein control is exercised through the use of a processing program including a plurality of control words for respectively controlling functions of one or more machines, the improvement of the invention resides in the use of an expanded set of the control words created by adding one or more subwords to the conventional control words control words, at least a portion of the subwords being specific to a control group within which the control word will be effective or an axis or plane in which the control word will operate. An interpreter for the expanded control words is provided for expanding a processing program containing expanded control words into a plurality of control programs, at least a portion of which are specific to ones of the control groups. According to the invention, each axis of each of one or more machines, and each function to be performed by each of one or more machines, may be uniquely specified through the use of one or more of the control words in combination with one or more of the subwords.

5 Claims, 66 Drawing Sheets

FIGURE 2(A)

SYSTEM CONTROL SELECTION PARAMETER TABLE (1/2) INPUT SAMPLE

| GROUP<br>CHARACTER | 0 GROUP<br>GROUP WORD<br>COMMON WORD | 1ST GROUP<br>A | 2ND GROUP<br>B | 3RD GROUP<br>C | 4TH GROUP | 5TH GROUP | 6TH GROUP | 7TH GROUP | 8TH GROUP | 9TH GROUP | ... | N GROUP |
|---|---|---|---|---|---|---|---|---|---|---|---|---|
| A | A | AA | -- | -- | | | | | | | | |
| B | B | BA | -- | BC | | | | | | | | |
| C | C | CA | CB | -- | | | | | | | | |
| D | D | DA | -- | -- | | | | | | | | |
| E | E | EA | EB | EC | | | | | | | | |
| F | F | FA | FB | FC | | | | | | | | |
| G | G | GA | GB | GC | | | | | | | | |
| H | H | HA | HB | HC | | | | | | | | |
| I | I | IA | IB | IC | | | | | | | | |
| J | J | JA | JB | JC | | | | | | | | |
| K | K | KA | KB | KC | | | | | | | | |
| L | L | LA | LB | LC | | | | | | | | |
| N | N | NA | NB | NC | | | | | | | | |
| O | O | -- | -- | -- | | | | | | | | |
| P | P | -- | -- | -- | | | | | | | | |
| Q | Q | QA | -- | -- | | | | | | | | |
| R | R | RA | -- | RC | | | | | | | | |
| S | S | SA | SSB | SSC | | | | | | | | |
| T | T | TA | TB | TC | | | | | | | | |
| U | U | UA | -- | -- | | | | | | | | |
| V | V | VA | -- | -- | | | | | | | | |
| W | W | WA | WB | -- | | | | | | | | |
| X | X | XA | XB | XC | | | | | | | | |
| Y | Y | YA | YB | YC | | | | | | | | |
| Z | Z | ZA | ZB | ZC | | | | | | | | |
| M01 | M01 | MA01 | MB01 | MC01 | | | | | | | | |
| M02 | M02 | MA02 | MB02 | MC02 | | | | | | | | |
| M03 | M03 | MA03 | MSB03 | MSC03 | | | | | | | | |
| . | . | . | . | . | | | | | | | | |
| . | . | . | . | . | | | | | | | | |
| . | . | . | . | . | | | | | | | | |
| M98 | M98 | MA98 | MB98 | MC98 | | | | | | | | |
| M99 | M99 | MA99 | MB99 | MC99 | | | | | | | | |

FIGURE 2(B)

SYSTEM CONTROL SELECTION PARAMETER TABLE (2/2) INPUT SAMPLE

| GROUP | 0 GROUP | 1ST GROUP | 2ND GROUP | 3RD GROUP | 4TH GROUP | 5TH GROUP | 6TH GROUP | 7TH GROUP | 8TH GROUP | 9TH GROUP | ... | N GROUP |
|---|---|---|---|---|---|---|---|---|---|---|---|---|
| GROUP WORD | COMMON WORD | A | B | C | | | | | | | | |
| CHARACTER | | | | | | | | | | | | |
| E | E | -- | -- | -- | | | | | | | | |
| F | FXY | FXAYA | FXBYB | FXCYC | | | | | | | | |
| F | FXZ | FYAZA | FYBZB | FYCZC | | | | | | | | |
| F | FZX | FZAXA | FZBXB | FZCXC | | | | | | | | |
| F | . | . | . | . | | | | | | | | |
| F | . | . | . | . | | | | | | | | |
| F | . | . | . | . | | | | | | | | |
| S | S | SSA | -- | -- | | | | | | | | |
| S | SXY | SXAYA | SXBYB | SXCYC | | | | | | | | |
| S | SYZ | SYAZA | SYBZB | SYCZC | | | | | | | | |
| S | SZX | SZAXA | SZBXB | SZCXC | | | | | | | | |
| S | . | . | . | . | | | | | | | | |
| S | . | . | . | . | | | | | | | | |
| S | . | . | . | . | | | | | | | | |
| T | TXY | TXAYA | TXBYB | TXCYC | | | | | | | | |
| T | TYZ | TYAZA | TYBZB | TYCZC | | | | | | | | |
| T | TZX | TZAXA | TZBXB | TZCXC | | | | | | | | |
| T | . | . | . | . | | | | | | | | |
| T | . | . | . | . | | | | | | | | |
| T | . | . | . | . | | | | | | | | |

FIGURE 2(c)

| GROUP SECTION | COMMON | A | B | C |
|---|---|---|---|---|
| SEQUENCE | N | NA | NB | NC |
| DIMENSION | X | XA | XB | XC |
| | Y | YA | YB | YC |
| | Z | ZA | ZB | ZC |
| | R | RA | | RC |
| | W | WA | WB | |
| | A | AA | | |
| | B | BA | | BC |
| | C | CA | CB | |
| | D | DA | | |
| | Q | | | |
| SPINDLE FUNCTION WORD (M-FUNCTION WORD FOR SPINDLE) | S | SA | SSB | SSC |
| | | SSA | | SBC |
| | | SCA | SCB | |
| | | SDA | | |
| | | SXAYA | SXBYC | SXCYC |
| | | SXAZA | SXBZB | |
| | | SXARA | | |
| | | SXAWA | SXBWB | |
| TOOL CODE | T | TA | TB | TC |
| FEED FUNCTION WORD | F | FA | FB | FC |
| | | FXA | FXB | FXC |
| | | FYA | FYB | FYC |
| | | FZA | FZB | FZC |
| | | FRA | | FRC |
| | | FWA | FWB | |
| | | FAA | | |
| | | FBA | | FBC |
| | | FCA | FCB | |
| | | FDA | | |
| MISC. WORD FUNCTION | M | MA | MB | MC |

| GROUP SECTION | COMMON | A | B | C |
|---|---|---|---|---|
| MISCELLANEOUS FUNCTION WORD FOR REVOLUTION | M03 | MA03 | | |
| | M04 | MA04 | | |
| | M05 | MA05 | | |
| | | MSA03 | MSB03 | MSC03 |
| | | MSA04 | MSB04 | MSC04 |
| | | MSA05 | MSB05 | MSC05 |
| | | MCA03 | MCB03 | MBC03 |
| | | MCA04 | MCB04 | MBC04 |
| | | MCA05 | MCB05 | MBC05 |
| | | MDA03 | MXBYB03 | MXCYC03 |
| | | MDA04 | MXBYB04 | MXCYC04 |
| | | MDA05 | MXBYB05 | MXCYC05 |
| | | MXAYA03 | MXBZB03 | |
| | | MXAYA04 | MXBZB04 | |
| | | MXAYA05 | MXBZB05 | |
| | | MXAZA03 | MXBWB03 | |
| | | MXAZA04 | MXBWB04 | |
| | | MXAZA05 | MXBWB05 | |
| | | MXARA03 | | |
| | | MXARA04 | | |
| | | MXARA05 | | |
| | | MXAWA03 | | |
| | | MXAWA04 | | |
| | | MXAWA05 | | |
| PREPARATORY FUNCTION WORD | G | | | |
| | GX | GXA | GXB | GXC |
| | GY | GYA | GYB | GYC |
| | GZ | GZA | GZB | GZC |
| | GR | GRA | | GRC |
| | GW | GWA | GWN | |
| | GA | GAA | | |
| | GB | GBA | | GBC |
| | GC | GCA | GCB | |
| | GD | GDA | | |

FIG. 2(D)

| NA | PRESENT SEQUENCE<br>COMMAND SEQUENCE<br>NEXT COMMAND SEQUENCE |
|---|---|
| XA | MACHINE POSITION COORDINATION<br>POSITION ORIGIN<br>PRESENT POSITION<br>COMMAND VALUE<br>REMAINING DISTANCE<br>NEXT COMMAND DISTANCE |
| SA | PRESENT REVOLUTION PER MINUTE<br>COMMAND REVOLUTION PER MINUTE<br>NEXT COMMAND REV. PER MINUTE |
| TA | PRESENT TOOL NUMBER<br>COMMAND TOOL NUMBER<br>NEXT COMMAND TOOL NUMBER |
| FA | PRESENT FEED (SPEED)<br>COMMAND FEED (SPEED)<br>NEXT COMMAND FEED (SPEED) |
| MA | PRESENT MISCELLANEOUS VALUE<br>COMMAND MISCELLANEOUS VALUE<br>NEXT COMMAND MISC. VALUE |

FIGURE 3(a)

```
:O100;
N001  G28;
N002  G90 XA0 YA0 ZA0 RA0 WA0 AA0 BA0 CA0 DA0
          XB0 YB0 ZB0 WB0 CB0 XC0 YC0 ZC0 RC0 BC0;
N003  G25;
N004  TA0101 TB0101 M06;
N005  G00 XA-3000, YA-1090, ZA0 RA-1000, WA-950
          XB-3000, YB-1090, ZB0 WB-950,;
N006  SA400 SSB400 M03;
N007  G00 XA-4070, YA-1870, ZA-50, XB-4070, YB-1870, ZB-50,
N008  G01 XA-3250, XB-3250, F500;
N009  G00 WA-900, WB-900;
N010  G00 XA-2750, XB-2750;
N011  G01 WA-950, WB-950, F150;
N012  G01 XA-1930, XB-1930, F500
N013  G00 ZA0 WA0 ZB0 WB0 M05;
N014  G00 XA0 YA0 XB0 YB0;
N015  TA0202 TB0202 M08;
N016  SA600 SSB600 M03;
N017  G00 XA-4070, YA-1870, ZA-50, WA-950
          XB-4070, YB-1870, ZB-50, WB-950;
N018  G01 XA-3250, XB-3250, F500;
N019  G00 WA-900, WB-900;
N020  G00 XA-2750, XB-2750,;
N021  G00 WA-945, WB-945;
N022  G01 WA-950, WB-950, F150;
N023  G01 XA-1930, XB-1930, F500;
N024  G00 ZA0 WA0 ZB0 WB0 M05;
N025  G00 XA0 YA0 XB0 YB0;
N026  TA0101 TB0101 M06;
N027  G00 XA-3768, 836 YA-918, 886 ZA0 RA-1000, WA-950
          XB-3760, 836 YB-918, 886 ZB0 WB-950, 0;
N028  SA400 SSB400 M03;
N029  GA17 GB17;
N030  G00 ZA-50, ZB-50;
N031  G01 XA-3494, 975 YA-886. 139 FA500
          XB-3494, 975 YA-886, 139 FB500
N032  G02 XA-3494, 975 YA-866, 139 1A494, 975 JA-494, 975 FA500,
      G02 XB-3494, 975 YB-866, 139 1B494, 975 JB-494, 975 FB500;
```

FIGURE 3(b)

```
N033  G01 XA-3221, 114 YA-592, 278 FA500,
      G01 XB-3221, 114 YB-592, 278 FB500;
N034  G00 XA0 MA05 G00WB0 MSB05;
N035  G00 XA0 YA0 ZA0 XB0 YB0 ZB0;
N036  TA0202 TB0202 M06;
N037  G00 XA-3768, 836 YA-918, 886 ZA0 WA-950,
          XB-3768, 836 YB-918, 886 ZB0 WB-950;
N038  SA600 SSB600 M03;
N039  G00 ZA-50, 5 ZB-50, 5;
N040  G01 XA-3494, 975 YA-866, 139 FA500
          XB-3494, 975 YB-866, 139 FB500
N041  G02 XA-3494, 975 YA-866, 139 1A494, 975 JA-494, 975 FA500,
          XB-3494, 975 YB-866, 139 1B494, 975 JB-494, 975 FB500,
N042  G01 XA-3221, 114 YA-592, 278 FA500
          XB-3221, 114 YB-592, 278 FB500;
N043  G00 WA0 WB0 M05;
N044  G00 XA0 YA0 ZA0 XB0 YB0 ZB0;
NC045 MBC85;
NC046 G00 BC-90, ;
NC047 MBC 84;
N048  G26;
N049  TA0101 TC0101 M06;
N050  GA00 XA-2904, 673 YA-1124, 675 ZA0 WA-1000,;
      GC00 XB-2904, 673 YC+13, 325 ZC0 RC-250,;
N051  SA400 SSC400 M03;
N052  GA17 GC17;
N053  G00 ZA-160, ZC-50;
N054  GA01 XA-2758, 099 YA-980, 001 FA500,
      GC01 XB-2558, 099 YA-158, 099 FC500,
N055  GA02 XA-2758, 099 YA-980, 901 1A159, 099 JA-159, 099 FA500
      GC02 XB-2558, 099 YC+158, 901 1B159, 099 JB-159, 099 FC500
N056  GA01 XA-2454, 266 YA-335, 127 FA500,
      GC01 XB-2454, 266 YC+304, 873 FC500;
NC057 GA00 WA0 MA05, GC00 ZC0;
NC058 GA00 XA0 YA0 ZA0, GC00 XB-3904, 873 YC+13, 325;
NC059 GC00 ZC-50;
NC060 GC01 XB-3759, 099 YC+159, 099 FC500;
NC061 GC02 XB-3759, 099 YC+159, 099 1B159, 099 JC-159, 099 FC500;
NC062 GC01 XB-3454, 228 YC+304, 873 FC500;
NC063 GC00 ZC0 RC0 MC05;
```

FIGURE 3(c)

```
NC064  GC00 XB0 YC0;
N065   TA0202 TC0202 M006;
N066   GA00 XA-2904, 873 YA-1126, 675 ZA0 WA-1000,
       GC00 XB-2704, 873 YC+13, 325 ZC0 RC-250;
N067   SA600 SSC600 M03;
N068   G00 ZA-160, 5 ZC-50, 6;
N069   GA01 XA-2759, 099 YA-980, 901 FA500,
       GC01 XA-2559, 099 YC+159, 099 FC500,
N070   GA02 XA-2759, 099 YA-980, 901 1A159, 099 JA-159, 099 FA500,
       GC02 XA-2759, 099 YC+159, 901 1B159, 099 JC-159, 099 FC500;
N071   GA01 XA-2454, 286 YA-135, 127 FA500,
       GC01 XB-2254, 226 YC+304, 673 FC500;
N072   GA00 WA0 MA05, GC00 ZC0;
N073   GA00 XA0 YA0 ZA0, GC00 XB-3904, 873 YC+13, 325;
NC074  GC00 ZC-50, 5;
NC075  GC01 XB-3759, 099 YC+159, 099 FC500;
NC076  GC02 XB-3759, 099 YC+159, 099 1B159, 099 JC-159, 099 FC500;
NC077  GC01 XB-3545, 226 VC+304, 873 FC500;
NC078  GC00 ZC0 RC0 MSC05;
NC079  GC00 XB0 YC0;
N080   TA0303 TC0303 M06;
N081   GA00 XA-2600, YA-1140, ZA-150, WA-1000,
       GC00 XB-2400, YC 0 ZC-40, RC-250,;
N082   SA1200 SSC1200 M03;
N083   GA98 GA83 XA-2775, YA-1100, ZA-50, R10, Q10, FA150
       GC98 GC83 XB-2575, YC 0 ZC-50, R10, Q10, FC150;
N084   GA83 XA-2600, YA-925,
       GC83 XB-2400, YC+175;
N085   GA83 XA-2425, YA-1100,
       GC83 XB-2225, YC 0;
N086   GA83 XA-2600, YA-1275,
       GC83 XB-2400, YC-175,;
N087   GA80 GA00 XA0 ZA0 WA0 MA05,
       GC83 XB-3775, YC 0;
NC088  GC83 XB-3600, YC+175,;
NC089  GC83 XB-3425, YC 0;
NC090  GC83 XB-3600, YV-176,;
NC091  GC80 GC00 XB0 YC0 ZC0 RC0 MSC05;
N092   TA0404 TC0404 M06;
N093   GA00 XA-2600, YA-1140, ZA-150, WA-1000,
       GC00 XB-2400, YC 0 ZC-40, RC-250,;
```

FIGURE 3(d)

```
N094   SA400 SSC400 M03;
N095   GA98 GA84 XA-2775, YA-1100, ZA-40, R10  FA800 P0, 5,
       GC98 GC84 XB-2575, YC 0  ZC-40, R10, FC800 P0, 5;
N096   GA84 XA-2600, YA-925,
       GC84 XB-2400, YC+175,;
N097   GA84 XA-2425 YA-1100,
       GC84 XB-2225, YC 0;
N098   GA84 XA-2600, YA-1278,
       GC84 XB-2400, YC-175,;
N099   GA80 XA0 YA0 ZA0 WA0 MA05,
       GA84 XB-3775, YC 0;
NC100  GC84 XB-3600, YC+175,;
NC101  GC84 XB-3425, YC 0;
NC102  GC84 XB-3600, YC-175,;
NC103  GC80 GC00 XB0 YC0 ZC0 RC0 MSC05;
N104   G25;
NC105  TC0505 M06;
NC106  GC00 XB-2200, YC-900,;
NC107  SSC300 M03;
NC108  GC00 RC-1000, ZC-840,;
NC109  GC98 GC83 XB-2200, YC-900, ZC-75, R10, Q5, FC50;
NC110  GC83 XB-3000, YC-900,;
NC011  GC83 XB-3600, YC-900,;
NC112  GC80 GC00 ZC 0 RC 0;
NC113  GC00 YC+900, XB-2200,;
NC114  GC00 RC-1000, ZC-640,;
NC115  GC98 GC83 XB-2200, YC+900, ZC-75, R10, Q5, FC50;
NC116  GC83 XB-3000, YC-900,;
NC117  GC83 XB-3600, YC+900,;
NC118  GC80 GC00 ZC0 RC0 MSC05;
NC119  GC00 XB0 YC0;
NC120  MBC85;
NC121  GC00 BC+90,;
NC122  MBC84;
N123   G26;
N124   TA0505 TB0505 M06;
N125   G00 XA-2325, YA-1140, ZA0 WA-750,
           XB-2325, YB-1140, ZB0 WB-750,;
N126   SA1000 SSB1000 M03;
```

N139 SA320 SSB320 M03;

N140 GA98 GA84 XA-2325, YA-1140, ZA-50, R10, FA500 P0, 5,
     GB98 GB84 XB-2325, YB-1140, ZB-50, R10, FB500 P0, 5;

N141 GA84 XA-2522, 703 YA-662, 703,
     GB84 XB-2522, 703 YB-662, 703,;

N142 GA84 XA-3000, YA-465
     GB84 XB-3000, YB-465,;

N143 GA84 XA-3477, 297 YA-662, 703,
     GB84 XB-3477, 297 YB-662, 703;

N144 GA84 XA-3675, YA-1140,
     GB84 XA-3675, YB-1140,;

N145 GA84 XA-3477, 297 YA-1617, 297,
     GA84 XB-3477, 297 YB-1617, 297;

N146 GA84 XA-3000, YA-1615,
     GB84 XB-3000, YB-1615,

N147 GA84 XA-2522, 703 YA-1617, 297,
     GB84 XB-2522, 703 YB-1617, 297;

N148 G00 G00 ZA0 WA0 ZB0 WB0 M05;

N149 G28;

N150 TA0000 TB0000 TC0000 M06;

N151 M30;

| LINE NO. | TITLE OF AXIS IN THIS PATENT | TITLE OF AXIS IN PRIOR ART | STROKE (UNIT, mm) | COMMENTS |
|---|---|---|---|---|
| 1 | XA | X | 0 ~ -5,000 | |
| 2 | YA | Y | 0 ~ -2,000 | |
| 3 | ZA | Z | 0 ~ -1,000 | |
| 4 | RA | R | 0 ~ -1,000 | |
| 5 | WA | W | 0 ~ -1,000 | |
| 6 | AA | A | ± 120° | TILTING ANGLE LIMITED |
| 7 | BA | B' (B) | ± 120° | '' |
| 8 | CA | C | ± 360° * $n^{rev}$ | FREE ROTATION ANGLE |
| 9 | DA | D | ± 360° * $n^{rev}$ | '' |
| 10 | XB | X' (X) | 0 ~ -5,000 | |
| 11 | YB | Y' (Y) | 0 ~ -2,000 | |
| 12 | ZB | Z' (Z) | 0 ~ -1,000 | |
| 13 | WB | W' (W) | 0 ~ -1,000 | |
| 14 | CB | C' (C) | ± 360° * $n^{rev}$ | FREE ROTATION ANGLE |
| 15 | XC | P | ± 1,500 | |
| 16 | YC | W''' (W) | ± 1,500 | |
| 17 | ZC | V | 0 ~ -2,000 | |
| 18 | RC | Q | 0 ~ -1,000 | |
| 19 | BC | B | ± 360° * $n^{rev}$ | FREE ROTATION ANGLE |
| 20 | | | | |

( ) ARE DIMENSION WORDS TO BE USED WHEN PROGRAMMING

FIG.5(a) MACHINE RELATED STROKE TABLE

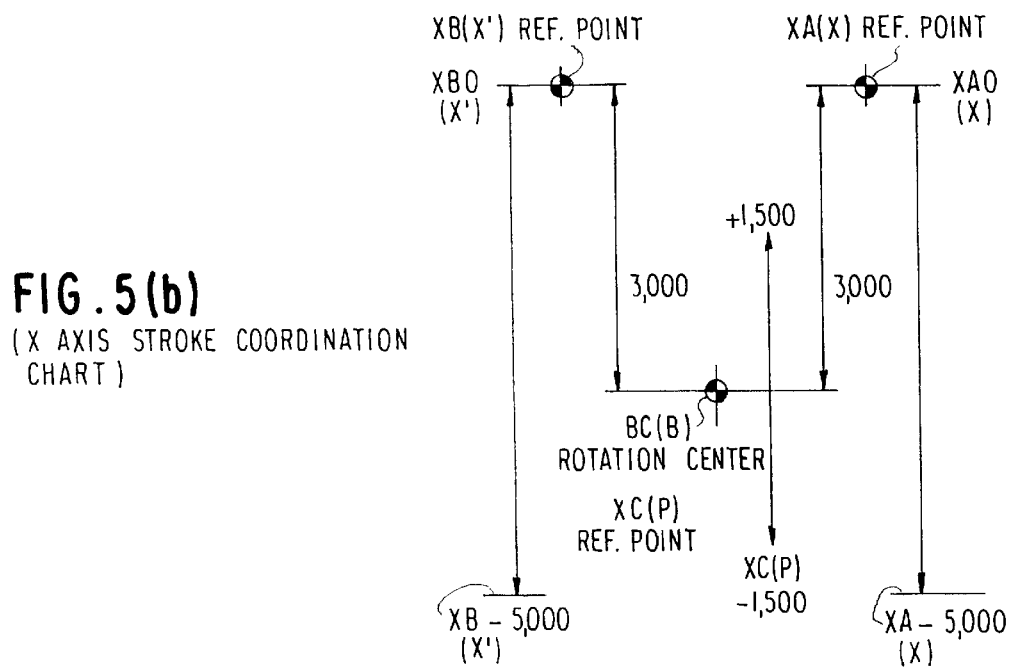

FIG.5(b)
(X AXIS STROKE COORDINATION CHART)

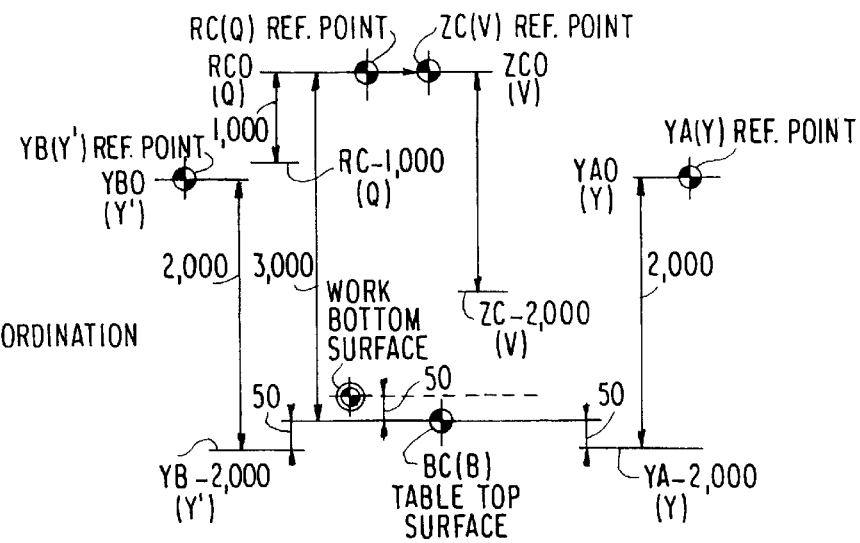

FIG. 5(c)
(Y AXIS STROKE COORDINATION CHART)

NOTE: ZC(V) REF. POINT IS DETERMINED BASED ON RC(Q) REF. POINT AND IS A FLOATING REF. POINT WHICH SHIFTS IN ACCORDANCE WITH THE MOVEMENT OF RC(Q)

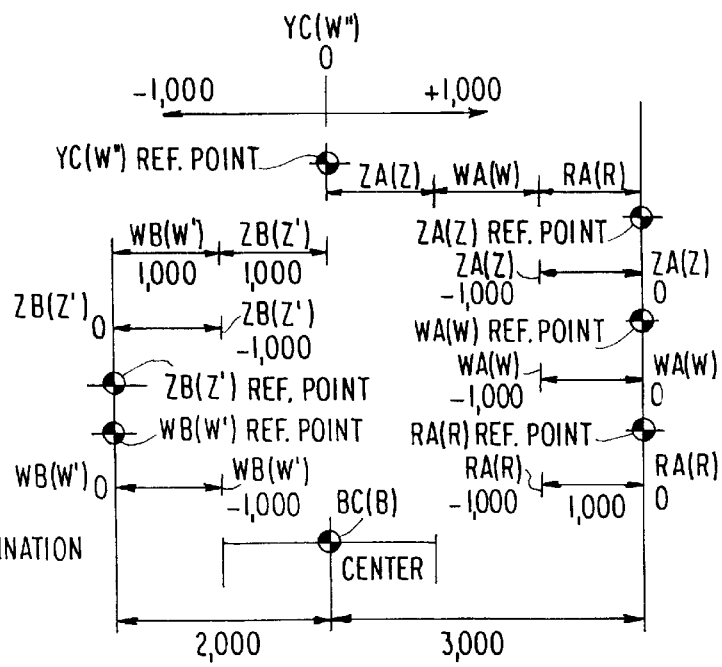

FIG. 5(d)
(Z AXIS STROKE COORDINATION CHART)

NOTES: ZA(Z) REF. POINT IS DETERMINED BASED ON WA(W) REF. POINT AND WA(W) REF. POINT IS DETERMINED BASED ON RA(R) REF. POINT.
ZB(Z') REF. POINT IS A FLOATING REF. POINT BASED ON WB(W') REF. POINT.

FIG. 19(a)

| N | PROCESSING PROGRAM | COMMON /GROUP | SIMUL | PROCESSING PROGRAM TO CONTROL GROUP A | COMMON /GROUP | SIMUL | N. | PROCESSING PROGRAM TO CONTROL GROUP B | COMMON /GROUP | SIMUL | N. | PROCESSING PROGRAM TO CONTROL GROUP C |
|---|---|---|---|---|---|---|---|---|---|---|---|---|
| 1 | N001 G28; | 1 | 1 | GA28; | 1 | 1 | 1 | GB28; | 1 | 1 | 1 | GC28; |
| 2 | N002 G00 XA0 YA0 ZA0 RA0 WA0 AA0 BA0 CA0 XB0 YB0 ZB0 WB0 CB0 XC0 YC0 ZC0 RC0 BC0; | 1 | 1 | GA90 XA0 YA0 ZA0 RA0 WA0 AA0 BA0 CA0; | 1 | 1 | 2 | GB90 XB0 YB0 ZB0 WB0 CB0; | 1 | 1 | 2 | GC90 XC0 YC0 ZC0 RC0 BC0; |
| 3 | N003 G25; | 1 | 1 | GA25; | 1 | 1 | 3 | GA25; | 1 | 1 | 3 | GC25; |
| 4 | N004 TA0101 TB0101 M00; | 1 | 1 | TA0101 MA06; | 1 | 1 | 4 | TB0101 WB06; | 1 | 1 | 4 | ; |
| 5 | N005 G00 XA-3000, YA-1090, ZA0 RA-1000, WA-950 XB-3000, YB-1090, ZB0 WB-950 | 1 | 1 | GA00 XA-3000, YA-1090, ZA0 RA-1000, WA-950 | 1 | 1 | 5 | GB00 XB-3000, YB-1090, ZB0 WB-950 | 1 | 1 | 5 | ; |
| 6 | N006 SA400 SSB400 M03; | 1 | 2 | SA400 MA03 | 1 | 2 | 6 | SSB400 MSB03; | 1 | 1 | 6 | ; |
| 7 | N007 G00 XA-4070, YA-1870, ZA-50, XB-4070, YB-1870, ZB-50; | 1 | 1 | GA00 XA-4070, YA-1870, ZA-50; | 1 | 1 | 7 | GB00 XB-4070, YB-1870, ZB-50; | 1 | 1 | 7 | ; |
| 8 | N008 G01 XA-3250, XB-3250, F500; | 1 | 2 | GA01 XA-3250, FA500; | 1 | 2 | 8 | GB01 XB-3250, FB500; | 1 | 1 | 8 | ; |
| 9 | N009 G00 WA-900, WB-900,; | 1 | 1 | GA00 WA-900,; | 1 | 1 | 9 | GB00 WB-900,; | 1 | 1 | 9 | ; |
| 10 | N010 G00 XA-2750, WB-2750,; | 1 | 1 | GA00 XA-2750,; | 1 | 1 | 10 | GB00 WB-2750,; | 1 | 1 | 10 | ; |
| 11 | N011 G01 WA-950, WB-950, F150; | 1 | 2 | GA01 WA-950, FA150; | 1 | 2 | 11 | GB01 WB-950, FB150; | 1 | 1 | 11 | ; |
| 12 | N012 G01 XA-1930, AB-1930, F500; | 1 | 2 | GA01 XA-1930, FA500; | 1 | 2 | 12 | GB01 XB-1930, FB500; | 1 | 1 | 12 | ; |

FIG. 19(b)

| N | PROCESSING PROGRAM | COMMON /GROUP SIMUL | N, | PROCESSING PROGRAM TO CONTROL GROUP A | COMMON /GROUP SIMUL | N, | PROCESSING PROGRAM TO CONTROL GROUP B | COMMON /GROUP SIMUL | N, | PROCESSING PROGRAM TO CONTROL GROUP C |
|---|---|---|---|---|---|---|---|---|---|---|
| 13 | N013 G00 ZA0 WA0 ZB0 WB0 M05; | 1 | 13 | G A00 ZA0 WA0 MA05; | 1 | 13 | GB00 ZB0 WB0 MSB05; | 1 | 13 | ; |
| 14 | N014 G00 XA0 YA0 XB0 YB0; | 1 | 14 | GA00 XA0 YA0; | 1 | 14 | GB00 XB0 YB0; | 1 | 14 | ; |
| 15 | N015 TA0202 TB0202 M06; | 1 | 15 | TA0202 MA06; | 1 | 15 | TB0202 MB06; | 1 | 15 | ; |
| 16 | N016 SA600 SSB600 M03; | 1 | 16 | SA600 MA03; | 1 | 10 | SSB600 MB03; | 1 | 16 | ; |
| 17 | N017 G00 XA-4070, YA-1870, ZA-50 WA-950,; XB-4070, YB-1870, ZB-50, WB-950,; | 1 | 17 | GA00 XA-4070, YA-1870, ZA-50, WA-950,; | 1 | 17 | GB00 XB-4070, YB-1870, ZB-50, WB-950,; | | | |
| 18 | N018 G01 XA-3250, XB-3250, F500; | 2 | 18 | GA01 XA-3250, FA500; | 2 | 18 | GB01 XB-3250, FB500; | 1 | 18 | ; |
| 19 | N019 G00 WA-900, WB-900,; | 1 | 19 | GA00 WA-900,; | 1 | 19 | GB00 WB-900,; | 1 | 19 | ; |
| 20 | N020 G00 XA-2750, XB-2750,; | 1 | 20 | GA00 XA-2750,; | 1 | 20 | GB00 XB-2750,; | 1 | 20 | ; |
| 21 | N021 G00 WA-945, WB-945,; | 1 | 21 | GA00 WA-945,; | 1 | 21 | GB00 WB-945,; | 1 | 21 | ; |
| 22 | N022 G01 WA-950, WB-950, F150; | 2 | 22 | GA01 WA-950, FA150; | 2 | 22 | GB01 WB-950, FB150; | 1 | 22 | ; |
| 23 | N023 G01 XA-1930, XB-1930, F500; | 2 | 23 | GA01 XA-1930, FA500; | 1 | 23 | GB01 XB-1930, FB500; | 1 | 23 | ; |
| 24 | N024 G00 ZA0 WA0 ZB0 WB0 M05; | 1 | 24 | GA00 ZA0 WA0 MA05; | 1 | 24 | GB00 ZB0 WB0 MB05; | 1 | 24 | ; |
| 25 | N025 G00 XA0 YA0 XB0 YB0; | 1 | 25 | GA00 XA0 YA0; | 1 | 25 | GB00 XB0 YB0; | 1 | 25 | ; |
| 26 | N026 TA0101 TB0101 M06; | 1 | 26 | TA0101 MA06; | 1 | 26 | TB0101 MB06; | 1 | 26 | ; |

FIG. 19(c)

| N | PROCESSING PROGRAM | COMMON /GROUP | SIMUL | N, | PROCESSING PROGRAM TO CONTROL GROUP A | COMMON /GROUP | SIMUL | N, | PROCESSING PROGRAM TO CONTROL GROUP B | COMMON /GROUP | SIMUL | N, | PROCESSING PROGRAM TO CONTROL GROUP C |
|---|---|---|---|---|---|---|---|---|---|---|---|---|---|
| 27 | N027 G00 XA-3768, 836 YA-918, 866 ZA0 RA-1000, WA-950, XB-3768, 836 YB-918, 866 ZB0, RA-1000, WB-950, 0; | 1 | 1 | 27 | GA00 XA-3768, 836 YA-918, 866 ZA0 RA-1000, WA-950,; | 1 | 1 | 27 | GB00 XB-3768, 836 YB-918, 866 ZB0 RB-1000, WB-950,; | 1 | 1 | 27 | ; |
| 28 | N028 SA400 SSB400 M03; | 1 | 1 | 28 | SA400 MA03; | 1 | 1 | 28 | SB400 MSB03; | 1 | 1 | 28 | ; |
| 29 | N029 GA17 GB17; | 1 | 1 | 29 | GA17; | 1 | 1 | 29 | GB17; | 1 | 1 | 29 | ; |
| 30 | N030 G00 ZA-50, ZB-50,; | 1 | 1 | 30 | GA00 ZA-50,; | 1 | 1 | 30 | GB00 ZB-50,; | 1 | 1 | 30 | ; |
| 31 | N031 G01 XA-3494, 975 YA-860, 139 FA500, XB-3494, 975 YB-860, 139 FB500; | 1 | 2 | 31 | GA01 XA-3494, 975 YA-860, 139 FA500; | 1 | 2 | 31 | GB01 XB-3494, 975 YB-860, 139 FB500; | 1 | 1 | 31 | ; |
| 32 | N032 G02 XA-3494, 975 YA-866, 139 IA-494, 975 JA494, 975 FA500, G02 XB-3494, 975 YB-866, 139 IB494, 975 JB494, 975 FB500; | 1 | 0 | 32 | GA02 XA-3494, 975 YA-866 139 IA494, 975 JA494, 975 FA500; | 1 | 0 | 32 | GB02 XB-3494, 975 YB-866, 139 IB494, 975 JB494, 975 FB500; | 1 | 0 | 32 | ; |
| 33 | N033 G01 XA-3221, 114 YA-592, 278 FA500, G01 XB-3221, 114 YD-592, 278 FB500; | 1 | 0 | 33 | GA01 XA-3221, 114 YA-592, 278 FA500; | 1 | 0 | 33 | GB01 XB-3221, 114 YB-592, 278 FB500; | 1 | 0 | 33 | ; |
| 34 | N034 G00 WA0 MA05, G00 WB0 MSB05; | 1 | 0 | 34 | GA00 WA0 MA05; | 1 | 0 | 34 | GB00 WB0 MSB05; | 1 | 0 | 34 | ; |

FIG. 19(d)

| N | PROCESSING PROGRAM | COMMON /GROUP | SIMUL | N, | PROCESSING PROGRAM TO CONTROL GROUP A | COMMON /GROUP | SIMUL | N, | PROCESSING PROGRAM TO CONTROL GROUP B | COMMON /GROUP | SIMUL | N, | PROCESSING PROGRAM TO CONTROL GROUP C |
|---|---|---|---|---|---|---|---|---|---|---|---|---|---|
| 35 | N035 G00 XA0 YA0 ZA0 XB0 YB0 ZB0; | 1 | 1 | 35 | GA00 XA0 YA0 ZA0; | 1 | 1 | 35 | GB00 XB0 YB0 ZB0; | 1 | 1 | 35 | ; |
| 36 | N036 TA0202 TB0202 M06; | 1 | 1 | 36 | TA0202 M06; | 1 | 1 | 36 | TB0202 M06; | 1 | 1 | 36 | ; |
| 37 | N037 G00 XA-3768, 836 YA-918, 866 ZA0 WA-950, XB-3768, 836 YB-918, 866 ZB0 WB-950,; | 1 | 1 | 37 | GA00 XA-3768, 836 YA-918, 866 ZA0 WA-950,; | 1 | 1 | 37 | GB00 XB-3768, 836 YB-918, 866 ZB0 WB-950,; | 1 | 1 | 37 | ; |
| 38 | N038 SA600 SSB600 M03; | 1 | 1 | 38 | SA600 MA03; | 1 | 1 | 38 | SSB600 MSB03; | 1 | 1 | 38 | ; |
| 39 | N039 G00 ZA-50, 5 ZB-50 5; | 1 | 1 | 39 | GA00 ZA-50, 5; | 1 | 1 | 39 | GB00 ZB-50, 5; | 1 | 1 | 39 | ; |
| 40 | N040 G01 XA-3494, 975 YA-866, 139 FA500, XB-3494, 975 YB-866, 139 FB500; | 1 | 2 | 40 | GA01 XA-3494, 975 YA-866, 139 FA500; | 1 | 2 | 40 | GB01 XB-3494, 975 YB-866, 139 FB500; | 1 | 1 | 40 | ; |
| 41 | N041 G02 XA-3494, 975 YA-866, 139 IA494, 975 JA-494, 975 FA500, XB-3494, 975 YB-866, 139 IB494, 975 JB-494, 975 FB500; | 1 | 2 | 41 | GA02 XA-3494, 975 YA-866, 139 IA494, 975 JA-494, 975 FA500; | 1 | 2 | 41 | GB02 XB-3494, 975 YB-866, 139 IB494, 975 JB-494, 975 FB500; | 1 | 1 | 41 | ; |
| 42 | N042 G01 XA-3221, 114 YA-592, 278 FA500, XB-3221, 114 YB-592, 278 FB500; | 1 | 0 | 42 | GA01 XA-3221, 114 YA-592, 278 FA500; | 1 | 0 | 42 | GB01 XB-3221, 114 YB-592, 278 FB500; | 1 | 0 | 42 | ; |
| 43 | N043 G00 WA0 WB0 M05; | 1 | 1 | 43 | GA00 WA0 MA05; | 1 | 1 | 43 | GB00 WB0 MSB05; | 1 | 1 | 43 | ; |

FIG. 19(e)

| N | PROCESSING PROGRAM | COMMON /GROUP | SIMUL | N | PROCESSING PROGRAM TO CONTROL GROUP A | COMMON /GROUP | SIMUL | N | PROCESSING PROGRAM TO CONTROL GROUP B | COMMON /GROUP | SIMUL | N | PROCESSING PROGRAM TO CONTROL GROUP C |
|---|---|---|---|---|---|---|---|---|---|---|---|---|---|
| 44 | N044 G00 XA0 YA0 ZA0 XB0 YB0 ZB0; | 1 | 1 | 44 | GA00 XA0 YA0 ZA0; | 1 | 1 | 44 | GB00 XB0 YB0 ZB0; | 1 | 1 | 44 | ; |
| 45 | N045 WBC86; | 0 | 0 | 45 | ; | 0 | 0 | 45 | ; | 2 | 0 | 45 | WBC86; |
| 46 | N046 G00 BC-90,; | 0 | 0 | 46 | ; | 0 | 0 | 46 | ; | 2 | 0 | 46 | GC90 BC-90,; |
| 47 | N047 WBC84; | 0 | 0 | 47 | ; | 0 | 0 | 47 | ; | 2 | 0 | 47 | WBC84; |
| 48 | N048 628; | 1 | 1 | 48 | GA28; | 1 | 1 | 48 | GB28; | 1 | 1 | 48 | GC28; |
| 49 | N049 TA0101 TC0101 M06; | 2 | 0 | 49 | TA0101 MA06; | 2 | 0 | 49 | ; | 2 | 0 | 49 | TC0101 MC06; |
| 50 | N050 GA00 XA-2904, 873 YA-1126, 876 ZA0 WA-1000, GC00 XB-2704, 873 YC+13, 325 ZC0 RC-250; | 2 | 0 | 50 | GA00 XA-2904, 873 YA-1126, 876 ZA0 WA-1000,; | 2 | 0 | 50 | ; | 2 | 0 | 50 | GC00 YC+13, 325 ZC0 RC-250, XB-2704, 873; |
| 51 | N051 SA400 SSC400 M03; | 2 | 1 | 51 | SA400 MA03; | 2 | 0 | 51 | ; | 2 | 1 | 51 | SSC400 MSC03; |
| 52 | N052 GA17 GC17; | 2 | 1 | 52 | GA17; | 2 | 1 | 52 | ; | 2 | 1 | 52 | GC17; |
| 53 | N053 G00 ZA-160, ZC-50,; | 2 | 1 | 53 | GA00 ZA-160,; | 2 | 0 | 53 | ; | 2 | 1 | 53 | GC00 ZC-50,; |
| 54 | N054 GA01 XA-2759, YA-980, 901 FA500, GC01 XB-2559, 099 YC+159, 099 FC500; | 2 | 0 | 54 | GA01 XA-2759, 099 YA-980, 901 FA500; | 2 | 0 | 54 | ; | 2 | 0 | 54 | GC01 XB-2559, 099 YC+159, 099 FC500; |
| 55 | N055 GA02 XA-2759, 099 YA-980, 901 JA-159, 099 IA159, 099 FA500, GC02 XB-2559, 099 YC+159, 099 IB159, 099 JC-159, 099 FC500,; | 2 | 0 | 55 | GA02 XA-2759, 099 YA-980, 901 IA159, 099 JA159, 099 FA500; | 2 | 0 | 55 | ; | 2 | 0 | 55 | GC02 XB-2559, 099 YC+159, 099 IB150, 099 JC-159, 099 FC500; |

FIG. 19(f)

| N | PROCESSING PROGRAM | COMMON /GROUP SIMUL | N, | PROCESSING PROGRAM TO CONTROL GROUP A | COMMON /GROUP SIMUL | N, | PROCESSING PROGRAM TO CONTROL GROUP B | COMMON /GROUP SIMUL | N, | PROCESSING PROGRAM TO CONTROL GROUP C |
|---|---|---|---|---|---|---|---|---|---|---|
| 56 | N056 GA01 XA-2454, 206 YA-835, 127 FA500, GC01 XB-2254, 266 YC+304, 873 FC500; | 2 | 56 | GA01 XA-2454, 206 YA-835, 127 FA500; | 0 | 56 | ; | 2 | 56 | GC01 XB-2254, 266 YC+304, 873 FC500; |
| 57 | N057 GA00 WA0 WA05, GC00 ZC0; | 2 | 57 | GA00 WA0 WA05; | 0 | 57 | ; | 2 | 57 | GC00 ZC0; |
| 58 | N058 GA00 XA0 YA0 ZA0, GC00 XB-3904, 873 YC+13, 325; | 2 | 58 | GA00 XA0 YA0 ZA0 | 0 | 58 | ; | 2 | 58 | GC00 XB-3904, 873 YC+13, 325; |
| 59 | N059 GC00 ZC-50,; | 0 | 59 | ; | 0 | 59 | ; | 2 | 59 | GC00 ZC-50,; |
| 60 | N060 GC01 XB-3759, 099 YC+159, 099 FC500; | 0 | 60 | ; | 0 | 60 | ; | 2 | 60 | GC01 XB-3759, 099 YC+159, 099 FC500; |
| 61 | N061 GC02 XB-3759, 099 YC+159, 099 IB159, 099 JC159, 099 FC500; | 0 | 61 | ; | 0 | 61 | ; | 2 | 61 | GC02 XB-3759, 099 YC+159, 099 IB159, 099 JC159, 099 FC500; |
| 62 | N062 GC01 XB-3454, 226 YC+304, 873 FC500; | 0 | 62 | ; | 0 | 62 | ; | 2 | 62 | GC01 XB-3454, 226 YC+304, 873 FC500; |
| 63 | N063 GC00 ZC0 RC0 MC05; | 0 | 63 | ; | 0 | 63 | ; | 2 | 63 | GC00 ZC0 RC0 MC05; |
| 64 | N064 GC00 XB0 YC0; | 0 | 64 | ; | 0 | 64 | ; | 2 | 64 | GC00 XB0 YC0; |
| 65 | N065 TA0202 TC0202 M06; | 2 | 65 | TA0202 M06; | 0 | 65 | ; | 2 | 65 | TC0202 M06; |

FIG. 19(g)

| N | PROCESSING PROGRAM | COMMON /GROUP | SIMUL | N, | PROCESSING PROGRAM TO CONTROL GROUP A | COMMON /GROUP | SIMUL | N, | PROCESSING PROGRAM TO CONTROL GROUP B | COMMON /GROUP | SIMUL | N, | PROCESSING PROGRAM TO CONTROL GROUP C |
|---|---|---|---|---|---|---|---|---|---|---|---|---|---|
| 66 | N066 GA00 XA-2904, 873 YA-1126, 675 ZA0 WA-1000, GC00 XB-2704, 873 YC+13, 326 ZC0 RC-250; | 2 | 1 | 66 | GA00 XA-2904, 873 YA-1126, 675 ZA0 WA-1000,; | 0 | 0 | 66 | ; | 2 | 1 | 66 | GC00 XB-2704, 873 YC+13, 325 ZC0 RC-250,; |
| 67 | N067 SA600 SSC600 M03; | 2 | 1 | 67 | SA600 M03; | 0 | 0 | 67 | ; | 2 | 1 | 67 | SSC600 MSC03; |
| 68 | N068 G00 ZA-160, 5 ZC-50, 5; | 2 | 1 | 68 | GA00 ZA-160, 5; | 0 | 0 | 68 | ; | 2 | 0 | 68 | GC01 ZC-50, 5; |
| 69 | N069 GA01 XA-2759, 099 YA-980, 901 FA500; GC01 XB-2559, 099 YC+159, 099 FC500; | 2 | 0 | 69 | GA01 XA-2759, 099 YA-980, 901 FA500; | 0 | 0 | 69 | ; | 2 | 0 | 69 | GC00 XB-2559, 099 YC+159, 099 FC500; |
| 70 | N070 GA02 XA-2759, 099 YA-980, 901 IA159, 099 JA-159, 099 FA500, GC02 XB-2559, 099 YC-159, 099 IB159, 099 JC-159, 099 FC500; | 2 | 0 | 70 | GA02 XA-2759, 099 YA-980, 901 IA159, 901 JA-159, 099 FA500; | 0 | 0 | 70 | ; | 2 | 0 | 70 | GC02 XB-2559, 099 YC-159, 099 IB159, 099 JC-159, 099 FC500; |
| 71 | N071 GA01 XA-2454, 266 YA-835, 127 FA500, GC01 XB-2254, 266 YC+304, 873 FC500; | 2 | 0 | 71 | GA01 XA-2454, 266 YA-835, 127 FA500 | 0 | 0 | 71 | ; | 2 | 0 | 71 | GC01 XB-2254, 266 YC+304, 873, FC500; |
| 72 | N072 GA00 WA0 MA05, GC00 ZC0; | 2 | 0 | 72 | GA00 WA0 MA05; | 0 | 0 | 72 | ; | 2 | 0 | 72 | GC00 ZC0; |
| 73 | N073 GA00 XA0 YA0 ZA0, GC00 XB-3904, 873 YC+13, 325; | 2 | 0 | 73 | GA00 XA0 YA0 ZA0; | 0 | 0 | 73 | ; | 2 | 0 | 73 | GC00 XB-3904, 873 YC+13, 325; |

FIG. 19(h)

| N | PROCESSING PROGRAM | COMMON /GROUP | SIMUL | N, | PROCESSING PROGRAM TO CONTROL GROUP A | COMMON /GROUP | SIMUL | N, | PROCESSING PROGRAM TO CONTROL GROUP B | COMMON /GROUP | SIMUL | N, | PROCESSING PROGRAM TO CONTROL GROUP C |
|---|---|---|---|---|---|---|---|---|---|---|---|---|---|
| 74 | N074 GC00 ZC-50, 5; | 0 | 0 | 74 | ; | 0 | 0 | 74 | ; | 2 | 0 | 74 | GC00 ZC-50, 5; |
| 75 | N075 GC01 XB-3759, 099 YC+159, 099 FC500; | 0 | 0 | 75 | ; | 0 | 0 | 75 | ; | 2 | 0 | 75 | GC01 XB-3759, 099 YC+159, 099 FC500; |
| 76 | N076 GC02 XB-3759, 099 YC+159, 099 IB159, 099 JC-159, 099 FC500; | 0 | 0 | 76 | ; | 0 | 0 | 76 | ; | 2 | 0 | 76 | GC02 XB-3759, 099 YC+159, 099 IB159, 099 JC-159, 099 FC500; |
| 77 | N077 GC01 XB-3454, 226 YC+304, 873 FC500; | 0 | 0 | 77 | ; | 0 | 0 | 77 | ; | 2 | 0 | 77 | GC01 XB-3454, 226 YC+304, 873 FC500; |
| 78 | N078 GC00 ZC0 RC0 MSC05; | 0 | 0 | 78 | ; | 0 | 0 | 78 | ; | 2 | 0 | 78 | GC00 ZC0 RC0 MSC05; |
| 79 | N079 GC00 XB0 YC0; | 0 | 0 | 79 | ; | 0 | 0 | 79 | ; | 2 | 0 | 79 | GC00 XB0 YC0; |
| 80 | N080 TA0303 TC0303 M06; | 2 | 1 | 80 | TA0303 MA06; | 0 | 0 | 80 | ; | 2 | 1 | 80 | TC0303 MC06; |
| 81 | N081 GA00 XA-2600, YA-1140, ZA-150, WA-1000, GC00 XB-2400, YC0 ZC-40, RC-250,; | 2 | 0 | 81 | GA00 XA-2600, YA-1140, ZA-160, WA-1000,; | 0 | 0 | 81 | ; | 2 | 0 | 81 | GC00 XB-2400, YC0 ZC-40, RC-250; |
| 82 | N082 SA1200 SSC1200 M03; | 2 | 1 | 82 | SA1200 MA03; | 0 | 0 | 82 | ; | 2 | 1 | 82 | SSC1200 MSC03; |

FIG. 19(i)

| N | PROCESSING PROGRAM | COMMON /GROUP | SIMUL | N' | PROCESSING PROGRAM TO CONTROL GROUP A | COMMON /GROUP | SIMUL | N' | PROCESSING PROGRAM TO CONTROL GROUP B | COMMON /GROUP | SIMUL | N' | PROCESSING PROGRAM TO CONTROL GROUP C |
|---|---|---|---|---|---|---|---|---|---|---|---|---|---|
| 83 | N083 GA98 GA03 XA-2775 YA-100, ZA-50, R10, Q10, FA150, GC98 GC83 XB-2575, YC0 ZC-50, R10, Q10, FC150; | 2 | 0 | 83 | GA98 GA03 XA-2775, YA-100, ZA-50, R10, Q10, FA150; | 0 | 0 | 83 | ; | 2 | 0 | 83 | GC98 GC83 XB-2575, YC0 ZC-50, R10, Q10, FC150; |
| 84 | N084 GA83 XA-2600, YA-925 GC83 XB-2400, YC+175; | 2 | 0 | 84 | GA83 XA-2600, YA-925; | 0 | 0 | 84 | ; | 2 | 0 | 84 | GC83 XB-2400, YC+175; |
| 85 | N085 GA83 XA-2425, YA-1100, GC83 XB-2225, YC0; | 2 | 0 | 85 | GA83 XA-2425, YA-1100,; | 0 | 0 | 85 | ; | 2 | 0 | 85 | GC83 XB-2225, YC0; |
| 86 | N086 GA83 XA-2600, YA-1275, GC83 XB-2400, YC-175,; | 2 | 0 | 86 | GA83 XA-2600, YA-1275; | 0 | 0 | 86 | ; | 2 | 0 | 86 | GC83 XB-2400, YC-175; |
| 87 | N087 GA80 GA00 XA0 YA0 ZA0 WA0 MA05, GC83 XB-3775, YC0; | 2 | 0 | 87 | GA80 GA00 XA0 YA0 ZA0 WA0 MA05; | 0 | 0 | 87 | ; | 2 | 0 | 87 | GC83 XB-3775, YC0; |
| 88 | NC088 GC83 XB-3600, YC+175; | 0 | 0 | 88 | ; | 0 | 0 | 88 | ; | 2 | 0 | 88 | GC83 XB-3600, YC175; |
| 89 | NC089 GC83 XB-3425, YC0; | 0 | 0 | 89 | ; | 0 | 0 | 89 | ; | 2 | 0 | 89 | GC83 XB-3425, YC0; |
| 90 | NC090 GC83 XB-3600, YC-175; | 0 | 0 | 90 | ; | 0 | 0 | 90 | ; | 2 | 0 | 90 | GC83 XB-3600, YC-175; |
| 91 | NC091 GC80 GC00 XB0 YC0 ZC0 RC0 MSC05; | 0 | 0 | 91 | ; | 0 | 0 | 91 | ; | 2 | 0 | 91 | GC80 GC00 XB0 YC0 ZC0 RC0 MSC05; |

FIG. 19(j)

| N | PROCESSING PROGRAM | COMMON /GROUP | SIMUL | N, | PROCESSING PROGRAM TO CONTROL GROUP A | COMMON /GROUP | SIMUL | N, | PROCESSING PROGRAM TO CONTROL GROUP B | COMMON /GROUP | SIMUL | N, | PROCESSING PROGRAM TO CONTROL GROUP C |
|---|---|---|---|---|---|---|---|---|---|---|---|---|---|
| 92 | N092 TA0404 TC0404 M06; | 2 | 1 | 92 | TA0404 M06; | 0 | 0 | 92 | ; | 2 | 1 | 92 | YC0404 M06; |
| 93 | N093 GA00 XA-2600, YA-1140 ZA-150, WA-1000,; GC00 XB-2400, YC0 ZC-40, RC-250,; | 2 | 0 | 93 | GA00 XA-2600, YA-1140, ZA-160, WA-1000; | 0 | 0 | 93 | ; | 2 | 0 | 93 | GC00 XB-2400, YC0 ZC-40, RC-250; |
| 94 | N094 SA400 SSC400 M03; | 2 | 1 | 94 | SA400 MA03; | 0 | 0 | 94 | ; | 2 | 1 | 94 | SSC400 MSC03; |
| 95 | N095 GA98 GA84 XA-2775, YA-1100, ZA-40, R10, FA500 P0, 5, GC98 GC84 XB-2575, YC0 ZC-40, R10, FC800, P0, 5; | 2 | 0 | 95 | GA98 GA84 XA-2775, YA-1100, ZA-40, R10, FA800, P0, 5; | 0 | 0 | 95 | ; | 2 | 0 | 95 | GC98 GC84 XB-2575, YC0 ZC-40, R10, FC800, P0, 5; |
| 96 | N096 GA84 XA-2600, YA-925, GC84 XB-2400,; YC+175,; | 2 | 0 | 96 | GA84 XA-2600, YA-925,; | 0 | 0 | 96 | ; | 2 | 0 | 96 | GC84 XB-2400, YC+175; |
| 97 | NC097 GA84 XA-2425, YA-1100, GC84 XB-2225, YC0; | 2 | 0 | 97 | GA84 XA-2425, YA-1100; | 0 | 0 | 97 | ; | 2 | 0 | 97 | GC84 XB-2225, YC0; |
| 98 | N098 GA84 XA-2600, YA-1275, GC84 XB-2400, YC-175; | 2 | 0 | 98 | GA84 XA-2600, YA-1275; | 0 | 0 | 98 | ; | 2 | 0 | 98 | GC84 XB-2400, YC-175; |
| 99 | N099 GA80 XA0 YA0 ZA0 WA0 MA05, GC84 XB-3775, YC0; | 2 | 0 | 99 | GA80 XA0 YA0 ZA0 WA0 MA05; | 0 | 0 | 99 | ; | 2 | 0 | 99 | GC84 XB-3775, YC0; |
| 100 | NC100 GC84 XB-3600, YC+175,; | 0 | 0 | 100 | ; | 0 | 0 | 100 | ; | 2 | 0 | 100 | GC84 XB-3600, YC+175; |
| 101 | NC101 GC84 XB-3425, YC0; | 0 | 0 | 101 | ; | 0 | 0 | 101 | ; | 2 | 0 | 101 | GC84 XB-3425, YC0; |

FIG. 19(k)

| N | PROCESSING PROGRAM | COMMON /GROUP | SIMUL | N, | PROCESSING PROGRAM TO CONTROL GROUP A | COMMON /GROUP | SIMUL | N, | PROCESSING PROGRAM TO CONTROL GROUP B | COMMON /GROUP | SIMUL | N, | PROCESSING PROGRAM TO CONTROL GROUP C |
|---|---|---|---|---|---|---|---|---|---|---|---|---|---|
| 102 | NC102 GC84 XB-3600, YC-175,; | 0 | 0 | 102 | ; | 0 | 0 | 102 | ; | 2 | 0 | 102 | GC84 XB-3600, YC-175; |
| 103 | NC103 GC80 GC00 XB0 YC0 ZC0 RC0 MSC05; | 0 | 0 | 103 | ; | 0 | 0 | 103 | ; | 2 | 0 | 103 | GC80 GC00 XB0 YC0 ZC0 RC0 MSC05; |
| 104 | N104 G25; | 1 | 1 | 104 | GA25; | 1 | 1 | 104 | GB25; | 1 | 1 | 104 | GC25; |
| 105 | NC105 TC0505 M06; | 0 | 0 | 105 | ; | 0 | 0 | 105 | ; | 2 | 0 | 105 | TC0505 MC06; |
| 106 | NC106 GC00 XB-2200, YC-900; | 0 | 0 | 106 | ; | 0 | 0 | 106 | ; | 2 | 0 | 106 | GC00 XB-2200, YC-900; |
| 107 | NC107 SSC300 M03; | 0 | 0 | 107 | ; | 0 | 0 | 107 | ; | 2 | 0 | 107 | SSC300 MSC03; |
| 108 | NC108 GC00 RC-1000, ZC-840,; | 0 | 0 | 108 | ; | 0 | 0 | 108 | ; | 2 | 0 | 108 | GC00 RC-1000, ZC-840; |
| 109 | NC109 GC98 GC83 XB-2200, YC-900, ZC-75, R10, Q5, FC50; | 0 | 0 | 109 | ; | 0 | 0 | 109 | ; | 2 | 0 | 109 | GC98 GC83 XB-2200, YC-900, ZC-75, R10, Q5, FC50; |
| 110 | NC110 GC83 XB-3000, YC-900; | 0 | 0 | 110 | ; | 0 | 0 | 110 | ; | 2 | 0 | 110 | GC83 XB-3000, YC-900,; |
| 111 | NC111 GC83 XB-3600, YC-900,; | 0 | 0 | 111 | ; | 0 | 0 | 111 | ; | 2 | 0 | 111 | GC83 XB-3600, YC-900,; |
| 112 | NC112 GC80 GC00 ZC0 RC0; | 0 | 0 | 112 | ; | 0 | 0 | 112 | ; | 2 | 0 | 112 | GC80 GC00 ZC0 RC0; |
| 113 | NC113 GC00 YC+900, XB-2200,; | 0 | 0 | 113 | ; | 0 | 0 | 113 | ; | 2 | 0 | 113 | GC00 YC+900, XB-2200,; |

FIG. 19(1)

| N | PROCESSING PROGRAM | COMMON /GROUP | SIMUL | N | PROCESSING PROGRAM TO CONTROL GROUP A | COMMON /GROUP | SIMUL | N | PROCESSING PROGRAM TO CONTROL GROUP B | COMMON /GROUP | SIMUL | N | PROCESSING PROGRAM TO CONTROL GROUP C |
|---|---|---|---|---|---|---|---|---|---|---|---|---|---|
| 114 | NC114 GC00 RC-1000, ZC-840,; | 0 | 0 | 114 | ; | 0 | 0 | 114 | ; | 2 | 0 | 114 | GC00 RC-1000, ZC-840,; |
| 115 | NC115 GC98 GC83 XB-2200, YC+900, ZC-75, R10, Q5, FC50; | 0 | 0 | 115 | ; | 0 | 0 | 115 | ; | 2 | 0 | 115 | GC98 GC83 XB-2200, YC+900, ZC-75, R10, Q5, FC50; |
| 116 | NC116 GC83 XB-3000, YC+900; | 0 | 0 | 116 | ; | 0 | 0 | 116 | ; | 2 | 0 | 116 | GC83 XB-3000, YC+900,; |
| 117 | NC117 GC83 XB-3600, YC+900; | 0 | 0 | 117 | ; | 0 | 0 | 117 | ; | 2 | 0 | 117 | GC83 XB-3600, YC+900; |
| 118 | NC118 GC80 GC00 ZC0 RC0 MSC05; | 0 | 0 | 118 | ; | 0 | 0 | 118 | ; | 2 | 0 | 118 | GC80 GC00 ZC0 RC0 MSC05; |
| 119 | NC119 GC00 XB0 YC0; | 0 | 0 | 119 | ; | 0 | 0 | 119 | ; | 2 | 0 | 119 | GC00 XB0 YC0; |
| 120 | NC120 WBC85; | 0 | 0 | 120 | ; | 0 | 0 | 120 | ; | 2 | 0 | 120 | WBC85; |
| 121 | NC121 GC00 BC+90; | 0 | 0 | 121 | ; | 0 | 0 | 121 | ; | 2 | 0 | 121 | GC00 BC+90,; |
| 122 | NC122 WBC84; | 0 | 0 | 122 | ; | 0 | 0 | 122 | ; | 2 | 0 | 122 | WBC84; |
| 123 | N123 G28; | 1 | 1 | 123 | GA28; | 1 | 1 | 123 | GB28; | 1 | 1 | 123 | GC28; |
| 124 | N124 TA0505 TB0505 M06; | 1 | 1 | 124 | TA0505 MA06; | 1 | 1 | 124 | TB0505 MB06; | 0 | 0 | 124 | ; |
| 125 | N125 G00 XA-2325, YA-1140, ZA0 WA-750, XB-2325, YB-1140, ZB0 WB-750; | 2 | 1 | 125 | GA00 XA-2325, YA-1140, ZA0 WA-750,; | 2 | 1 | 125 | GB00 XB-2325, YB-1140, ZB0 WB-750,; | 0 | 0 | 125 | ; |
| 126 | N126 SA100 SSB1000 M03; | 2 | 1 | 126 | SA1000 MA03; | 2 | 1 | 126 | SSB1000 MSB03; | 0 | 0 | 126 | ; |

FIG. 19(m)

| N | PROCESSING PROGRAM | COMMON /GROUP SIMUL | N, | PROCESSING PROGRAM TO CONTROL GROUP A | COMMON /GROUP SIMUL | N, | PROCESSING PROGRAM TO CONTROL GROUP B | COMMON /GROUP SIMUL | N, | PROCESSING PROGRAM TO CONTROL GROUP C |
|---|---|---|---|---|---|---|---|---|---|---|
| 127 | N127 GA98 GA83 XA-2325, YA-1140, ZA-60, R10, Q10, FA125, GB98 GB83 XB-2325, YB-1140, ZB-60, R10, Q10, FB125; | 2 | 0 | 127 | GA98 GA83 XA-2325, YA-1140, ZA60, R10, Q10, FA125, | 2 | 0 | 127 | GB98 GB83 XB-2325, YB-1140, ZB-60, R10, Q10, FB125; | 0 | 0 | 127 | ; |
| 128 | N128 GA83 XA-2522, 703 YA-662, 703 GB83 XB-2522, 703 YB-662, 703; | 2 | 0 | 128 | GA83 XA-2522, 703 YA-662, 703; | 2 | 0 | 128 | GB83, XB-2522, 703 YB-662, 703; | 2 | 0 | 128 | ; |
| 129 | N129 GA83 XA-3000, YA-465, GB83 XB-3000, YB-465,; | 2 | 0 | 129 | GA83 XA-3000, YA-465,; | 2 | 0 | 129 | GB83 XB-3000, YB-465,; | 0 | 0 | 129 | ; |
| 130 | N130 GA83 XA-3477, 297 YA-662, 703 GB83 XB-3477, 297 YB-662, 703; | 2 | 0 | 130 | GA83 XA-3477, 297 YA-662, 703; | 2 | 0 | 130 | GB83 XB-3477, 297 YA-662, 703; | 0 | 0 | 130 | ; |
| 131 | N131 GA83 XA-3675, YA-1140, GB83 XB-3675, YB-1140,; | 2 | 0 | 131 | GA83 XA-3675, YA-1140,; | 2 | 0 | 131 | GB83 XB-3675 YB-1140,; | 0 | 0 | 131 | ; |
| 132 | N132 GA83 XA-3477, 297 YA-1817, 297 GB83 XB-3477, 297 YB-1817, 297; | 2 | 0 | 132 | GA83 XA-3477, 297, YA-1817, 297; | 2 | 0 | 132 | GB83 XB-3477, 297 YB-1817, 297; | 0 | 0 | 132 | ; |

FIG. 19(n)

| N | PROCESSING PROGRAM | COMMON /GROUP | SIMUL | N' | PROCESSING PROGRAM TO CONTROL GROUP A | COMMON /GROUP | SIMUL | N' | PROCESSING PROGRAM TO CONTROL GROUP B | COMMON /GROUP | SIMUL | N' | PROCESSING PROGRAM TO CONTROL GROUP C |
|---|---|---|---|---|---|---|---|---|---|---|---|---|---|
| 133 | N133 GA83 XA-3000, YA-1815, GB83 XB-3000, YB-1818,; | 2 | 0 | 133 | GA83 XA-3000, YA-1815,; | 2 | 0 | 133 | GB83 XB-3000, YB-1818,; | 0 | 0 | 133 | ; |
| 134 | N134 GA83 XA-2522, 703 YA-1817, 297, GB83 XB-2522, 703 YB-1817, 297; | 2 | 0 | 134 | GA83 XA-2522, 703 YA-1817, 297; | 2 | 0 | 134 | GB83 XB-2522, 703 YB-1817, 297; | 0 | 0 | 134 | ; |
| 135 | N135 G80 G00 ZA0 WA0 ZB0 WB0 M05; | 2 | 1 | 135 | GA80 GA00 ZA0 WA0 MA05; | 2 | 1 | 135 | GB80 GB00 ZB0 WB0 MB05; | 0 | 0 | 135 | ; |
| 136 | N136 G00 XA0 YA0 XB0 YB0; | 2 | 1 | 136 | GA00 XA0 YA0; | 2 | 1 | 136 | GB00 XB0 YB0; | 0 | 0 | 136 | ; |
| 137 | N137 TA0606 TB0606 M06; | 2 | 1 | 137 | TA0606 MA06; | 2 | 1 | 137 | TB0606 MB06; | 0 | 0 | 137 | ; |
| 138 | N138 G00 XA-2325, YA-1140, ZA0 WA-750, XB-2325, YB-1140, ZB0 WB-750,; | 2 | 1 | 138 | GA00 XA-2325, YA-1140, ZA0 WA-750,; | 2 | 1 | 138 | GB00 XB-2325, YB-1140, ZB0 WB-750,; | 0 | 0 | 138 | ; |
| 139 | N139 SA320 SSB320 M03; | 2 | 1 | 139 | SA320 MA03; | 2 | 1 | 139 | SSB320 MSB03; | 0 | 0 | 139 | ; |
| 140 | N140 GA98 GA84 XA-2325, YA-1140, ZA-50, R10, FA800, P0, 5, GB98 GB84 XB-2325, YB-1140, ZB-50, R10, FB800, P0, 5; | 2 | 0 | 140 | GA98 GA84 XA-2325, YA-1140, ZA-50, R10, FA800, P0, 5; | 2 | 0 | 140 | GB98 GB84 XB-2325, YB-1140, ZB-50, R10, FB800, P0, 5; | 0 | 0 | 140 | ; |
| 141 | N141 GA84 XA-2522, 703 YA-662, 703 GB84 XB-2522, 703 YB-662, 703; | 2 | 0 | 141 | GA84 XA-2522, 703 YA-662, 703; | 2 | 0 | 141 | GB84 XB-2522, 703 YB-662, 703; | 0 | 0 | 141 | ; |

FIG. 19(o)

| N | PROCESSING PROGRAM | COMMON /GROUP SIMUL | N | PROCESSING PROGRAM TO CONTROL GROUP A | COMMON /GROUP SIMUL | N | PROCESSING PROGRAM TO CONTROL GROUP B | COMMON /GROUP SIMUL | N | PROCESSING PROGRAM TO CONTROL GROUP C |
|---|---|---|---|---|---|---|---|---|---|---|
| 142 | N142 GA84 XA-3000, YA-465, GB84 XB-3000, YB-465,; | 2 | 0 | 142 | GA84 XA-3000, YA-465,; | 2 | 0 | 142 | GB84 XB-3000, YB-465,; | 0 | 0 | 142 | ; |
| 143 | N143 GA84 XA-3477, 297 YA-662, 703, GB84 XB-3477, 297 YB-662, 703,; | 2 | 0 | 143 | GA84 XA-3477, 297 YA-662, 703,; | 2 | 0 | 143 | GB84 XB-3477, 297 YB-662, 703,; | 0 | 0 | 143 | ; |
| 144 | N144 GA84 XA-3675, YA-1140 GB83 XB-3675, YB-1140,; | 2 | 0 | 144 | GA84 XA-3675, YA-1140,; | 2 | 0 | 144 | GB84 XB-3675, YB-1140,; | 0 | 0 | 144 | ; |
| 145 | N145 GA84 XA-3477, 297 YA-1817, 297, GB84 XB-3477, 207 YB-1817, 207; | 2 | 0 | 145 | GA84 XA-3477, 297 YA-1817, 297; | 2 | 0 | 145 | GB84 XB-3477, 207 YB-1817, 207; | 0 | 0 | 145 | ; |
| 146 | N146 GA84 XA-3000, YA-1815, GB84, XB-3000, YB-1815,; | 2 | 0 | 146 | GA84 XA-3000, YA-1815,; | 2 | 0 | 146 | GB84 XB-3000, YB-1815,; | 0 | 0 | 146 | ; |
| 147 | N147 GA84 XA-2522, 703 YA-1817, 297, GB84 XB-2522, 703 YB-1817, 297; | 2 | 0 | 147 | GA84 XA-2522, 703 YA-1817, 297; | 2 | 0 | 147 | GB84 XB-2522, 703 YB-1817, 297; | 0 | 0 | 147 | ; |
| 148 | N148 G80 G00 ZA0 WA0 ZB0 WB0 M05; | 2 | 0 | 148 | GA80 GA00 ZA0 WA0 MA05; | 2 | 1 | 148 | GB80 GB00 ZB0 WB0 MB05; | 0 | 0 | 148 | ; |
| 149 | N149 G28; | 2 | 1 | 149 | GA28; | 2 | 1 | 149 | GB28; | 2 | 1 | 149 | GC28; |
| 150 | N150 TA0000 TB0000 TC0000 M06; | 2 | 1 | 150 | TA0000 MA06; | 2 | 1 | 150 | TB0000 MB06; | 2 | 1 | 150 | TC0000 MC06; |
| 151 | N151 M30; | 2 | 1 | 151 | MA30; | 2 | 1 | 151 | MB30; | 2 | 1 | 151 | MC30; |

PRIOR ART

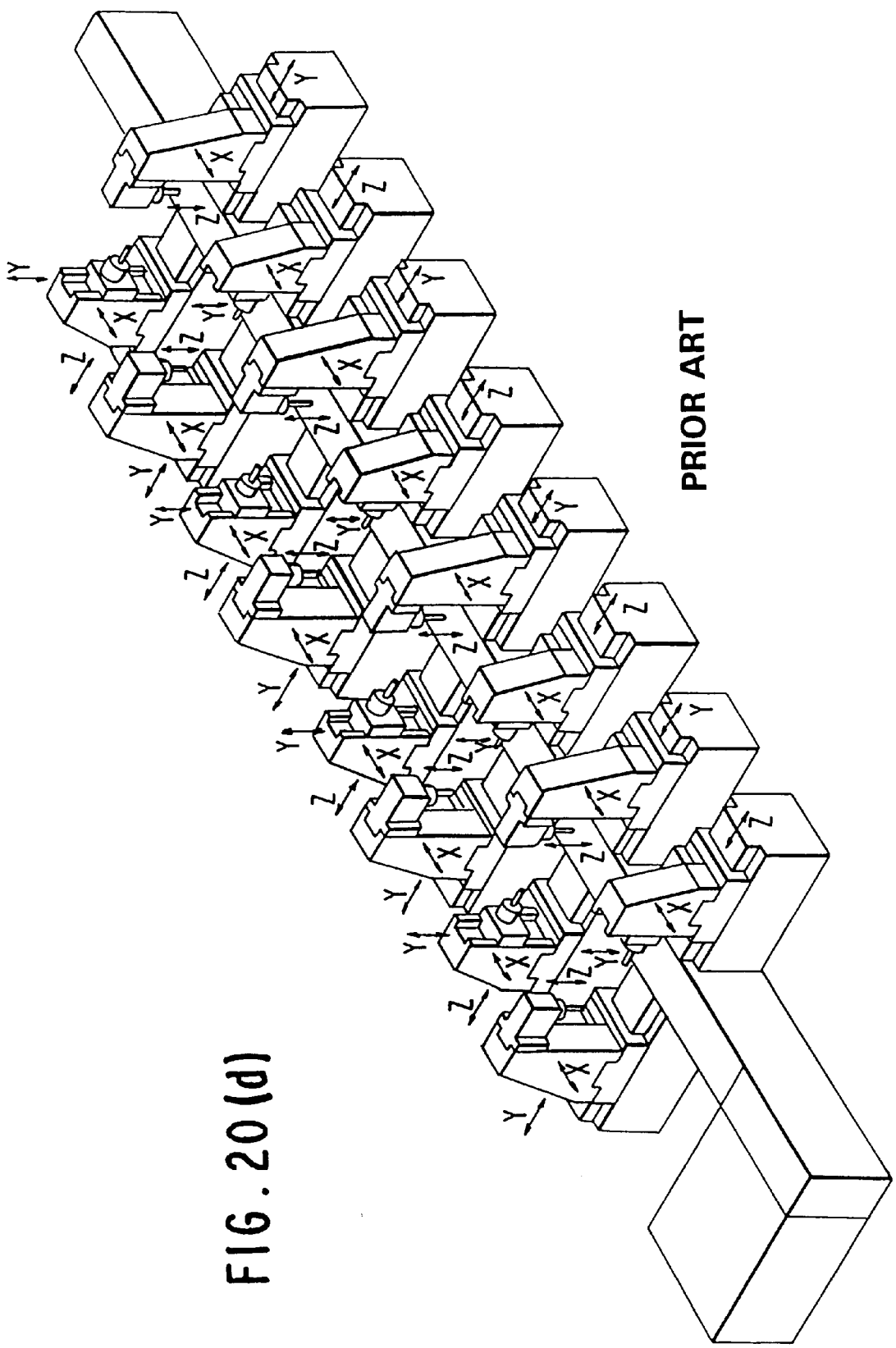

FIGURE 22(a)
PRIOR ART

```
A FACE; FOOTSIDE FACE MILLING
C FACE; FRAME SIDE FACE MILLING
--------------------------------
0001;
N001  G28;
N002  G90 X0 Y0 Z0 W0 A0 B0;
N003  T0101 M06;
N004  G00 X-3000, Y-1090, Z0 R-1000, W-950,;
N005  S400 M03;
N006  G00 X-4070, Y-1870, Z-50,;
N007  G01 X-3250, F500;
N008  G00 W-900,;
N009  G00 X-2750,;
N010  G01 W-950, F150,;
N011  G01 X-1930, F500;
N012  G00 Z0 W0 M05;
N013  G00 X0 Y0;
N014  T0202 M06;
N015  S600 M03;
N016  G00 X-4070, Y-1870, Z-50, W-950,;
N017  G01 X-3250, F500;
N018  G00 W-900,;
N019  G00 X-2750,;
N020  G00 W-945,;
N021  G01 W-950, F150,;
N022  G01 X-1980, F500;
N023  G00 Z0 W0 M05;
N024  G00 X0 Y0;
N025  T0101, M06;
N026  G00 X-3780, 838 Y-918, 886 Z0 W-950,;
N027  S400 M03;
N028  G17;
N029  G00 Z-50,;
N030  G01 X-3404, 975 Y-866, 139 F500;
N031  G02 X-3494, 975 Y-866, 139 I484, 975 J-494, 975 F500;
N032  G01 X-3221, 114 Y-592, 278 F500;
```

B FACE; FOOTSIDE FACE MILLING
D FACE; FRAME SIDE FACE MILLING
---------------------------------

TABLE - TURN FOR 90
--------------------
;
0301;
N001  G28;
N002  G90 X0 Q0 W0 V0 P0 B0;
N003  M85;
N004  G00 B-90,;
N005  M84;
N006  M02;

G FACE; FLANGE FACE MILLING
---------------------------
;
0002;
N001  G20;
N002  G90 X0 Y0 Z0 R0 W0 A0 B0;
N003  T0101 M06;
N004  G00 X-2904, 873 Y-1126, 875 Z0 R-1000, W-1000,;
N005  S400 M03;
N006  G17;
N007  G00 Z-160,;
N008  G01 X-2759, 099 Y-980, 901 F500;
N009  G02 X-2759, 099 Y-980, 901 I159, 099 J-159, 099 F500;
N010  G01 X-2454, 266 Y-835, 127 F500;
N011  G00 W0 M06;
N012  G00 X0 Y0 Z0;
N013  T0202 M06;
N014  G00 X-2904, 873 Y-1126, 676 Z0 W-1000,;
N015  S600 M03;
N016  G00 Z-160, 5;
N017  G01 X-2759, 099 Y-980, 901 F500;
N018  G02 X-2759, 099 Y-980, 901 I159, 099 J-159, 099 F500;
N019  G01 X-2454, 226 Y-836, 127 F500;
N020  G00 W0 M05;
N021  G00 X0 Y0 Z0 R0;
N022  M02;

FIGURE 22(f)
PRIOR ART

E FACE; FLANGE FACE MILLING
--------------------------------
;
0302;
M001  G28;
N002  G90 X0 Q0 W0 V0 P0;
N003  T0101 M06;
N004  G00 X-2704, 873 W+13, 325 V0 Q-250, 0;
N005  S400 M03;
N006  G18;
N007  G00 V-50,;
N008  G01 X-2559, 099 W+159, 099 F500;
N009  G02 X-2559, 099 W+159, 099 I159, 099 K-159, 099 F500
N010  G01 X-2254, 266 W+304, 873 F500;
N011  G00 V0;
N012  G00 X-3904, 873 W+13, 325;
N013  G00 V-50,;
N014  G01 X-3759, 099 W+159, 099 F500;
N015  G02 X-3759, 099 W+159, 099 I159, 099 K-159, 099 F500;
N016  G01 X-3454, 226 W+304, 173 F500;
N017  G00 V0 Q0 M05;
N018  G00 X0 W0;
N019  T0202 M06;
N020  G00 X-2704, 873 W+13, 325 Q-250, 0;
N021  S600 M03;
N022  G00 V-50, 5;
N023  G01 X-2558, 099 W+159, 099 F500;
N024  G02 X-2559, 099 W+159, 099 I159, 099 K-159, 099 F500;
N025  G01 X-2254, 266 W+304, 873 F500;
N026  G00 V0;
N027  G00 X-3904, 873 W+13, 325;
N028  G00 V-50, 5;
N029  G01 X-3750, 099 W+159, 099 F500;
N030  G02 X-3750, 099 W+150, 099 I159, 099 K-159, 099 F500;
N031  G01 X-3454, 226 W+304, 873 F500;
N032  G00 V0 Q0 M05;
N033  G00 X0 W0;
N034  M02;

FIGURE 22(g)
PRIOR ART

J THREADED HOLE DRILLING, PROCESSING
----------------------------------------
;
O003;
N001  G28;
N002  G90 X0 Y0 Z0 R0 W0 A0 B0;
N003  T0303 M06;
N004  G00 X-2600, Y-1140, Z-160, W-1000,;
N005  S1200 M03;
N006  G98 G83 X-2775, Y-1100, Z-50, R10, Q10, F150;
N007  G83 X-2600, Y-925;
N008  G83 X-2425, Y1100,;
N009  G83 X-2600, Y-1275,;
N010  G80 G00 X0 Y0 Z0 W0 M05;
N011  T0404 M06;
N012  G00 X-2600, Y-1140, Z-150, W-1000,;
N013  S400 M03;
N014  G98 G84 X-2775, Y-1100, Z-40, R10 F500 P0, 5;
N015  G84 X-2600, Y-925,;
N016  G84 X-2425, Y-1100,;
N017  G84 X-2600, Y-1275,;
N018  G90 G00 X0 Y0 Z0 W0 M05;
N019  M02;

FIGURE 22(h)
PRIOR ART

K, L THREADED HOLE DRILLING, PROCESSING
-----------------------------------------
;
O303;
N001 G28;
N002 G90 X0 Q0 W0 V0 P0;
N003 T0303 M06;
N004 G00 X-2400, W0 V-40, Q-250,;
N005 S1200 M03;
N006 G98 G83 X-2575, W0 V-50, R10, Q10, F150;
N007 G83 X-2400, W+175,;
N008 G83 X-2225, W0;
N009 G83 X-2400, W-175,;
N010 G90 X-3775, W0;
N011 G83 X-3600, W+175,;
N012 G83 X-3425, W0;
N013 G83 X-3600, W-175,;
N014 G80 G00 X0 Q0 W0 V0 M05;
N015 T0404 M06;
N016 G00 X-2400, W0 V-40, Q-250,;
N017 S400 M03;
N018 G98 G84 X-2575, W0 V-40, R10, F500 P0, 5;
N019 G84 X-2400, W+175,;
N020 G84 X-2225, W0;
N021 G84 X-2400, W+175,;
N022 G84 X-3775, W0;
N023 G84 X-3600, W+175,;
N024 G84 X-3425, W0;
N025 G84 X-3600, W-175,;
N026 G80 G00 X0 Q0 W0 V0 M05;
N027 M02;

FIGURE 22(i)
PRIOR ART

```
L,M BOLT HOLE DRILLING
----------------------
;
0304;
N001  G28;
N002  G90 X0 Q0 W0 V0 P0;
N003  T0505 M06;
N004  G00 X-2200, W-900,;
N005  S300 M03;
N006  G00 R-1000, V-840,;
N007  G98 G83 X-2200, W-900, V-75, R10, Q0, F50;
N008  G83 X-3000, W-900,;
N009  G83 X-3600, W-900,;
N010  G80 G00 W0 V0;
N011  G00 W+900, X-2200,;
N012  G00 R-1000, V-840,;
N013  G98 G83 X-2200, W+900, V-75, R1-, Q5, F50;
N014  G83 X-3000, W+900,;
N015  G83 X-3600, W+900,;
N016  G80 G00 R0 V0 M05;
N017  G00 X0 W0;
N018  T0000 M06;
N019 M02;

TABLE + TURN FOR 90
-------------------
;
0305;
N001  G28;
N002  G90 X0 Q0 W0 V0 P0 B0;
N003  M85;
N004  G00 B+90,;
N005  M84;
N006  M02;
```

TABLE FOR PROCESSING PROCEDURES FOR PLC

| SYSTEM TO BE CONTROLLED / PROCESSING PROCEDURES | 1 | 2 | 3 | COMMENT |
|---|---|---|---|---|
| N1 | 001 | 201 | -- | SIMULTANEOUS START |
| N2 | -- | -- | 301 | |
| N3 | 002 | -- | 302 | SIMULTANEOUS START |
| N4 | 003 | -- | 303 | SIMULTANEOUS START |
| N5 | -- | -- | 304 | |
| N6 | -- | -- | 305 | |
| N7 | 004 | 202 | | SIMULTANEOUS START |
| N8 | END | | | |

NUMERICAL CONTROLLER HAVING EXPANDED CONTROL WORD SET

This is a Continuation of application Ser. No. 08/037,526 filed Mar. 22, 1993, which is a Continuation of application Ser. No. 07/542,609 filed Jun. 25, 1990.

BACKGROUND OF THE INVENTION

1. Industrial Field

The present invention relates to improvements in numerical controllers, particularly as to the input format and control schema of a numerical controller which controls machine tools, robots, lasers, welding machines, wood working machines, etc.

More particularly, the present invention represents both a refinement and redefinition of the control language which has traditionally been employed in numerical controller in the recent years. The new control language retains as much of the original standard language as possible, but expands the functionality of the previous standard primarily through the addition of subwords which may be specific to a particular group of machine elements which will be controlled, or to a particular dimension, for example. Through the expanded control language and the implementing hardware and software described herein, the functionality of the traditional numerical controller is dramatically increased, making it unnecessary to provide plural numerical controllers for complex machining centers as was routinely done in the past.

2. Prior Art

With respect to the tape input format used for numerically controlled machine tools, there are two commonly employed standards. The JIS B6312—"Punched Tape Variable Block Format for Numerically Controlled Machine Tools (for Control of Positioning and Straight-Cutting)", and the JIS B6313—"Punched Tape Format for Numerically Controlled Machine Tools (for Contouring Control and Contouring/Positioning Control)" are these two well known standards. "JIS" is an abbreviation for "Japanese Industrial Standard"

As provided for in the JIS standards, all of the alphabetic characters with the exception of capital letters O, H, and L are used to define particular functions, prescribed generally as follows:

(1) Linear dimension words: X, Y, Z, U, V, W, P, Q, R
(2) Interpolation parameters: I, J, K
(3) Angular dimensions: A, B, C, D, E
(4) Feed function: F (D and E were sometimes also used for this function if not needed as angular dimension words)
(5) Preparatory function: G
(6) Miscellaneous function: M
(7) Sequence number: N
(8) Spindle-speed function: S
(9) Tool function: T The convention provided by the JIS standards yields the following definitional or functional ranges: for the linear coordinate systems; 9 axes (XYZ, UVW, PQR); for rotary coordinate systems; 5 axes (A, B, C, D, E); feed speed function, 1 variable (F); main spindle; one main spindle head; tools, one main spindle head tool; preparatory function, 1 variable (G); and sequence number, (N). As noted, O, H, L are not set by standard, though in practice they are used by manufacturers to represent various parameters, e.g., as follows:

O—program number
H—offset
L—number of repetitions

In the years since these standards were created, the machines and equipment that are to be controlled have become increasingly complex and multi-functional, outstripping the capabilities of the present control language and standards For example, machining centers now in use commonly employ more than 9 axes along which linear movement can be specified The present industry standards have substantial drawbacks in that special measures have to be taken to allow the existing conventions to be used with the more complex machines.

A description will be given of such drawbacks by referring to, for example, FIGS. 20(*a*), 20(*b*) and 20(*c*).

FIGS. 20(*a*) and 20(*b*) illustrate a complex machining center FIG. 20(*c*) is a schematic diagram of a control system for controlling this complex machining center.

The complex machining center comprises a front column 1, a rear column 2, and a work table 3. The front column 1 requires nine control axes, while the rear column 2 requires eight control axes. These are described below with the pertinent control axis specified in parentheses. First, in the front column 1 there is a column traveling section 11 (X-axis); a column traversing section 12 (R-axis); a front head vertical movement section 13 (Y-axis); a front head ram traversing section 14 (W-axis); a front head quill traversing section 15 (Z-axis); a front head tilting head 16 (A-axis, B'-axis); a swiveling section 18 (C-axis) for the front head vertical unit 17; and a main spindle swivel shaft 19 (D-axis).

The rear column's eight control axes include a column traveling section 21 (X'-axis); a side head vertical movement section 24 (Y'-axis); a side head ram traversing section 22 (W'-axis); a side head quill traversing section 23 (Z'-axis); a main spindle swiveling section 103 (C'-axis); a cantilever beam vertical movement section 25 (Q-axis); a beam upper head traversing section 26 (W"-axis); and a beam head quill vertical movement section 27 (V-axis).

The work table 3 itself requires two control axes including a slide section 31 (P-axis) and a swiveling table section 32 (B-axis) on a bed section 33.

If the necessary control axes for this machine are compiled, it will be seen that 13 linear control axes are required, including X, Y, Z, R, W, X', Y+, Z', W', Q, V, W", and P, while the angular dimensions that must be specified require six control axes including A, B, B', C, C' and D.

Main spindles are provided at three locations; i.e., there are provided a front column spindle (first main spindle) 100, a rear column side head spindle (second main spindle) 102, and a rear column beam head spindle (third main spindle) 103. A first sub-main spindle 101 placed at the tip of the first main spindle is included with the first main spindle 100.

Furthermore, in this system there are other coordinate words and coordinate systems requiring the designation of rotational speed, and in this example these are necessary for the synthesis of circular motion between B, C, D, C' on the one hand, and XY, XZ (XW), (XR), YZ (YW), (YR), X'Y', (X'W"), and the like on the other. By way of explanation, "synthetic circular motion" indicates the independent control of two axes, for example, the X-axis and the Y-axis, so that the composite movement along these two axes describes circular motion. The axis combinations in parenthesis above indicate composite circular motion among axes which are not in the same coordinate system. It was not possible to easily specify the rotary speed of such composite circular motion in the prior art.

As for feed (speed) function control words, at least the following four feed control words are required in the particular system of FIG. 20: F for the first main spindle 100 and the first sub-main spindle; E for the second main spindle 102; E' for the third main spindle 103; and F' for the work table 1. Furthermore, three feed function words are necessary for distinguishing between a rotational feed value and a straight feed value. If feed function words could be allotted to the individual moving parts so as to correspond to the respective coordinate words of a program, there would be an advantage in simplifying the program. However, this arrangement is impossible under the present system.

As for the preparatory function (G), if simultaneous control, independent control or the like are to be required of the three main spindles and one table of this example, one function word is insufficient and at least three function words are necessary.

As for the miscellaneous functions M, if simultaneous control, independent control or the like are to be required of the three main spindles and one table of this example, one function word is insufficient and at least three function words are necessary.

The same is true for the sequence number function word N. It would be helpful in the case of the sequence number in particular to be able to distinguish on the basis of the function word the particular device on which the sequence instruction will be performed.

This is generally true of the tool function as well. That is, with the tool function, it is insufficient to classify the function using one function word when coping with three main spindles and one sub-main spindle as in the present example; at least three function words are necessary.

As a method of coping with situations such as those described above, a system has conventionally been adopted in which, as shown in FIG. 20(c), operations are effected by preparing separate processing programs, just as if there were three different machine tools, using three numerical controllers 115-1, 115-2, 115-3 and a supervisory programmable logic controller (hereinafter "PLC") 110.

In FIG. 20(c), the PLC 110 is arranged in such a manner as to control the three numerical controllers 115-1, 115-2, 115-3 using a PLC program, and outputs instructions which designate and start the processing of programs in the numerical controllers, the numerical controllers outputting a PLC completion signal when the operation of a corresponding program is completed.

Necessary programs are individually written for and input to the numerical controllers 115-1, 115-2, 115-3 by input devices 116-1, 116-2, 116-3 such as paper tape readers.

The numerical controllers 115-1, 115-2, 115-3 supply control outputs to a group of servo motor/detector systems 120, 130, 140 via cables 117-1, 117-2, 117-3, while, conversely, feedback signals are input via the cables 117-1, 117-2, 117-3.

The arrangement is thus such that control outputs are supplied to main spindle motor/detector systems 121, 131, 141 by the numerical controllers 115-1, 115-2, 115-3 via cables 117-1, 117-2, 117-3, while feedback signals are supplied reversely through the cables to the numerical controllers 115-1, 115-2, 115-3.

An example of the operation of the prior art system will now be described, with respect to the processing of a complex workpiece shown in FIGS. 4(a) and 4(b), including the cutting of faces A, B, C, D, E, F, and G, and the processing of a group of threaded holes H, I, J, K, and L and a group of bolt holes M and N. Processing procedures are first determined by calculating coordinates on the basis of the machine-related stroke table and diagrams shown in FIGS. 5(a) to 5(d) and detailed dimensional drawings of the workpiece as shown in FIGS. 4(c) to 4(f). Then, machining programs are written to accomplish the various necessary tasks. An example of such programming is seen in FIG. 22, where the instruction sequences are shown at left and the comments on the right explain the procedures being undertaken.

As shown in FIG. 22, the processing programs are broken down into the following 11 portions, which may be further classified according to the machine (i.e., the column or group) which will be controlled by the program. For the first column 1, there are programs No. 0001 (leg end machining for face A, frame end machining for face C), No. 0002 (flange machining for face G), No. 0003 (boring of threaded hole J) and No. 0004 (boring of threaded hole H). For the second column 2, there are programs No. 0201 (leg end machining for face B, frame end machining for face D) and No. 0202 (boring of threaded hole I); for the third group, there are programs No. 0301 (−90° swiveling of the table), No. 0302 (flange machining for faces E, F), No. 0303 (boring of threaded holes K, L), No. 0304 (boring of bolt holes L, M) and No. 0305 (+90° swiveling of the table).

In order to effect processing in such a manner that compatible processes can proceed simultaneously with no interference caused between column groups, the three numerical controllers 115-1, 115-2, 115-3 in FIG. 20(c) are controlled by the PLC 110 in FIG. 20(c) in accordance with a table of processing procedures shown in FIG. 23. That is, a program is prepared for the PLC which includes a first step N1 instructing the simultaneous starting of programs 0001 and 0201, a second step N2 instructing the independent starting of program 0301, a third step N3 instructing the simultaneous starting of 0002 and 0302, a fourth step N4 for the simultaneous starting of 0003 and 0303, a fifth step N5 for the independent starting of program 0304, a sixth step N6 instructing the independent starting of program 0305, and a seventh step N7 for the simultaneous starting of programs 0004 and 0202. The numerical controllers 115-1, 115-2, 115-3 in FIG. 20(c) are thus conventionally operated, basically independently, but with PLC coordination in accordance with the flowchart shown in FIG. 24 so as to effect the processing of the workpiece.

The processing will be generally described with reference to this flowchart.

Processing is started in Step 0. In Step 1, the 11 processing programs necessary for the respective groups are input using input devices 116-1, 116-2, 116-3 in FIG. 20(c). The programs are manually allotted to the respective numerical controllers 115-1, 115-2, 115-3 by the operator and are stored in memory sections (not illustrated) inside the respective numerical controllers. Then, in Step 2, the PLC program is read by the PLC 110. Once this processing is completed, the machine tool can be operated at any time. After the workpiece and the tools and the like are mounted in place, a PLC cycle start button is pressed in Step 3. In Step 4, the PLC sequence is set to N=1, and the operation of the PLC program is commenced in Step 5 by reading PLC sequence No. N. In this example, (FIG. 23) N will range from 1 to 8.

In Step 6, the contents of the program are checked, and a determination is made as to whether or not the end of the program, i.e., the end of machining operations, has been reached. If a determination is made that the end has not been reached, the operation proceeds to Step 7 in which instructions are given to the numerical controllers 115-1, 115-2, 115-3 in FIG. 20(c) of each group to start the execution of the designated processing program(s) at sequence number N of the PLC program.

As a result, the numerical controllers 115-1, 115-2, 115-3 in FIG. 20(c) effect arithmetic processing, supply control signals and power corresponding to movement instruction values to the servo motor/detector groups 120, 130, 140 in FIG. 20(c), and commence the operation of the complex machining center (FIGS. 20(a) and 20(b)), and conversely receive feedback signals. As the operation proceeds, the workpiece begins to be processed. A determination is made in Step 8 as to whether or not all of the current operations of the respective groups are completed, and if not, the operation returns to Step 8 via route 81 to repeat the discrimination. When the current processing is complete, the operation proceeds to Step 9 in which the PLC program sequence is incremented by one (N=N+1), and the operation returns to Step 5 via route 91. Steps 5 to 9 are thus repeatedly sequentially executed to carry out processing of the workpiece as indicated generally in FIG. 23 and specifically in FIG. 22.

If it is determined in Step 6 that the operation has come to an end, end processing is carried out in Step 10 via route 61.

Because the various processing programs were designed in the prior art for use with respective numerical controllers and machines, as in this example, it was difficult to synchronously control any plurality of the four main systems, i.e., the first, second, and third main spindles 121, 131, 141 in FIG. 20(c) and the table, by means of the numerical controllers 115-1, 115-2, 115-3 in FIG. 20(c). Moreover, there existed a large risk of collision, control was very complicated, and complex machining was very difficult unless the systems were controlled sequentially (which is slow) or unless the processing programs and PLC control programs were carefully prepared using a time chart or the like when any of the spindle systems were to be used simultaneously.

In addition, when the processing programs were to be read by the numerical controllers 115-1, 115-2, 115-3 in FIG. 20(c), inputting was effected separately using the three input devices 116-1, 116-2, 116-3. When there were erroneous inputs of the processing programs, for example, the operator loading the wrong program in one of the controllers, there was no method to discriminate such errors since the dimension format for each controller was identical. Although discriminating characters (i.e., labels) can be punched directly on the program paper tape so as to be discerned to some extent by the operator to partially eliminate this risk, there are limitations on the reliability of such discrimination by the operator.

As other prior art examples, in the control of a work transfer-type multi-stage machine tool as shown in FIG. 20(d), such as a transfer machine, systems have been used having one of the control forms shown in FIGS. 21(a) to 21(e), (described below), so that line processing can be effected. In line processing, all the workpiece processing is completed while the workpiece is located between the entrance of the machining center (FIG. 20(d)) and the exit thereof.

Specifically, such systems have a system configuration allowing the processing programs to be read and stored via various input devices using various storage media in the numerical controllers (represented by numerals 3 in FIG. 21). In FIG. 21(a), the processing of the workpiece is effected while the respective processing units (represented by numerals 2 in FIG. 21) are being controlled on the basis of paper tape programs (not shown) separately read by input devices such as tape readers 4 for the respective units 2 and data input to the numerical controllers 3. In FIG. 21(b), paper tape programs (not shown) are read by input devices such as tape readers 4 for the respective processing units before the start of processing and the data is stored in storage sections 5 of the numerical controllers 3. Processing of the workpiece is then carried out by controlling the numerical controllers 3. In FIG. 21(c), processing programs written on floppy disks 8 are read by floppy disk units 7 for the respective processing units 2, and after the data has been stored in the storage sections 5 of the numerical controllers 3 via connecting terminals 6, control is effected by the numerical controllers so as to carry out the processing of the workpiece. In FIG. 21(d), programs written on cassette tapes 10 are read by cassette tape decks 9 for the respective processing units 2, and after the data has been stored in the storage sections 5 of the numerical controllers 3 via connecting terminals 6, control is effected by the numerical controllers so as to carry out workpiece processing. In the system configurations described above, after the programs are read for the respective units 2 by control commands from the PLC (not shown), and independent machining operations are performed using the respective units 2, the units 2 which have completed their operations early simply remain on standby until the operations of all of the units are completed. After completion confirmation is made by the PLC, the workpieces are conveyed to the next stop point in the line and the various machines are restarted to repeat their operations so as to allow the processing of workpieces to be carried out on a line operation basis.

In the system of FIG. 21(e), programs are transferred to the numerical controllers 3 from a storage section (not shown) of a minicomputer/personal computer 12 in FIG. 21 through the connecting terminals 6 of the respective units 2, all of which are connected via data transmitting cables 11. In this case as well, the processing of the workpiece is carried out through control by the PLC (not shown), in the same way as in the above-described system.

Processing in these systems requires independent processing programs for the respective units, as noted above, and it has thus has been necessary to prepare independent programs for each part of the overall machining process as is performed by each unit.

With such systems, since the functions of each unit in the line is fixed, in cases where a fault or the like has occurred in any one of the units, processing of the workpieces cannot be completed. A situation can sometimes occur in which the overall line of the system must be stopped, thereby hampering production.

The cause of this situation can be explained as follows: Since conventional numerical controller formats are used for each of the units constituting the line, the sequence number scheme, the coordinate words, miscellaneous words, spindle-speed function words, feed function words, etc. of the programs of any given unit are identical to those of all of the other units. Hence, if there are, for example, 16 units in a line, since all the control words are identical among the units, it is possible for 16 identical words to be utilized for 16 different functions. Also, the conventional numerical controllers generally cannot discriminate between different programs except on the basis of a program number or a unit number punched in the paper tape or the like. Due to these reasons, unless the processing program is altered, it has been difficult or impossible to allow another unit, even one having an identical function, to perform processing instead of the faulty unit, or to distribute the functions of the faulty unit to a plurality of units having the identical function.

With the conventional numerical controller arranged and used as described above, in the control of a complex machine tool, the dimension words and the like that are used to control the various machining processes have become insufficient, and the ability to create complicated programs or execute synchronous or simultaneous control has been lacking In addition, in a multi-stage machine tool such as a line transfer machine, since there are not enough dimension words and the like to uniquely identify the parameters for each machine, a plurality of identical function words have been used, often differently in each machine. Accordingly, when a unit within the line fails, processing by another unit cannot be effected as a provisional measure, and a situation arises where the entire line has to be stopped.

SUMMARY OF THE INVENTION

The present invention has been devised to overcome the above-described problems, and an object of the invention is to provide a numerical controller which is capable of freely effecting the control of a complex machine tool or a multi-stage machine tool, unifying the functional terms for the respective units, and effecting processing by redistributing tasks to other units if such becomes necessary.

The numerical controller in accordance with the present invention operates with an expanded control language, i.e., an expanded set of control words, a data area corresponding to the control words is retained in the numerical controllers and control processing software for operating on the control words is provided so that they may be defined and separated according to, e.g., the machine on which they will be employed. The re-assignment of the processing for each unit of a multi-stage machine tool can be effected by simply changing control word subwords of the processing programs which facilitates re-assignment.

In accordance with the invention, the control words of the traditional machining language, i.e., the sequence words, the dimension words, the spindle words, the feed words and the like, are expanded through the use of subwords. The subwords are typically used to designate the machine or group upon which the particular control word may be employed. In other circumstances, the subword may designate a particular axis or plane. In cases where no subwords are employed, it is possible for the control word to apply generically to all or a plurality of the controlled machines. A parameter table is maintained within the numerical controller which is used to determine which control words are valid, and on which machines and as to which axes. Through this system, the control words are capable of specifying with greater particularity the function which will be performed, and at the same time the length of the program and the amount of operator keyboarding is not increased.

BRIEF DESCRIPTION OF THE DRAWINGS

FIGS. 1 to 19 illustrate an embodiment of the present invention, while FIGS. 20 to 24 illustrate a conventional example.

FIGS. 1(a), 1(b), 1(c) and 1(d) are diagrams illustrating a complex machining center in accordance with an embodiment of the present invention, in which FIG. 1(a) is a diagram illustrating the main body of a machine tool; FIG. 1(b) is a diagram illustrating a sub-main spindle portion, and FIG. 1(d) is a system configuration diagram of a numerical controller, and FIG. 1(c) is a detailed diagram of the numerical controller and its subsystems;

FIGS. 2(a) and 2(b) are diagrams illustrating system control selection parameters in accordance with the illustrated embodiment;

FIG. 2(c) is a memory map configuration diagram, while FIG. 2(d) is a detailed diagram of the memory map;

FIGS. 3(a), 3(b), 3(c), 3(d), 3(e), are diagrams illustrating an actual processing program for a workpiece as shown in FIGS. 4(a) to 4(f), in accordance with the invention;

FIGS. 5(a) to 5(d) are stroke diagrams illustrating machine-related strokes, in which FIG. 5(a) is a diagram illustrating the machine stroke ranges;

FIG. 5(b) is an X-coordinate system stroke coordination chart;

FIG. 5(c) is a Y-coordinate system stroke coordination chart;

FIG. 5(d) is a Z-coordinate system stroke coordination chart;

FIG. 6 is the main flowchart of the numerical controller in accordance with this embodiment;

FIG. 7 is a detailed flowchart (rearrangement of the processing program into control programs) of Step 2 shown in FIG. 6;

FIG. 15 is a detailed flowchart ("," processing) of Step 222 shown in FIG. 7;

FIG. 16 is a detailed flowchart (error processing) of Step 224 shown in FIG. 7;

FIG. 17 is a detailed flowchart (M02/M30 processing) of Step 227 shown in FIG. 7;

FIG. 18 is a detailed flowchart (EOP/";" processing) of Step 225 shown in FIG. 7;

FIGS. 19(a), 19(b), 19(c), 19(d), 19(e), 19(f), 19(g), 19(h), 19(i), 19(j), 19(k), 19(l), 19(m), 19(n) and 19(o) are diagrams illustrating how the processing program shown in FIG. 3 is developed and rearranged into control programs;

FIG. 20(d) is a diagram indicating the names of the control axes of a conventional multi-stage machine tool;

FIGS. 21(a) to 21(e) are diagrams illustrating examples of conventional control systems for multi-stage machine tools, in which FIG. 21(a) is a diagram illustrating an example in which control is effected by reading a processing program using a tape reader at each unit;

FIG. 21(b) is a diagram illustrating an example in which control is effected after the processing program has been stored in a storage section by means of the tape reader for each unit;

FIG. 21(c) is a diagram illustrating an example in which control is effected after the processing program is read by a floppy disk unit and stored in a storage section;

FIG. 21(d) is a diagram illustrating an example in which control is effected after the processing program is read from a cassette deck and stored in a storage section;

FIG. 21(e) is a diagram illustrating an example in which control is effected after data is transferred to and stored in a storage section of each controller by means of a mini-computer or a personal computer;

Figure 22B:
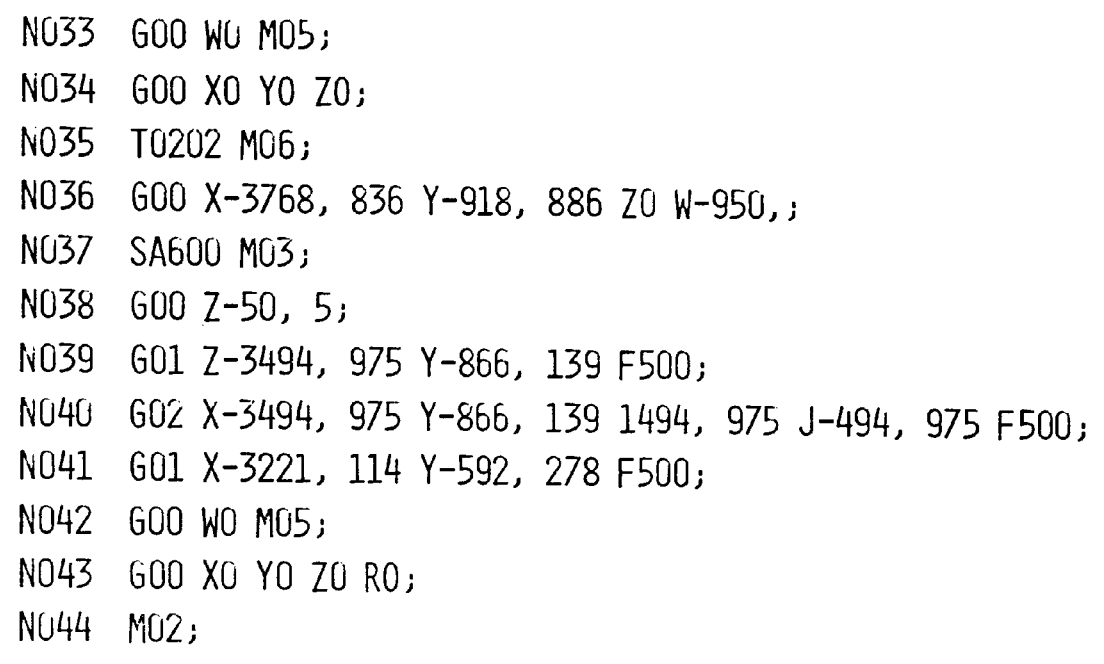
Figure 22D:
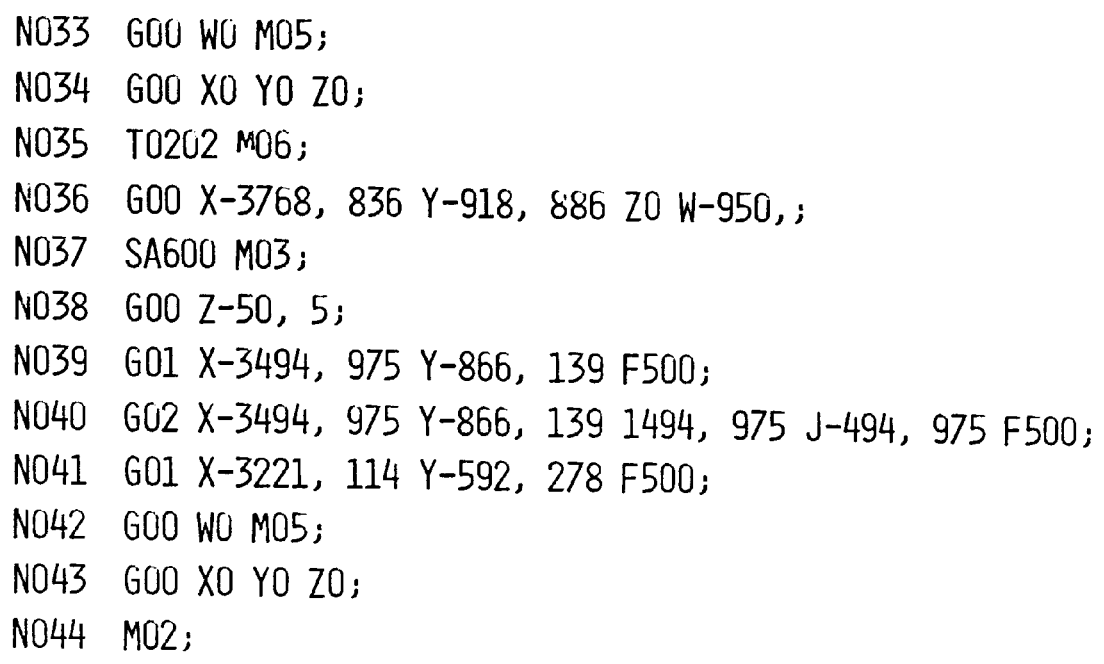
Figure 22J:
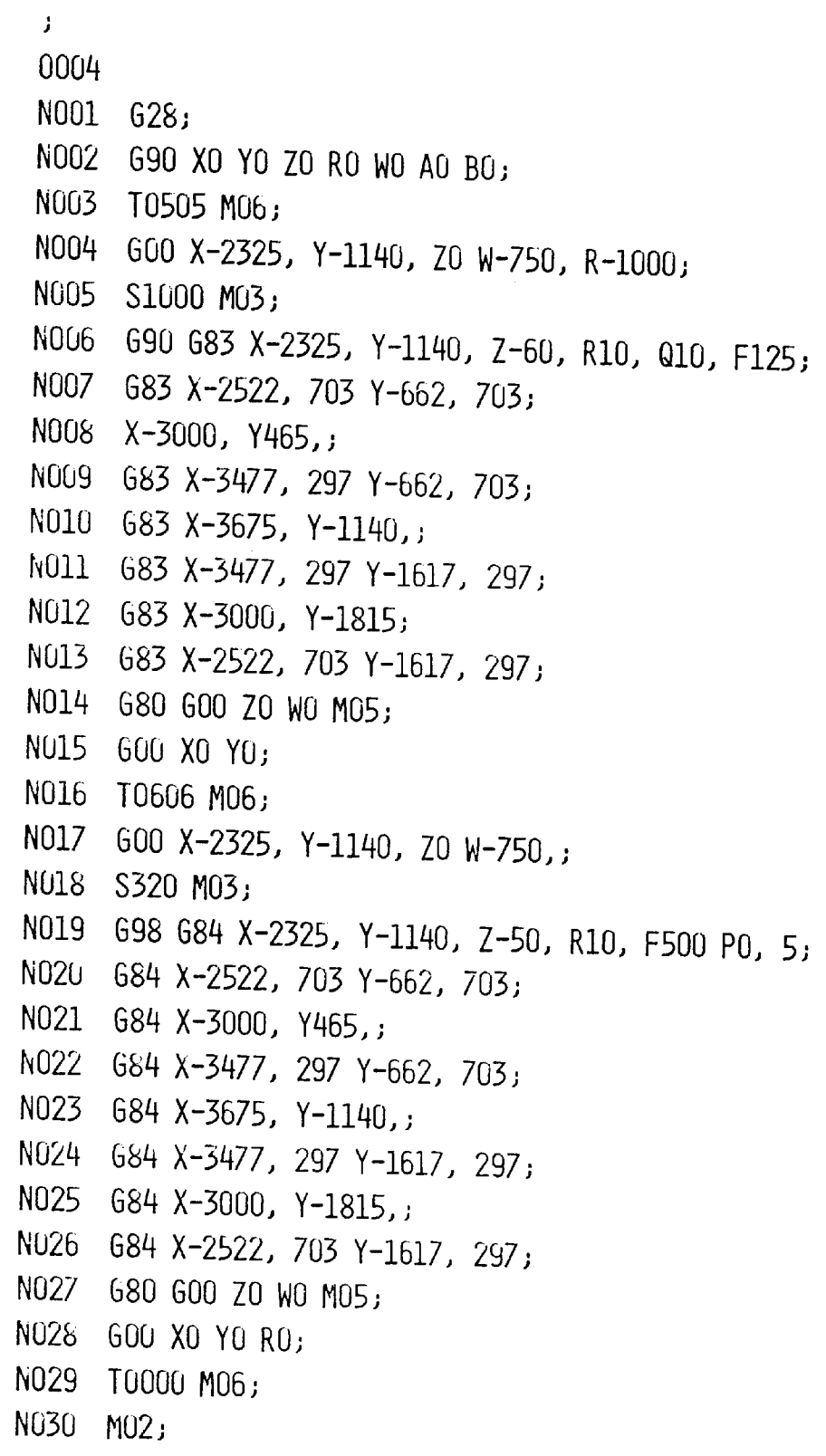
Figure 22K:
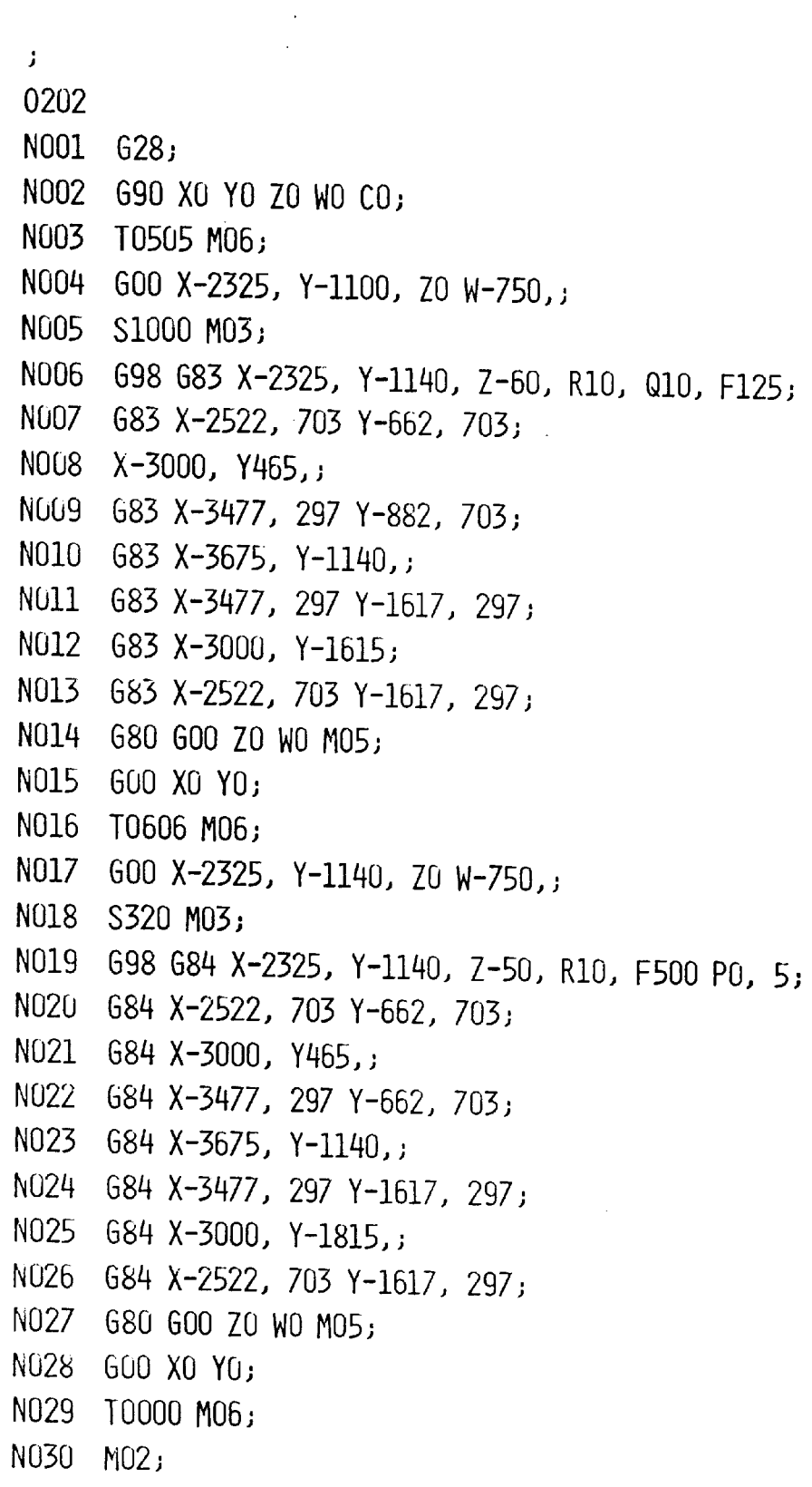

FIGS. 22(a), 22(b), 22(c), 22(d), 22(e), 22(f), 22(g), 22(h), 22(i), 22(j) and 22(k) are diagrams illustrating an example of the processing program used to machine the workpiece of FIG. 4 in accordance with a conventional method;

FIG. 23 is a diagram illustrating the processing procedures of the PLC in the case where the processing program of FIG. 22 is controlled by a PLC; and FIG. 24 is a control flowchart for a complex machining center of a conventional type.

In the drawings, the same reference numerals or characters indicate identical or corresponding portions.

DETAILED DESCRIPTION OF THE PREFERRED EMBODIMENTS

Figure 1A:
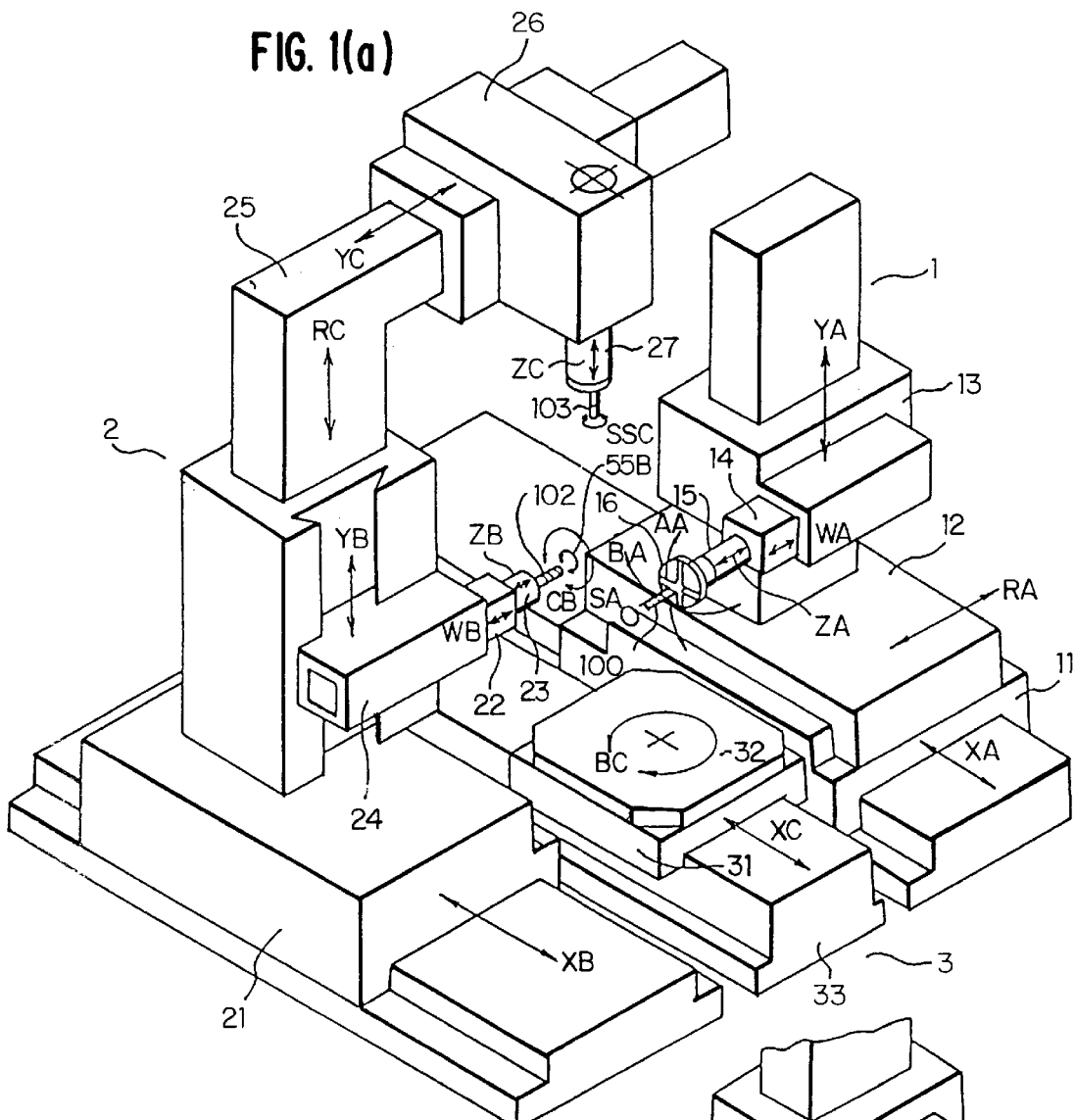

The numerical controller according to the present invention operates using a set of control parameters or control words which is greatly increased as compared to the prior art. The number of control axes is significantly increased, and various control functions are expanded by the addition of a subword or the like to the traditional function name. Function names presently used in the art, as set by EIA and ISO standards, are typically simply expanded rather than re-designated or renamed completely, so that those familiar with the prior standard command set will be able to rapidly learn the expanded system. Thus, control word expansion is performed by the addition of a subword to the sequence numbers used in the processing program, to the preparatory function word, to dimension words including an interpolation parameter and the dimensions of an angle, to the feed function word, to the spindle-speed function word, the tool function word, and the miscellaneous function words, thereby enabling single-system or multiple-system control without providing an additional controller outside the system.

I. Control Words and Their Usage

The present invention expands the dimension words, etc. on the basis of the following new convention:

1. Dimension Words

The dimension words are defined as follows:

(1) The three coordinate systems XYZ, UVW, and PQR that are set by JIS and ISO standards are used as the basic rectangular coordinate system dimension words. When this does not result in a sufficient number of axes, the number of coordinate systems is increased by attaching a subword such as A, B, C, . . . , etc., to each dimension word, thereby expressing the new axes as, for example, XA, YA, ZA, UA, VA, WA, PA, QA, RA, XB, YB, ZB, etc. The subwords A, B, C, . . . , etc. in this case designate the machine tool group or column to which the dimension word applies. Hereafter, "group" will be used to refer to a collection of machine tools which are designated by a group subword, as in the "columns" of the machining center of FIG. 20, whereas "common" will be used to refer to an intergroup or inter-dimensional function.

(2) For the angular dimensions, four dimension words A, B, C, and D are used, and a subword such as A, B, C, . . . , etc. is attached thereto, to thereby result in new dimension words of the form AA, AB, AC, BA, BB, BC, CA, CB, CC, etc. Furthermore, the angular dimension words may be expressed by, for example, AX, AXA, AXB, BY, BYA, BYB through combination with respective rectangular coordinate system words, and AXY, AXAYA, BXY, BXAYA, etc. in combination with plane coordinate systems including a center of rotation. For example, BXAYA sets the angular position of the Table 80 in FIG. 1, with respect to the XA, YA plane.

2. Preparatory Function Word

The preparatory function word (G) is modified as follows.

(1) The preparatory function word as it now exists is generally composed of a two-digit number, with G as an initial character (i.e., G00, G01, etc.). To expand this function word, a group subword and/or a dimension subword is added after the initial character G, and following the characters there is provided either a two-digit number or a two-digit number plus a third digit separated by a decimal point For example:

GA00, GA01, GA01.1 (using subword A)

GX00, GX01, GXA00, GXA01 (using dimension subwords X, XA)

The interpretation of these function words is simple For example, GA00 refers to a preparatory function (in this case, a rapid traverse) which is specifically applicable to the controlled elements of group A.

To cut down on the amount of keystroking in entering the commands, in cases where identical preparatory functions are used with plural respective dimension words, a single preparatory function word may be used and the others may be omitted. For example:
GU00UΔΔΔGV00VΔΔΔGW00WΔΔΔ; may be shortened to:
GU00UΔΔΔVΔΔΔWΔΔΔ; or G00UΔΔΔVΔΔΔWΔΔΔ;
("Δ" represents any position data)
In this latter case, G is said to be used as a "common" word.

(2) As for preparatory function words which are always used together with two or more axis designations, only one initial preparatory function word is necessary E.g.:
GU02 UΔΔVΔΔIΔΔJΔΔR;
GU03 UΔΔWΔΔIΔΔKΔΔR;

3. The Feed Function Word

The feed function word is expanded as follows:

(1) F alone is used as the feed function word in the existing JIS and ISO standards. According to the invention, the additional word E is used for the purpose of expanding the function, and both E and F may be used as common words or with dimensional or group subwords. In the case of movement in multiple axial directions simultaneously, where all of the feed values are the same, the instruction can be shortened. That is:
G01 XΔΔΔFXΔΔΔ, UΔΔΔFUΔΔΔ, PΔΔΔFPΔΔΔ;
becomes:
G01 XΔΔΔFΔΔΔ, UΔΔΔ, PΔΔΔ;
(where Δ represents any given position (or feed speed) data)

(2) For feed function words corresponding to respective axes, a dimension word is added after E or F, as in the above example. E.g.:
FXΔΔΔ, FZΔΔΔ, FUΔΔΔ, FWΔΔΔ, FCΔΔΔ, EXΔΔΔ, EZΔΔΔ, . . . , etc.

(3) When a feed function word is input immediately after a dimension word, it is possible to use one of the common words E, F as the feed function word for that dimension word, without again specifying the dimension word. For example:
G01 UΔΔΔFUΔΔΔ;
becomes:
G01 UΔΔΔFΔΔΔ;
To make a group feed function word, a group subword is added after E or F. For instance, FAΔΔΔ, FBΔΔΔ, FCΔΔΔ, EAΔΔΔ, EBΔΔΔ, ECΔΔΔ, etc. , where A, B and C are subwords designating the machine group or column.

4. The Tool Function Word (1) The tool function word of the existing standard is expressed by a plurality of numerals, with T used as an initial character, and uniquely identifies a given tool on one machine. To enable differentiation among tools used in a multiplicity of machines, the tool function words are expanded, using subwords. For example: TAΔΔΔΔ, TBΔΔΔΔ, TCΔΔΔΔ indicate tools used on different machine groups A, B, C, . . . , etc.

(2) The tool function word may also be expressed using dimension words which specify the plane in which the tool is used. For example: TXYΔΔΔΔ, TUVΔΔΔΔ, TXAYAΔΔΔΔ, etc. This form of the tool function word can be used with other instructions, not pertinent to the invention, to obtain orbital movement of the tool in the designated plane, in accordance, e.g., with the rotation of an associated table.

5. Spindle-Speed Function Word (1) According to existing JIS and ISO standards, a plurality of numerals with S as an initial character are used to express the spindle speed. In the invention, in order to facilitate the clarification of and control over the rotating spindles, system (group) subwords are used. For example, the spindle speed function word takes the form: SAΔΔΔ, SBΔΔΔ, SCΔΔΔ, etc.

(2) Dimension words may also be used as subwords to instruct planar rotation, e.g., of the table of the machining unit.

For example, SXYΔΔΔΔ will instruct rotation of the table residing in the XY plane at a speed of ΔΔΔΔ r.p.m. More generally, this instruction may be used to effect an orbital or rotational motion or the like of the specified coordinate plane.

(3) To distinguish between the first main spindle and the second main spindle in dual main spindle machines, the two main spindles are respectively expressed as follows:
First main spindles S, second main spindle: SS (4) The tool function word may be used as a subword, and the spindle-speed function word may thus be made to correspond to a tool rotation instruction For example, STΔΔΔΔ, STXYΔΔΔΔ, STXZΔΔΔΔ, etc. effectively instruct tool rotation at the designated speed. This instruction is always used initially in the same sequence in which the tool itself is specified.

6. Miscellaneous Function Word (1) At present, the miscellaneous function word is expressed by a two-digit number using M as an initial character. However, according to the invention, to cope with individual control of a multiplicity of systems, a dimension word or a group word is used as a subword, so that the instruction takes the form: MXY03, MXY04, etc. As an example, MXY03 represents a command to rotate the XY coordinate plane in a clockwise direction MKA04 would represent the rotation of the A-axis in a counterclockwise direction. Naturally, since the miscellaneous function word can also be used in a group context, care must be taken in setting the parameter table so as to enable one to distinguish whether or not a group subword or a dimensional subword is being employed. Since, in the examples described up to this point, the letter A has been used both in a group context and to refer to rotary axis A, in a case where both usages are possible, it may be necessary to designate the rotary axis in a different fashion, for example, as "AA".

(2) In cases where all of the linked systems are to be controlled simultaneously by a common function word, M is used alone (i.e., commonly), as in the examples M01, M30, M05, etc.

(3) To permit control in correspondence with the expansion of the dimension words, the tool function word, and the spindle-speed word, the latter may be used as subwords with the miscellaneous function word M.

For instance, for expanded dimensions:
MA03, MA04, MB05, etc. represent miscellaneous function words to which dimensional subwords have been added. Assuming that "A" here represents the rotary axis A, the indicated instructions command the rotation of the A-axis clockwise, rotation of the A-axis counterclockwise, and the stoppage of the rotation of the B-axis.

For expanded tool function words:
MT03, MT04, MT05, etc. represent instructions for clockwise rotation, counterclockwise rotation and stoppage of a tool.
MTXY03, MTXY04, MTXY05, etc. represent instructions for clockwise rotation, counterclockwise rotation and stoppage of a tool confined to the XY plane, perhaps orbiting in that plane.

With the expansion of the spindle-speed function word:
MS03, MS04, MS05, etc. represent instructions commanding the clockwise rotation, counterclockwise rotation and stoppage of the main spindle S, and MSS03, MSS04, MSS05, etc. represent similar instructions for the subspindle SS.

It should be borne in mind in the foregoing that the miscellaneous instruction words are typically not used alone and require context to be effective. For example, the instruction MXY03, commanding rotation of the XY coordinate system in the clockwise direction, would not be a valid instruction unless preceded by an instruction specifying the rotation and rotational speed of the coordinate plane, such as SXYΔΔΔ.

(4) Although two numerical digits are generally added in addition to the initial alphabetical character(s), four digits may be used in special cases.

7. The Sequence Function Word (1) Letter N is used as the sequence function word in the JIS and ISO standards, but for purposes of expansion of the function, subwords are added so as to clarify that the given sequence function word is to be used exclusively in the program for a given group. For example:
NAΔΔΔ, NBΔΔΔ, etc.

(2) N alone (i.e., without a subword) is used for commonly executed sequences, that is, sequences that specify actions to be carried out in more than one group, and is thus used when operations in a multiplicity of systems are commanded in one sequence and are controlled simultaneously For instance:
NΔΔΔ G00XΔΔΔYΔΔΔUΔΔΔ; and
NΔΔΔ G00X0Y0U0V0; specify a rapid traverse of plural axes in different groups to specified locations
NΔΔΔ M01; uses a miscellaneous function word commonly, which by definition extends across plural groups In general, the group subwords are connected to the sequence word only when all of the actions specified in that particular sequence are to be carried out within the specified group.

Figure 20A:
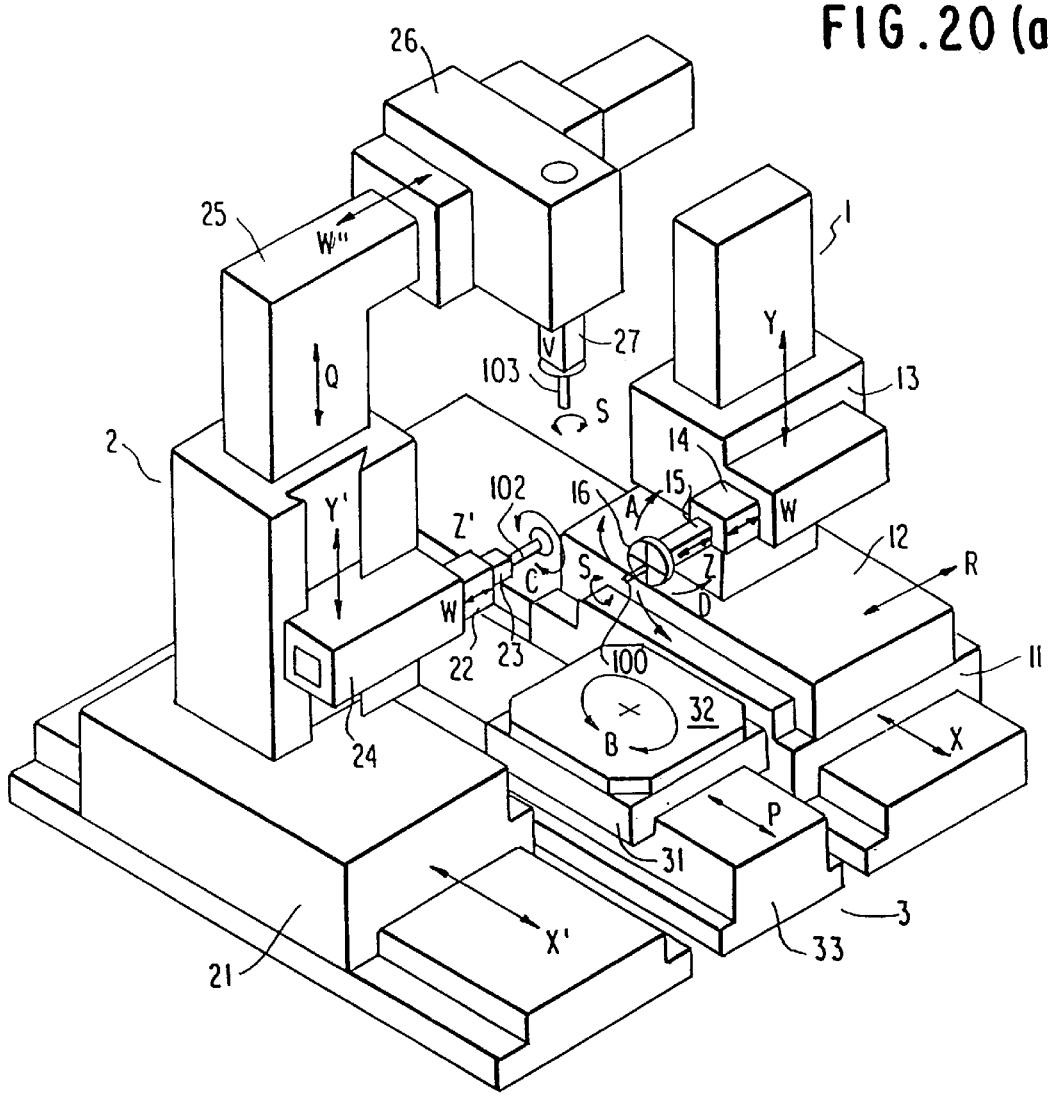
FIGS. 20(a) and 20(b) are diagrams of a complex machining center in accordance with a conventional arrangement, where portions designated by the same reference characters as in FIGS. 1(a) and 1(b) indicate corresponding portions.
Figure 20B:
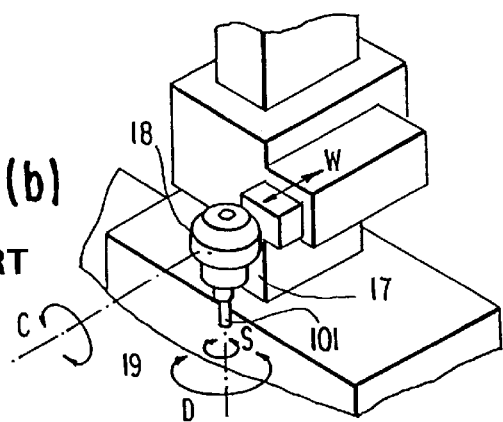
Figure 20C:
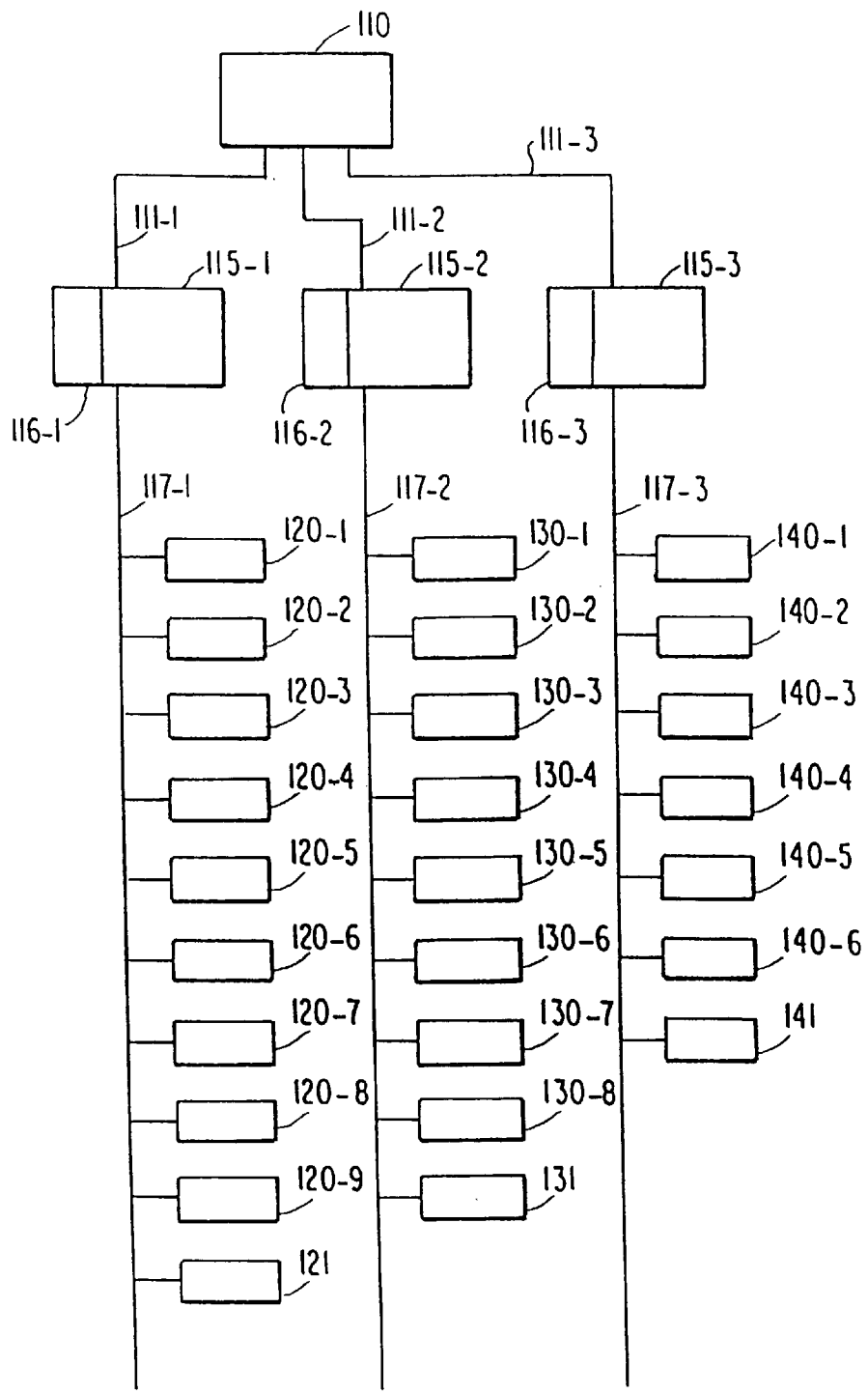
FIG. 20(c) is a control system diagram of the conventional complex machining center.
Figure 21A:
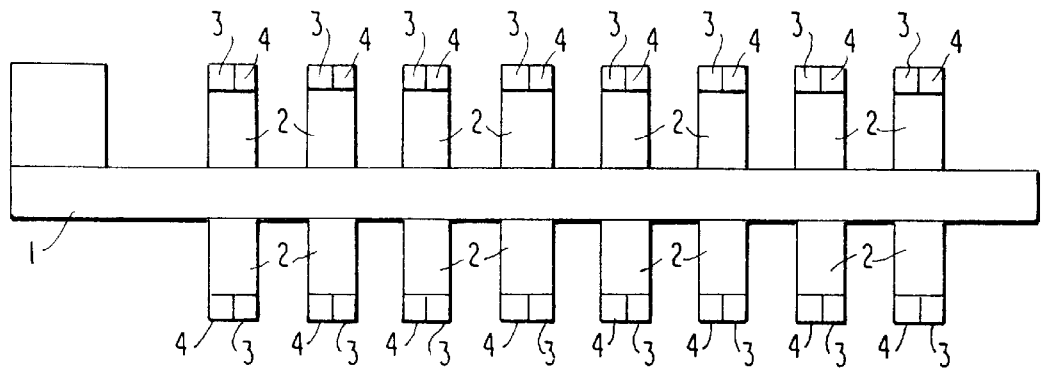
Figure 21B:
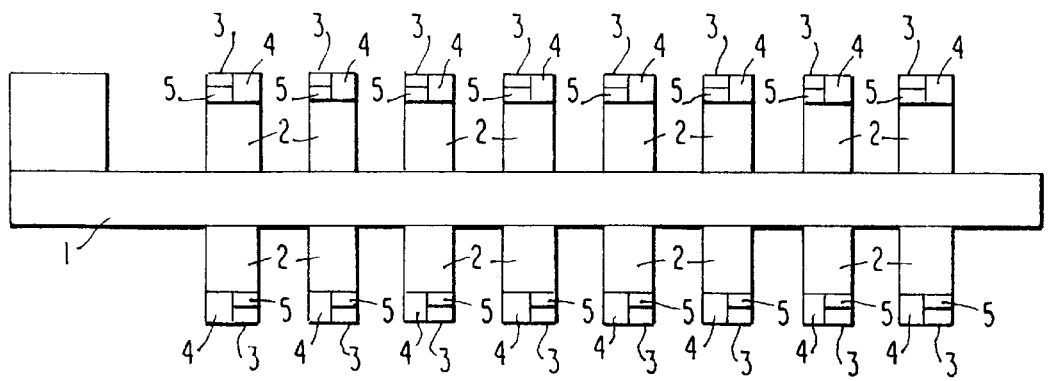
Figure 21C:
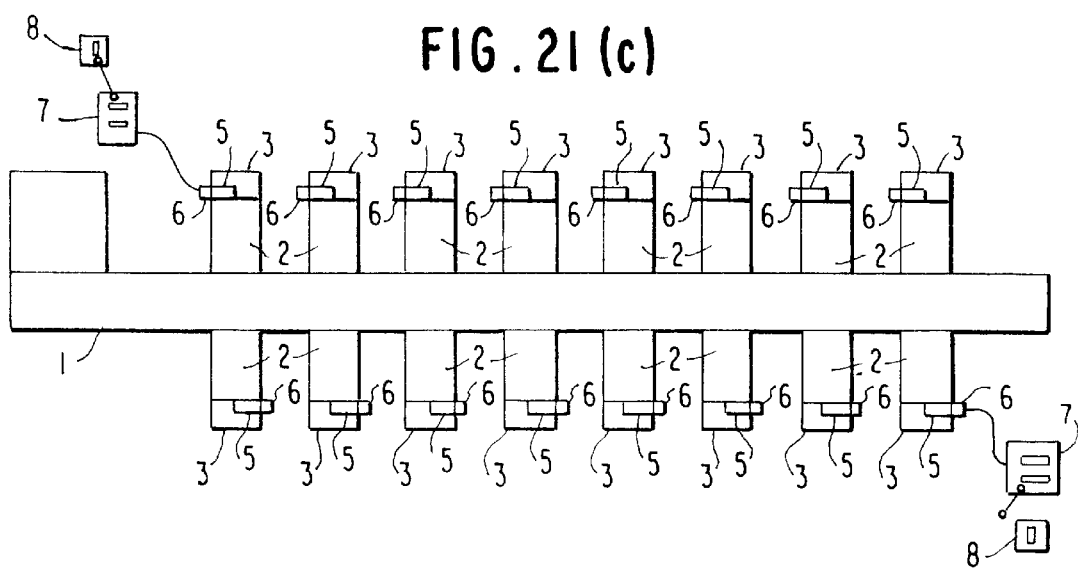
Figure 21D:
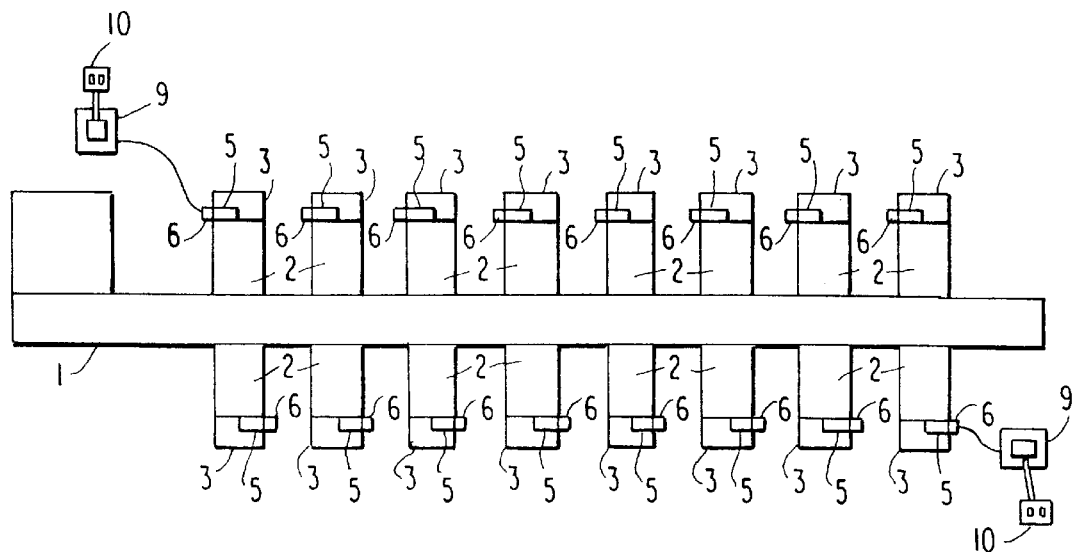
Figure 21E:
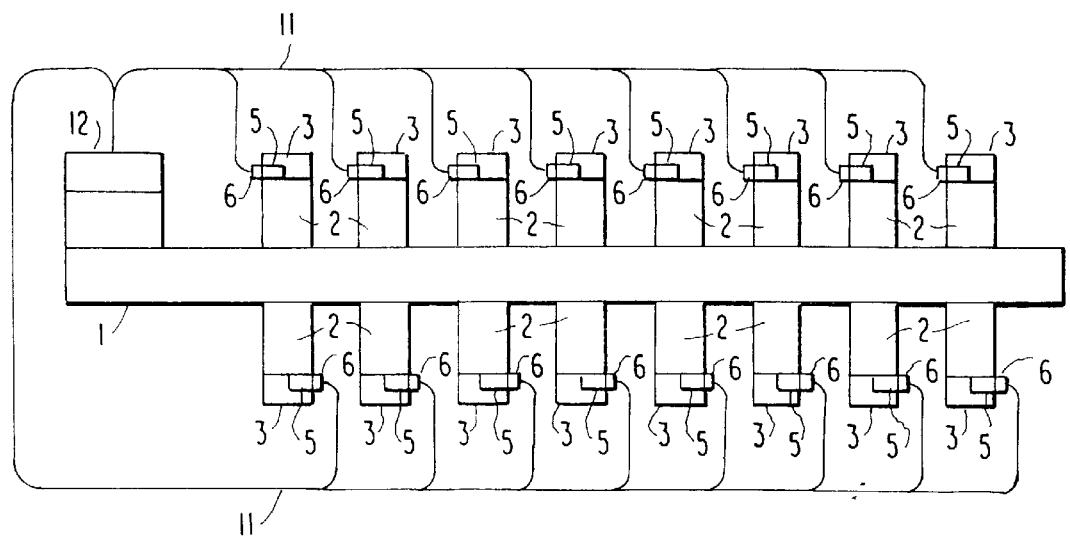
Figure 24:
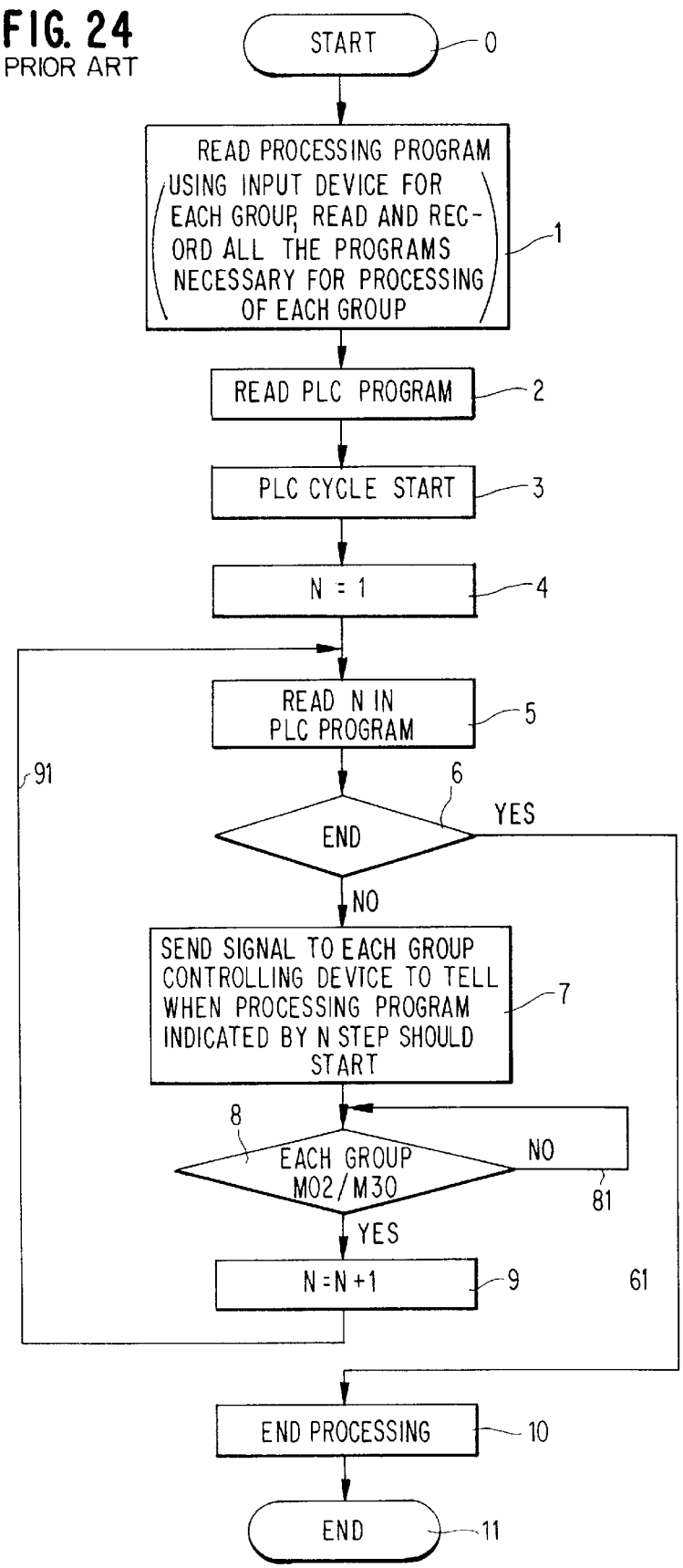

(3) Sequence function words for a multi-stage machine such as the transfer machine of FIG. 20(d), for examples attach a subword unique to each unit in the line. Thus, the instructions may be distinguished as to which unit they will be performed on. As will be discussed below, if one of the units fails, however, the subwords may be stripped from the sequence function words in the program for the failed unit so that that program may be reassigned to another unit.

II. Method of Input (1) Input Format

With respect to input format, the current JIS and ISO standards are maintained to the extent possible. However, the following are also possible.

(1) In the same sequence, words, having different subwords can be input.

(2) As for simultaneous movements along more than one axis, the input method of the JIS and ISO standards is applied correspondingly (instructions for movements to be executed simultaneously are not divided by a comma ",")

(3) Independent movements along each axis or axes are input by dividing each independent group with commas ",". For examples:

G00 XΔΔΔYΔΔΔ, GU00 UΔΔΔ VΔΔΔ,GJ01, JΔΔΔ; will instruct rapid traverses for the X and Y axes, and for the U and V axes, non-simultaneously, and linear interpolation along the J axis, again non-simultaneously.

(4) The modal and unmodal are handled in the same way as in the conventional method, but are controlled separately for each system In the modal operation, an instruction remains valid unless changed, whereas in unmodal operation, an instruction remains valid only within one block.

(2) Input Method

Any of the known methods using paper tape, floppy disk, manual data input, cassette tape, and the like may be adopted In the case of paper tape, input is carried out with one paper tape per paper tape reader, and the input programs are stored for each system.

To effect discrimination among systems, system control selection parameters are input and used in accordance with the format shown in FIGS. 2(a) and 2(b), described hereafter.

This is to permit a free combination depending on the configuration of a machine and a control system therefor.

III. Common Sequence Processing/Group Processing Function (1) Preparatory Function for Common Sequence Processing An agreement is made among the units that although a multiple-system processing program has been compiled in a sequence, with processing instructions extending over various systems, processing is to proceed essentially in parallel (i.e., simultaneously) only if there appears a preparatory function expressed by, for instance, G25, and if commands for different groups have been programmed in the same sequence.

(2) Preparatory Function for Group Processing

A convention is provided such that operations are started at arbitrary (non-interrelated) timings for each group, so as to proceed essentially independently for each group, when there appears a preparatory function expressed by, for instance G26, whereby simultaneous starting is effected only when commands for different groups have been programmed in the same sequence and an input for simultaneous starting has been made.

(3) Items (1) and (2) above are thus controlled on the basis of operator input.

(4) Discrimination Between Simultaneous Operation and Synchronous Operation

In the case of a cutting mode using preparatory functions G01, G02, G03 and the like, sequence data adapted to discriminate simultaneous operations by the conventions provided in accordance with the invention is also provided with the capability to discriminate a synchronous operation, as in the conventional case.

IV. Hardware Configuration and Use of Command Words

A. Hardware Arrangement and Its Control

Figure 1B:
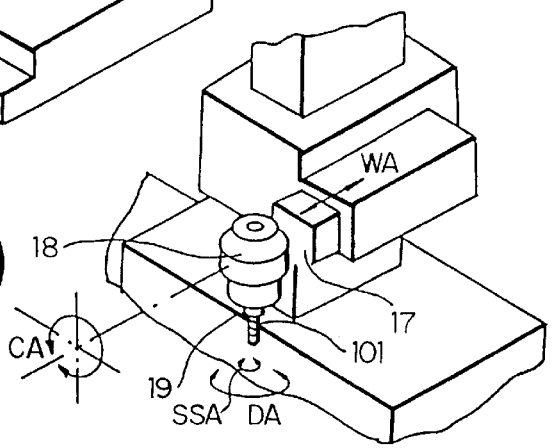
Figure 1C:
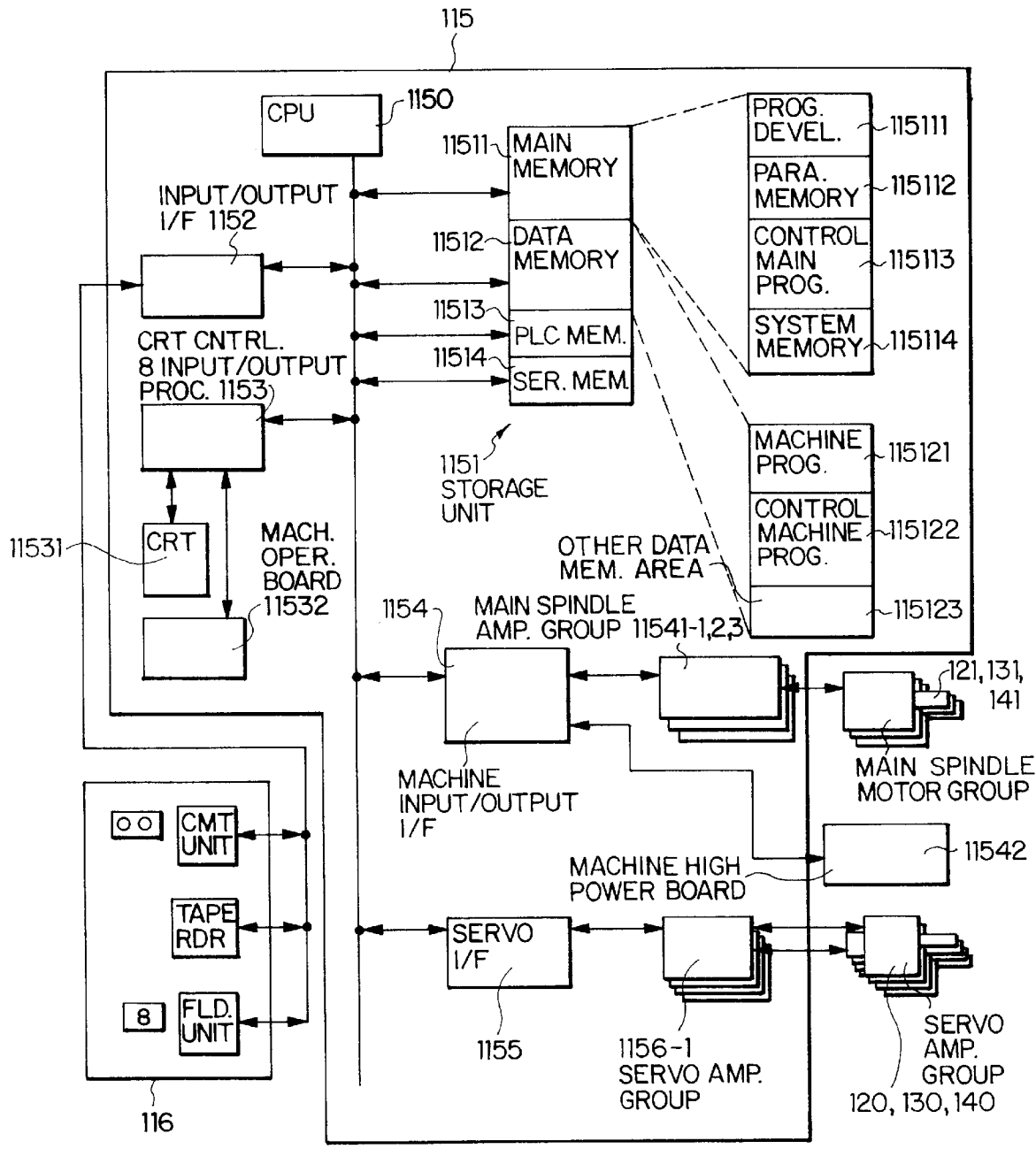
Figure 1D:
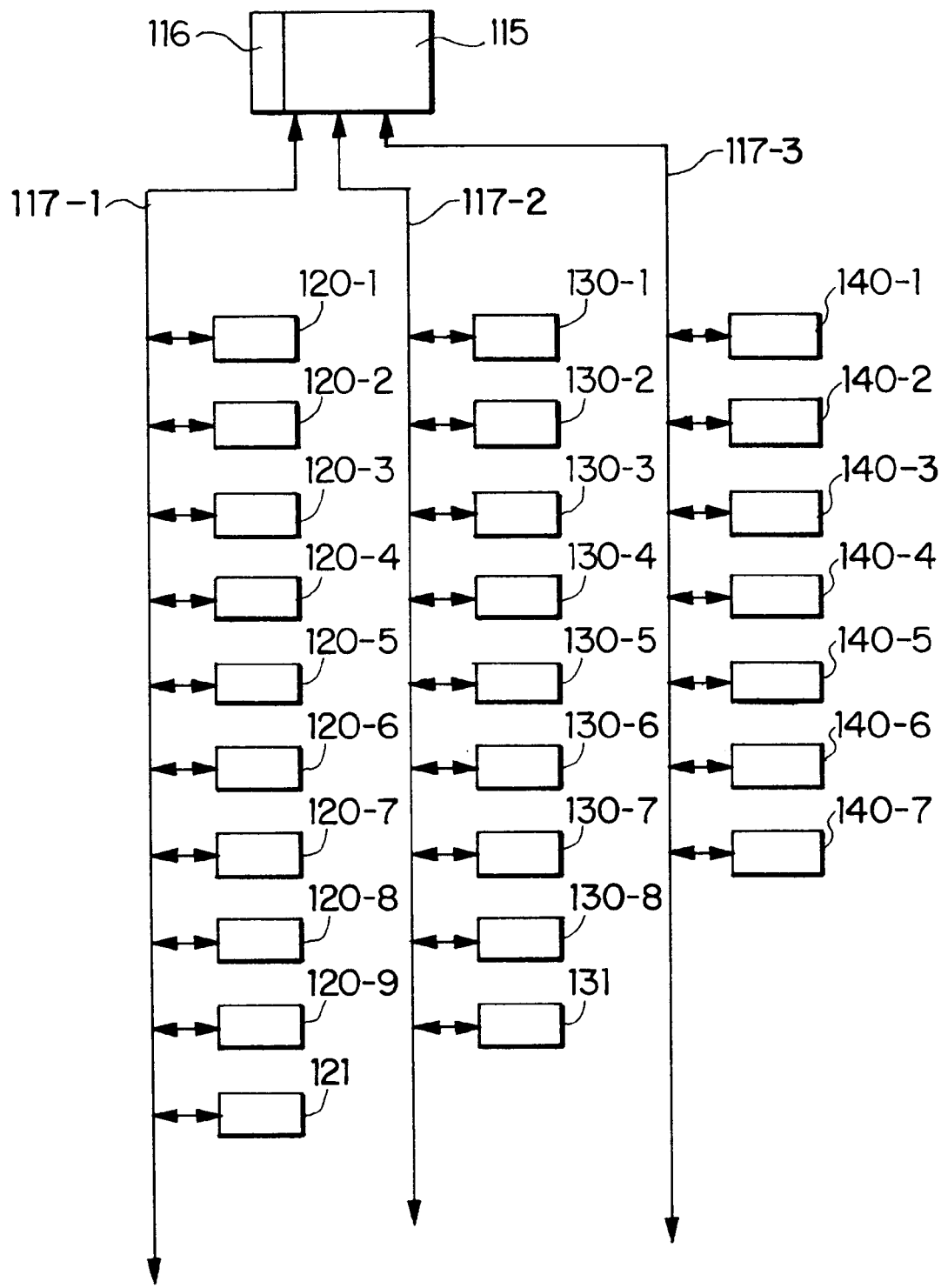

Referring now to the drawings, a description will now be given of a specific embodiment of the present invention FIGS. 1(a) and 1(b) illustrate a complex machining center, while FIGS. 1(c) and 1(d) are system configuration diagrams of a numerical controller for controlling this machining center. The complex machining center (FIGS. 1(a) and 1(b)) is constituted by a front column 1, a rear column 2, and a work table 3. A description of the various components of each of these systems, together with the axis designations and control words assigned to each, in this particular example, will now be given. The front column 1 comprises a column traveling section 11 (axis name: XA-axis); a column traversing section 12 (axis name RA-axis); a front head vertical movement section 13 (axis name: YA-axis); a front head ram traversing section 14 (axis name: WA-axis); a front head quill traversing section 15 (axis name: ZA-axis); a front head tilting head 16 (axis names: AA-axis, BA-axis); a swiveling section 18 (axis name: CA-axis) for the front head vertical unit 17 (see FIG. 1(*b*)); and a main spindle swivel shaft 19 (axis name: DA-axis). The various elements described above will hereinafter be referred to as "group A".

The rear column 2 comprises a column traveling section 21 (axis name: XB-axis); a side head vertical movement section 24 (axis name: YB-axis); a side head ram traversing section 22 (axis name: WB-axis); a side head quill traversing section 23 (axis name: ZB-axis); a main spindle swiveling section 103 (axis name: CB-axis); a cantilever beam vertical movement section 25 (axis name: RC-axis); a beam upper head traversing section 26 (axis name: YC-axis); and a beam head quill vertical movement section 27 (axis name: ZC-axis).

The work table 3 comprises a slide section 31 (axis name: XC-axis) and a swiveling table 32 (axis name: BC-axis) on a bed section 33. Of the above axes, those with subwords "B" are considered to belong to "group B", and those with subwords "C" are considered to belong to "group C" for control purposes.

In addition, the operational spindles include the first main spindle 100 (spindle-speed function word: SA) of the front column; a first sub-main spindle 101 (spindle-speed function word: SSA) on the front column; a second main spindle 102 (spindle-speed function word: SSB) on the rear column side head; and a third main spindle 103 (spindle-speed function word: SSC) on the rear column beam head. These spindles are each controlled by the respective function words.

In addition, the work swivel table 32 is controlled by a spindle-speed function word SBC, the front head vertical unit swivel section 18 by SCA, the rear column main spindle swivel section by SCB, and the front head vertical unit main spindle swivel shaft 19 by SDA, respectively.

Furthermore, the following spindle-speed function words are used in controlling rotary motion through a combination of dimensions: SXAYA for the joint, effective rotary movement of the front head column traveling section 11 (axis XA) and the front head vertical movement section 13 (axis YA); SXAZA for the front head column traveling section 11 and the front head quill traversing section 15; SXARA for the front head column traveling section and the front head column traversing section 12; SXAWA 11 for the front head column traveling section 11 and the front head ram traversing section 14; SYAZA for the front head vertical movement section 13 and the front head quill traversing section 15; SYAWA for the front head vertical movement section 13 and the front head ram traversing section 14; SYARA for the front head vertical movement section 13 and the front head column traversing section 12; SXBYB for the rear column traveling section 21 and the side head vertical movement section 24; and SXBYC for the rear column traveling section 21 and the beam upper head traversing section 26. As an example, the control word SXAYA instructs the joint movement of sections 11 and 13 such that the composite motion is circular, and at a speed set by the data following the control word.

The following feed function words are used for control purposes: FXA, FYA, . . . , FZA; which represent the traditional feed word F combined with the front column dimension words XA, YA, etc.; FXB, FYB, FZB, etc., which represent combinations with the rear column side head dimension words; FYC, FZC, FRC, etc., which represent combinations with the rear column beam upper head dimension words; FBC for the work table; FAA and FBA for the front head tilting head; FCA for the front head vertical head swivel section; FDA for the main spindle swivel shaft; and FCB for the rear head main spindle swivel section.

As tool function words, the following function words are used for control: TA for the front column first main spindle/first sub-main spindle; TB for the rear column side head second main spindle; and TC for the rear column beam head third main spindle.

The following miscellaneous function words are used to effect control MA for the front column; MB for the rear column side head; and MC for the rear column beam head. That is, the subwords A, B and C are essentially used as group designating subwords. In addition, the following rotation controlling miscellaneous function words are also used MBC for the work swivel table; MCA for the front head vertical unit swivel section; MCB for the rear column main spindle swivel section; MDA for the front head vertical unit main spindle swivel shaft; MXAYA for the front head column traveling section and the front head vertical movement section; MXAZA for the front head column traveling section and the front head quill traversing section; MXARA for the front head column traveling section and the front head column traversing section; MXAWA for the front head column traveling section and the front head ram traversing section; MYAZA for the head vertical movement section and the front head quill traversing section; MYAWA for the front head vertical movement section and the front head ram traversing section; MYARA for the front head vertical movement section and the front head column traversing section; MXBYB for the rear column traveling section and the side head vertical movement section; and MXBYC for the rear column traveling section and the beam upper head traversing section.

It will be noted from the foregoing that the rotation controlling miscellaneous function words are provided in correspondence to the spindle speed function words for spindle speed function words other than those directly controlling the spindles themselves This allows the spindle speed function word to, for example, command the rotation of the specified unit or the specified coordinate plane, while the miscellaneous function word then follows to specify the direction of such rotation.

As for the sequence function words, word NA is used to designate the front column; NB, the rear column side head; and NC, the rear column beam head, and are used, inter alia, in sorting the input processing program into control programs, as more fully described hereafter The subwords A, B and C as used here are group designating subwords.

B. General Hardware Operation

In FIG. 1(*c*), the numerical controller is designated by reference numeral 115. The numerical controller is associated with an input device 116, which may be a paper tape reader, a floppy disk drive, or similar input means. A processing program necessary for the given workpiece is input from the input device 116 through the input/output interface 1152 of the numerical controller. Under control of the CPU 1150, the program is stored in memory region 115121 of main memory 11511 of the storage unit 1151. The input program is checked using the parameter memory 115112 to be sure that all of the instructions are valid. As described in more detail below, the parameter memory 115112 contains a listing of each of the control words which are valid for the machining center which is the subject of control.

Following this, program development software stored in memory section 115111 operates on the processing program stored in memory area 115121, together with the parameter memory 115112, to "expand" that program into a plurality of programs generally specific to machining group. This function will be described in detail hereafter with respect to FIGS. 7 through 18. For now, however, it is sufficient to note that the purpose of the program expansion software is to take machining instructions such as are shown at the left-hand side of FIGS. 19(a) to 19(o), and produce programs which are at least specific to the machine element groups. In the case of the present example, groups A, B and C have been provided, and thus FIGS. 19(a) to 19(o) correspondingly show the devolvement of each of the program instructions on the left in FIGS. 19(a) to 19(o) into machining instructions for the given groups A, B and C, shown in the right-hand part of this figure. The resulting expanded or "sorted" programs are stored in control program area 115122. The sorted programs are generally called "control programs" within this text. They are of course sequence programs like the original processing program from which they were created.

In running the sequence programs, data produced by the CPU 1150, which uses main program software 115113 in main memory 11511, is stored in data memory area 115123. Selected data is output via servo interface 1155 and is amplified by servo amplifier groups 1156 under program control, for use as control outputs to the servo motor/detector groups 120, 130, 140. The outputs are forwarded via the cables 117-1, 117-2, 117-3. Conversely, feedback signals detected by detector groups 120 through 140 are input to the servo memory 11514 via a corresponding servo amplifier 1156 and the servo interface 1155 in numerical controller 115, via the cables 117-1, 117-2, 117-3 seen in FIG. 1(c).

Selected data produced by the CPU 1150 when running the main program software 115113 is amplified by machine input/output interface 1154 and main spindle amplifier 11541 and then supplied as control outputs to the main spindle motor/detector systems 121, 131, 141 from the numerical controller 115 via the cables 117-1, 117-2, 117-3. The main spindle motor/detector systems 121, 131, 141 are thus operated, with feedback signals from the detector systems fed back through the same cables and input to the servo memory 11514 via the corresponding main spindle amplifier 11541 and the machine input/output interface 1154 of the numerical controller. In the same way as mentioned above, the calculated data is also stored in data memory area 115123.

The physical arrangement of the system and the command structure and nomenclature are provided as described above to enable control of a complex machining system.

As mentioned in the foregoing, a processing program fed into the numerical controller is operated on by program expansion software resident in memory area 115111 to essentially sort and separate the program into, inter alia, a program for each group. This function is performed in association with the parameter memory 115112, which contains information useful in devolving the processing program into the individual control programs. For example, the parameter memory contains a listing of all of the valid instructions for the machining center, and also contains information which allows independent programs for each group to be developed from control words which are used commonly.

FIGS. 2(a) and 2(b) partially illustrate a group parameter table included within the parameter memory 115112. From this table, it can be seen, for example, that the character "X" is a valid control word in the system of FIG. 1, and is used as a common word X and as individual group words XA, XB and XC. This information is used by the program development software to determine that a dimension instruction beginning only with the character "X" applies generally to axes XA, XB and XC. Therefore, in forming the separate programs for groups A, B and C, the common control word X will be changed to XA, XB and XC in the divided or sorted program A concrete example can be seen in sequence No. 1 in the program of FIGS. 19(a) to 19(o). Here there appears a common G instruction, i.e., G28 (referring to the left-hand side of FIG. 19). Referring to the parameter table in FIG. 2(a), it will be seen that the common word G is valid on all three machine tool groups, and that group names GA. GB and GC have been respectively assigned to the groups. Therefore, in the program being generated for group A, the instruction G28 is transformed into the instruction GA28. Similarly, for the group B program, G28 is transformed into GB28, etc. The group parameter table of FIG. 2(a) thus indicates in which groups a common control word is valid. FIGS. 2(a) and 2(b) represent only one example of the group parameter table, this example being specific to the exemplificative machining center illustrated in FIG. 1. Because of the large number of miscellaneous function words, feed function words, etc, not all of these have been listed in the sample of FIGS. 2(a) and 2(b) FIG. 2(c) illustrates a more detailed parameter table including more of the valid instruction words for the FIG. 1 machine, not only the group words. Again the miscellaneous function words are too numerous to list completely.

In the following section, a more detailed illustration of how the processing program is divided into programs for each of the groups will be given, in conjunction with the flowcharts of FIGS. 7 through 18. These flowcharts contain examples of the type of software which would be employed as part of the program development software 115111. The purpose of the routines shown in FIGS. 7 through 18 is to divide or sort the processing program into the constituent control programs, including the group programs shown at the right-hand side of FIGS. 19(a) to 19(o).

V. Operational Example, Software Description

Figure 4A:
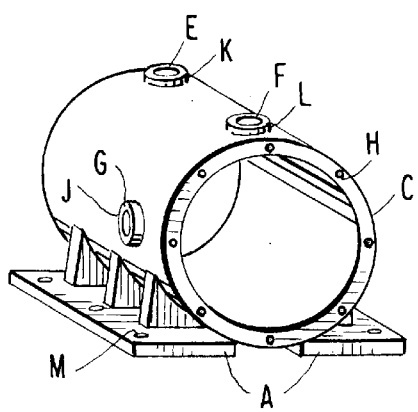
FIG. 4(a) is a front perspective view of the workpiece.
Figure 4B:
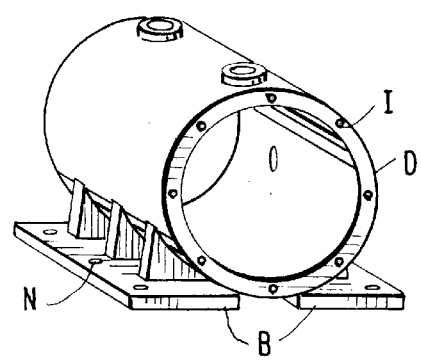
FIG. 4(b) is a rear perspective view of the workpiece.
Figure 4C:
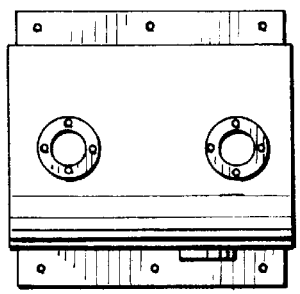
FIG. 4(c) is a top plan view of the workpiece.
Figure 4D:
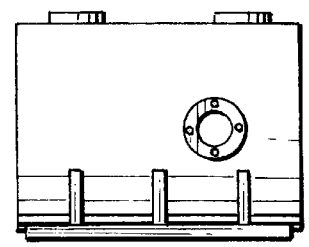
FIG. 4(d) is a side elevational view.
Figure 4E:
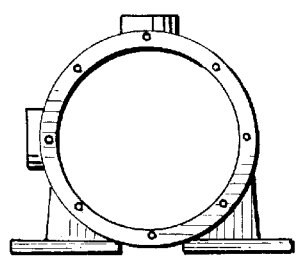
FIG. 4(e) is a front elevational view.
Figure 4F:
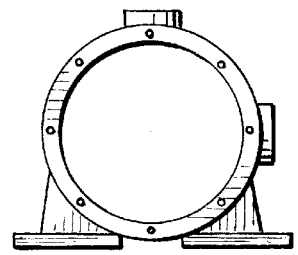
FIG. 4(f) is a rear view.

As described above, the sample workpiece shown in FIGS. 4(a) and 4(b) requires the cutting or milling of faces A, B, C, D, E, F, and G and the processing of the group of threaded holes H, I, J, K, and L and the group of bolt holes M and N.

FIGS. 3(a) to 3(i) illustrate an actual machining program (discussed in greater detail below) in which the various coordinates have been calculated in accordance with the machine-related stroke diagrams and table shown in FIGS. 5(a)–5(d). This program, duplicated in the left side of FIGS. 19(a) to 19(o), has been created for the complex machine tool shown in FIGS. 1(a) and 1(b), such that processing can be efficiently effected on the basis of a multiple-system control method in accordance with the present invention.

In this machining program, the conventions of the program and the control method are interwoven, and with the following description relating the conventions to the control, it will be understood how processing is effected while control is being provided.

Referring now to the flowchart shown in FIG. 6, the procedure will be described under the assumptions that the work has been properly positioned and secured on the machine tool in predetermined positional relationships and that the various tools needed for workpiece machining have been properly prepared and located in advance, in conformance with the program shown in FIGS. 3(a) to 3(i).

Figure 6:
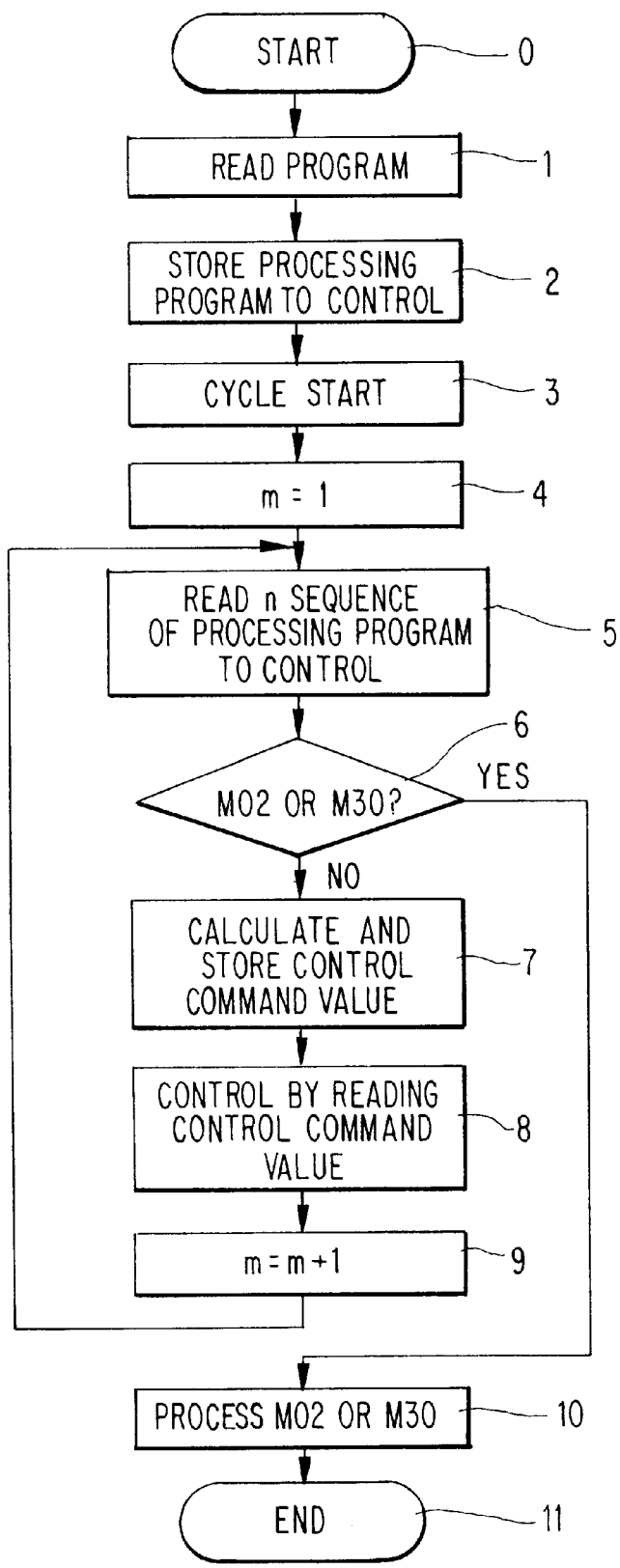

In FIG. 6, step 1, the processing program recorded on, e.g., paper tape is read in and stored in a predetermined processing program area of the storage section (115121 in FIG. 1(c)) disposed in the numerical controller. Input is conducted by means of, e.g., paper tape reader 116 of FIG. 1(c).

The processing program read and stored in step 1 is sorted and rearranged into control programs in a manner described in general above and in detail below, and is stored in storage area 115122 of FIG. 1(c). Operations are then started in step 3.

In step 4, the sequence number is initially set to m=1, and in step 5, the m-th sequence in the control program is read.

In step 6, a determination is made as to whether this sequence contains either an M02 or M30 control word (which are generally used to designate the end of processing) If not, the operation proceeds to step 7.

In step 7, the control command values are computed using the data contained in the control program, and are recorded in predetermined addresses in data memory section 115123 in FIG. 1(c), an exemplar of which is shown in FIG. 2(d). The data memory section is memory-mapped, such that the data needed for various operations (or a pointer thereto) will be located at corresponding various sets of addresses, with the partitioning being according to control word, as seen from FIG. 2(d).

In step 8, the control command values recorded in said predetermined addresses are read so as to control the machine tool, and finally in step 9, the sequence number of the processing program is incremented by one and the operation returns to step 5 via route 91 so that processing is continued repeatedly.

If it is determined in step 6 that either M02 or M30 data are present, the operation proceeds to step 10 via route 61 to perform the processing required by M02 or M30, thereby completing the processing of the workpiece and/or starting the program anew.

A detailed description will now be given of the processing conducted in step 2, using the flowcharts of FIGS. 7 through 18. As the purpose of these programs has been explained in the foregoing, the actual flowcharts are not necessary for a complete understanding of the invention but are nevertheless included for purposes of completeness.

Figure 7:
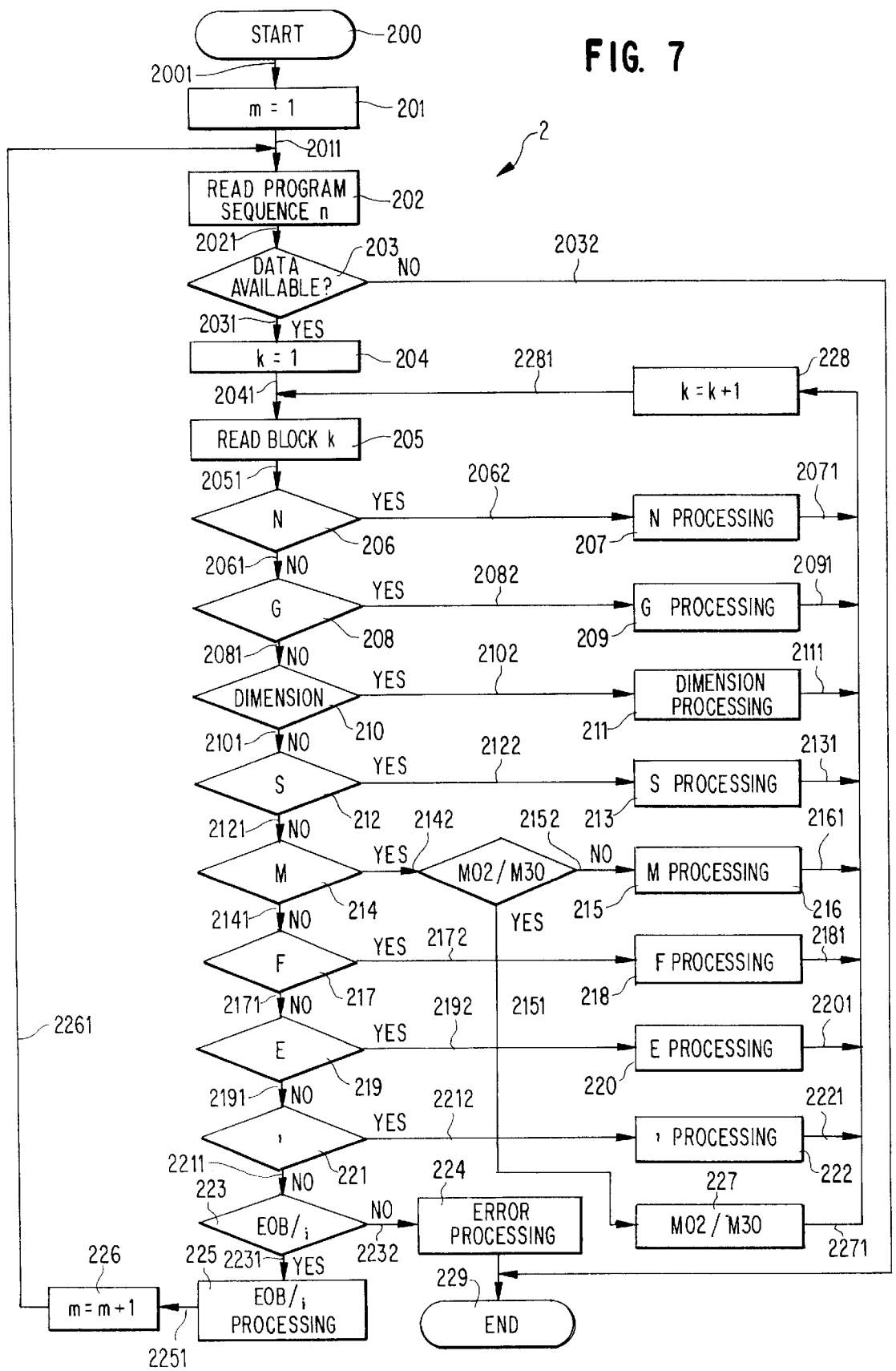

As described above, step 2 has the function of developing and sorting a processing program which controls a multiplicity of systems, each having a multiplicity of axes and a multiplicity of stages, into control programs. FIG. 7 is a flowchart showing the broad outline of this procedure, the details of which are contained in the subsequent flowcharts.

In step 200, processing is started, and in step 201 the sequence number n is set to 1. In step 202, the data of the n-th sequence instruction is read. In step 203, a determination is made of whether data is present and if it is, the process proceeds to step 204 via route 2031, while if data is not present, the process proceeds to step 229 via route 2032 for end processing.

In step 204, a block number k is set to 1. Most sequences include plural blocks (for example, sequence number 1 in FIG. 19 includes 2 blocks) which are individually processed. In step 205, the block k is read, and the subsequent discrimination steps branch the processing flow depending on the initial character(s) of the block.

Figure 8A:
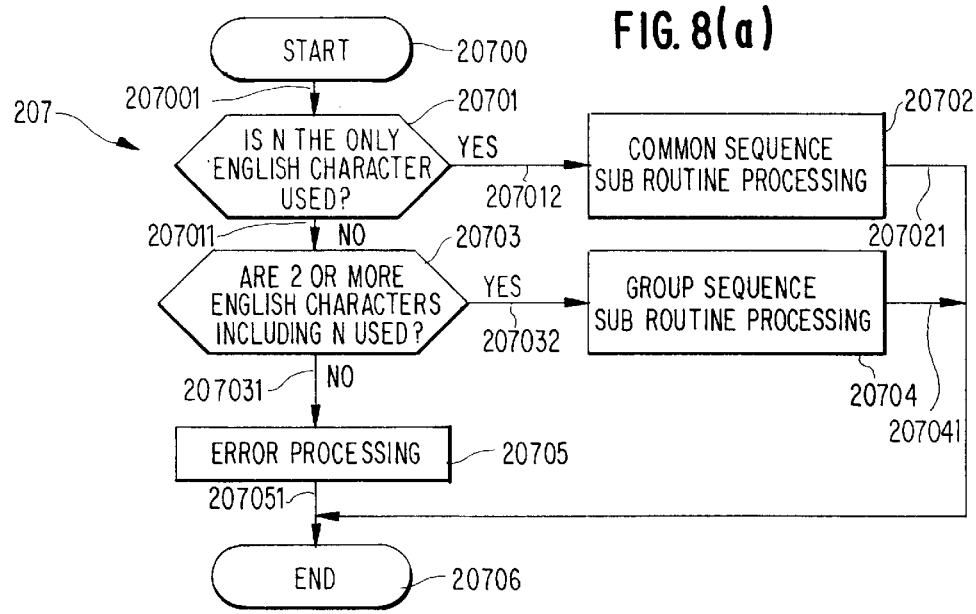
FIG. 8(a) is a detailed flowchart (N processing) of Step 207 shown in FIG. 7.

In step 206, a determination is made as to whether the initial character of the block is N, and if so, the operation proceeds to step 207 (FIG. 8(a)) for N processing via route 2062. If the initial character is not N, the operation proceeds to step 208 via route 2061 to determine whether or not the initial character of the block is G. If so, the operation proceeds to step 209 for G processing (FIG. 9(a)) via route 2082. If the character is not G, the operation proceeds to step 210 via route 2081 to determine whether or not the initial character represents a dimension. If it does, the operation proceeds to step 211 (FIG. 10(a)) for dimension processing via route 2101, and, if not, the operation proceeds to step 212 via route 2101 to determine whether or not the initial character of the block is S. If it is, the operation proceeds to step 213 for S processing (FIG. 11(a)) via route 2122, and, if not, the operation proceeds to step 214 via route 2121 to determine whether or not the initial character of the block is M. If M appears, the operation proceeds to step 215 via route 2142 to determine whether or not the data is either M02 or M30. (As mentioned earlier, M02 and M30 are generally used to designate the program end.) If the M instruction is neither M02 nor M30, the operation proceeds with M processing (FIG. 12(a)) at step 216 via route 2152. If either an M02 or M30 instruction is present, the operation proceeds to step 227 for M02/M30 processing (end processing) via route 2151. If it is determined in step 214 that the initial character of the block is not M, the operation proceeds to step 217 via route 2141 to determine whether or not the initial character of the block if F. If so, the operation proceeds to step 218 (F processing, FIG. 13(a)) via route 2172, and, if not, the operation proceeds to step 219 via route 2171 to determine whether or not the initial character of the block is E. In the presence of an E instruction, the operation proceeds to step 220 for E processing (FIG. 14(a)) via route 2191, and, if not, the operation proceeds to step 221 via route 2191. Here it is determined whether or not the initial character of the block is a comma ",". In this case, the operation will proceed to step 222 for "," processing (FIG. 15) via route 2212, and, otherwise the operation proceeds to step 223 via route 2211 to determine whether or not the data is either EOB (End of Block) or ";". In the case of either EOB or ";" the operation proceeds to step 225 for EOB/";" processing via route 2231, and, if otherwise, the operation branches to an error processing routine 224 (FIG. 16) via route 2232.

At this juncture, when the processing of steps 207, 209, 211, 213, 216, 218, 220, 222 or 227 is completed, the operation proceeds via one of routes 2071, 2091, 2111, 2131, 2161, 2181, 2201, 2221 and 2271 to step 228 where the count of the "k" counter is incremented by one so as to move to the data of the ensuing blocks. The operation then returns to step 205 via route 2281 to read the (next) block k, and steps 205 to 228 are repeated.

When EOB/";" processing is completed in step 225, the operation proceeds via route 2251 to step 226 where the count of the sequence counter is incremented by one (i.e., n=n+1) The operation then returns to step 202 to read the (next) program sequence n via route 2261, and steps subsequent to 202 are repeated.

The processing carried out in steps 207, 209, 211, 213, 216, 218, 220, 222, 224, 227, 225 will now be described in detail, with reference to FIGS. 8–16:

(1) N processing:

The purpose of this process is to examine blocks beginning with the sequence word N to see whether or not the sequence word is being used in a common mode or whether it is being used in association with a group designating subword in which case the sequence instruction is specific to that group. Following this determinations procedures are carried out by which the individual control programs will be written. For examples if N is being used in a group context, as explained below, it is necessary to consult the group parameter table of FIGS. 2(a) and 2(b) to see what groups a common N instruction is valid for. The sequence number is then written in the appropriate position in the FIGS. 19(*a*) to 19(*o*) "columns" for each group for which a group parameter setting was provided. The term "columns" refers to the columns seen in FIGS. 19(*a*) to 19(*o*), although it will be appreciated that what in fact is actually being performed is the creation of partitioned control programs for each group in correspondence with the "columns".

Figure 8B:
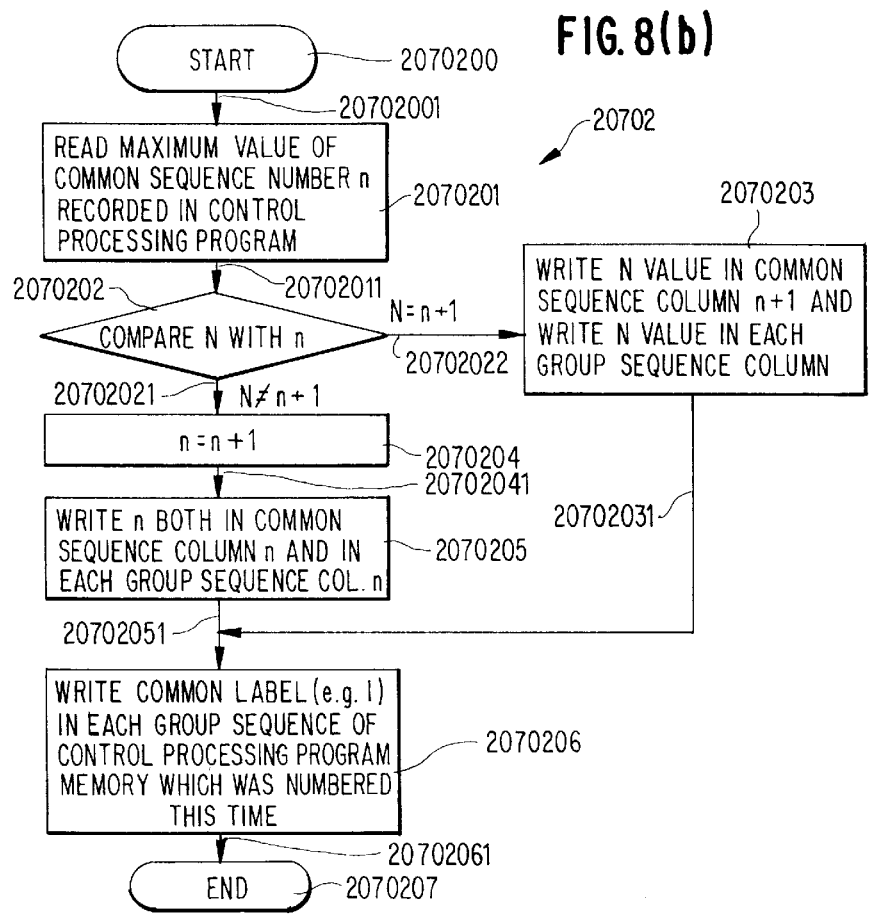
FIG. 8(b) is a detailed flowchart (common sequence subroutine) of Step 20702 shown in FIG. 8(a)
Figure 8C:
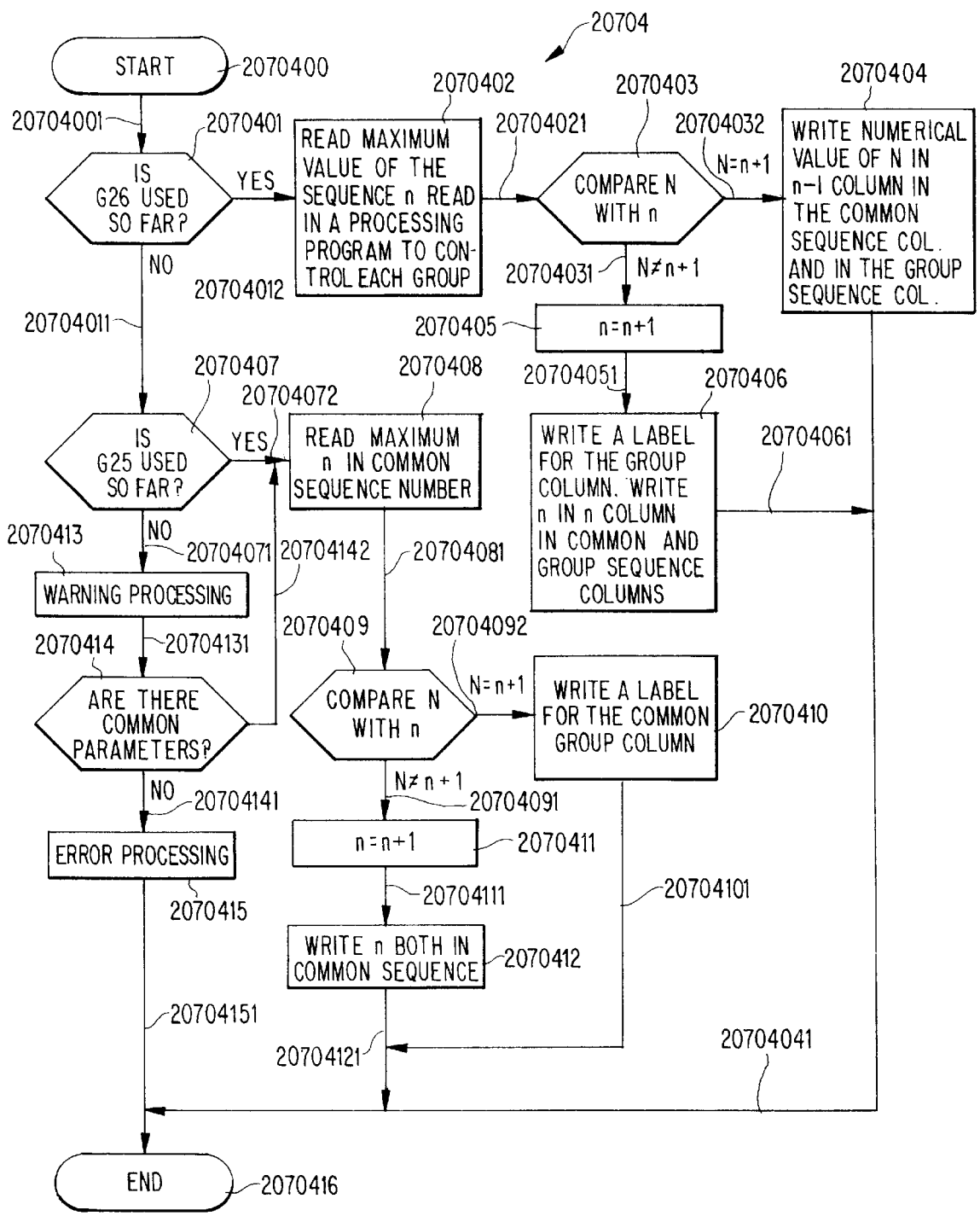
FIG. 8(c) is a detailed flowchart (group sequence subroutine) of Step 20704 shown in FIG. 8(a)

Referring to the flowchart in FIG. 8(*a*), processing is commenced at step 20700. In step 20701, a determination is made as to whether or not "N" is the only initial alphabetical character of the block. If there is only one character, which means that N is being used commonly, the operation proceeds to step 20702 (shown in detail in FIG. 8(*b*)) via route 207012 to perform common sequence subroutine processing, and otherwise the operation proceeds to step 20703 via route 207011 to determine whether or not there are two or more initial characters in the block, including the initial alphabetical character N. By "common" processing is meant that the relevant control word, here, "N", will be used in a common sense, in the control of plural groups. If there are two or more characters, the operation proceeds to step 20704 (shown in detail in FIG. 8(*c*)) for processing a group sequence subroutine via route 207032, and, if not, the operation proceeds to step 20705 via a route 207031 to carry out error processing. By "group" processing is meant that the relevant control word, here "N", has been distinguished by the addition of a subword which indicates that the control word is to operate with respect to only a designated group. Upon the completion of processing, the operation proceeds to step 20706 via route 207051 for end processing. In addition, when the processing of steps 20702, 20704 is completed, the operation is ended at step 20706 via routes 207021, 207041.

Common sequence subroutine processing (step 20702 above) is shown in detail in FIG. 8(*b*).

In step 2070200, processing is commenced. In step 2070201, the present maximum value of the common sequence number n recorded in the control program is read. In step 2070202, a comparison and discrimination is made between the value of sequence number N and that of common sequence number n. If N=n+1, i.e., in the usual case where the numbering is in sequence in the program, the operation proceeds via route 20702022 to step 2070203 in which the numerical value N is written in the control program's common sequence column (memory) at the "n+1"th position The numerical value of N is also written in the same position of each group sequence column (memory) for which a parameter setting (hereinafter referred to as a group parameter setting), indicating that the machine tool actually has that function, has been provided.

For example, referring to FIGS. 19(*a*) to 19(*o*), it will be seen that for sequence number N002, the value "12" was written in the common sequence column at the "second" position, and was also written in each of group columns ($n_a$, $n_b$, $n_c$) at a like position, due to the fact that a group parameter setting for "N" was provided in FIG. 2(*a*) for each of groups A, B and C. If N≠n+1, i.e., in a case where a special numbering system has been adopted, i.e., where the sequence numbers N are not consecutive, the operation proceeds to step 2070204 via route 20702021 to set n=n+1, and then further proceeds to step 2070205 via route 20702041 to write "n" at the "n"th position in the control program's common sequence column and in a like position in each of the control program's group sequence columns for which a group parameter setting has been provided, in this case, in each of the columns.

Upon completion of the processing in steps 2070203 and 2070205, the operation proceeds via respective routes 20702031, 20702051 to step 2070206 where a "common" label, e.g., 1, is written in a memory area corresponding to the "common/group" columns (FIGS. 19(*a*) to 19(*o*)) for each group control program which has presently received a sequence number by the above process. Upon the completion of this processing, the operation proceeds to step 2070207 via route 20702061, thereby completing step 20702.

Group sequence subroutine processing (step 20704 in FIG. 8(*a*)) is shown in detail in the flowchart of FIG. 8(*c*).

In step 2070400, processing is commenced, and in step 2070401, the presence of an active preparatory word G26 (instructing group processing) is determined. If G26 is found, the operation proceeds via route 20704012 to step 2070402 in which the present maximum value of the sequence number n recorded in the control program for each group is read. The operation then proceeds to step 2070403 via route 20704021 to compare and discriminate between N and n. When N=n+1, the operation proceeds via route 20704032 to step 2070404 in which the numerical value of N is written in the n+1th position of the common sequence column of the control program and in the n+1th postion of the group sequence columns of the control program. Also, a label "2" is written in the common/group columns, to designate group processing. If it is later determined that there is no data for any particular group, i.e., no following position instruction, tool instruction, feed instruction, etch, a "0" replaces the 1121, in the column for that group.

At this juncture, upon the completion of this processing, the operation is ended in step 2070416 via route 20704041.

If on the other hand it is determined in step 2070403 that N≠n+1, the operation proceeds to step 2070405 via route 20704031 to increment n by 1, e.g., perform n=n+1, and the operation then proceeds to step 2070406 via route 20704051 where the value n as calculated in step 2070405 is written in the common sequence and group sequence columns at position n. Also, the label designating group processing, e.g., 11211, is written in the common/group columns, as before. Upon completion of this processing, the operation is ended in step 2020416 via route 20704061.

If it is determined in step 2070401 that no G26 instruction is active, the operation proceeds to step 2070407 via route 20704011 to determine whether the preparatory word G25 (for common sequence processing) remains active. If so, the operation proceeds to step 2070408 via route 20704072 to read the present maximum value of the common sequence number n, and then proceeds to step 2070409 via route 20704081 to compare and discriminate between N and n. When N=n+1, the operation proceeds via route 20704092 to step 2070410 in which the numerical value of N is written in the n+1th position of the common sequence column and the group sequence columns of the control program, and the label for common processing, e.g., 1, is written in the common/group columns. Upon completion of this processing, the operation is ended in step 2070416 via route 20704101.

If it is determined in step 2070409 that N≠n+1, the operation proceeds to step 2070411 via route 20704091 to perform n=n+1, and then the operation proceeds via route 20704111 to step 2070412 in which n as calculated in step 2070411 is written in the common sequence column of the control program at position n and in the group sequence columns at position n, and a label for common processing, e.g., 1, is written in the common/group columns correspondingly. Upon completion of this processing, the operation is completed in step 2070416 via route 20704121.

In step 2070407, if the preparatory word G25 for sequence processing is not still active, the operation proceeds to step 2070413 via route 20704071 to process an error warning which is displayed on a CRT display, a printer, or the like. Upon completion of this processing, the operation proceeds to step 2070414 via route 20704131 to determine the presence of a parameter setting for effecting common processing. If such is found, the operation returns to step 2070408 via route 20704142. Processing in step 2070408 and thereafter has been described above.

If it is determined in step 2070414 that no such parameter setting is provided, the operation is ended in step 2070416 via route 20704151.

The processing of step 20704 is thereby completed.

(2) G processing

Figure 9A:
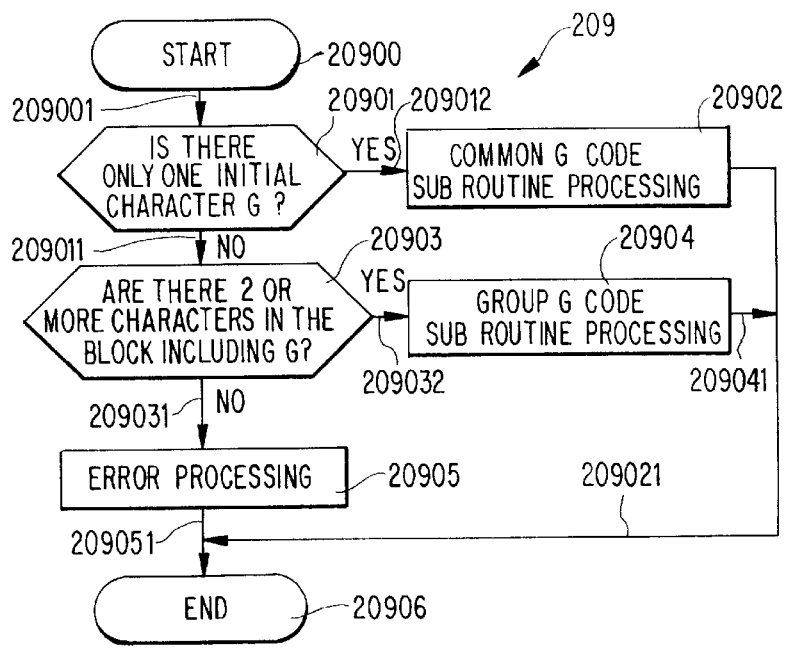
FIG. 9(a) is a detailed flowchart (G processing) of Step 209 shown in FIG. 7.
Figure 9B:
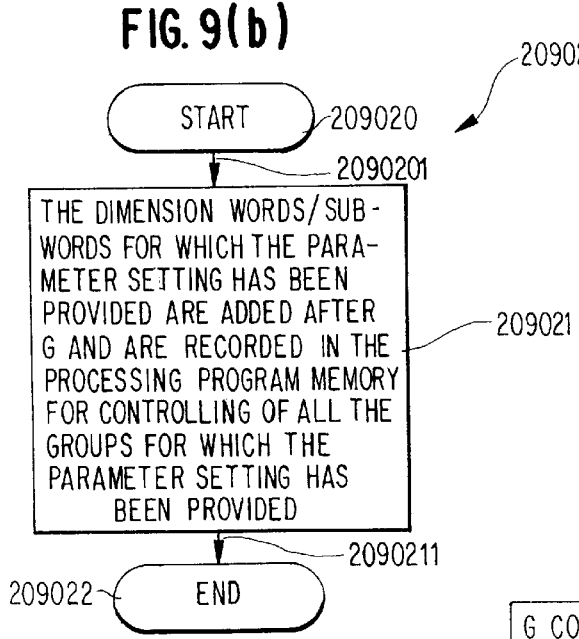
FIG. 9(b) is a detailed flowchart (common G code subroutine) of Step 20902 shown in FIG. 9(a)
Figure 9C:
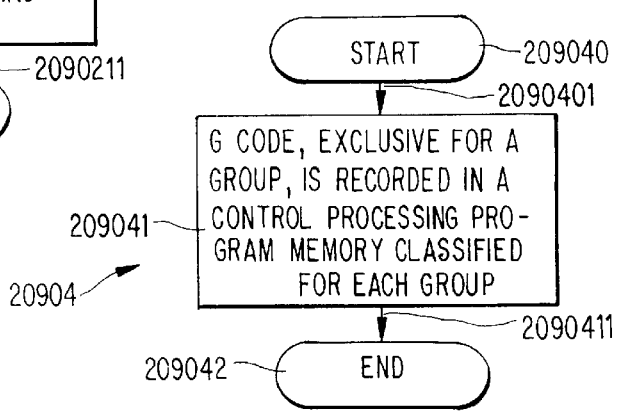
FIG. 9(c) is a detailed flowchart (group G code subroutine) of Step 20904 shown in FIG. 9(a)

The various operations carried out in processing the preparatory words (G words) will be described in detail beginning with FIG. 9(*a*). In general, the purpose of this processing is the same as was the case with the "N" instruction words; i.e., it is determined whether "G" is being used commonly or in the group sense, and, using the parameter table, the G instruction is written to selected ones or all of the control program columns for the groups. In FIG. 9(*a*), processing is commenced in step 20900. In step 20901, a determination is made as to whether or not "G" is the only initial alphabetical character of the block. If so, the operation proceeds to step 20902 (FIG. 9(*b*)) via route 209012 to effect the processing of a common G code subroutine, and, if not, the operation proceeds via route 209011 to step 20903 in which a determination is made as to whether or not there are two or more characters in the block, including the initial alphabetical character G. If there are, the operation proceeds to step 20904 (FIG. 9(*c*)) via route 209032 to effect the processing of a group G code subroutine, and if not, the operation proceeds to step 20905 via route 209031 to effect error processing.

Upon the completion of this processing, the operation ends at step 20906 reached via route 209051.

When the processing of steps 20902 or 20904 is completed, the operation ends at step 20906 via route 209021 or 209041.

The internal processing of step 20902 (common G processing) is shown in detail in the flowchart of FIG. 9(*b*). In step 209020, processing is commenced. In step 209021, the dimension words/group subwords for which parameter settings have been provided are added after G and are recorded in the memory where the control programs are being made up, for all groups for which parameter settings have been provided. Naturally, the numerical value attached to G is also so recorded. An example of this is seen in sequence number 1 in FIGS. 19(*a*) to 19(*o*), where the G28 instruction is expanded to GA28, GB28 and GC28.

Upon the completion of this processing, the operation is ended in step 209022 via route 2090211.

The internal processing of step 20904 is shown in detail in the flowchart of FIG. 9(*c*). In step 209040, processing is commenced, and in step 209041, a G code which is exclusively for a given group is written in memory, with the subword appended, in the appropriate "column" for that group.

The operation then ends in step 209042 reached via route 2090411.

(3) Dimension processing

The operations undertaken in performing dimension word processing will be described in a series of flowcharts beginning with FIG. 10(*a*).

Figure 10A:
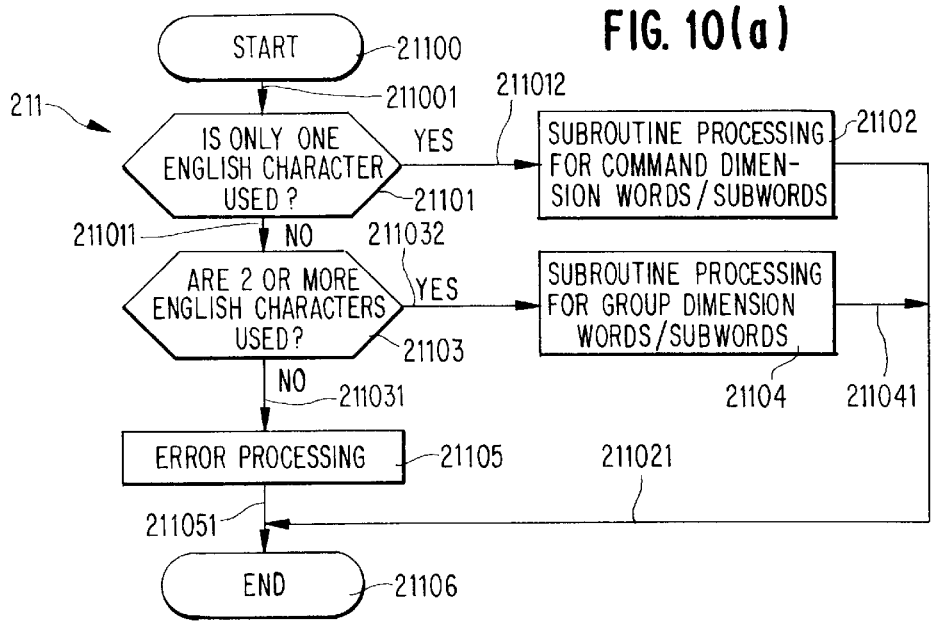
FIG. 10(a) is a detailed flowchart (dimension processing) of Step 211 shown in FIG. 7.
Figure 10B:
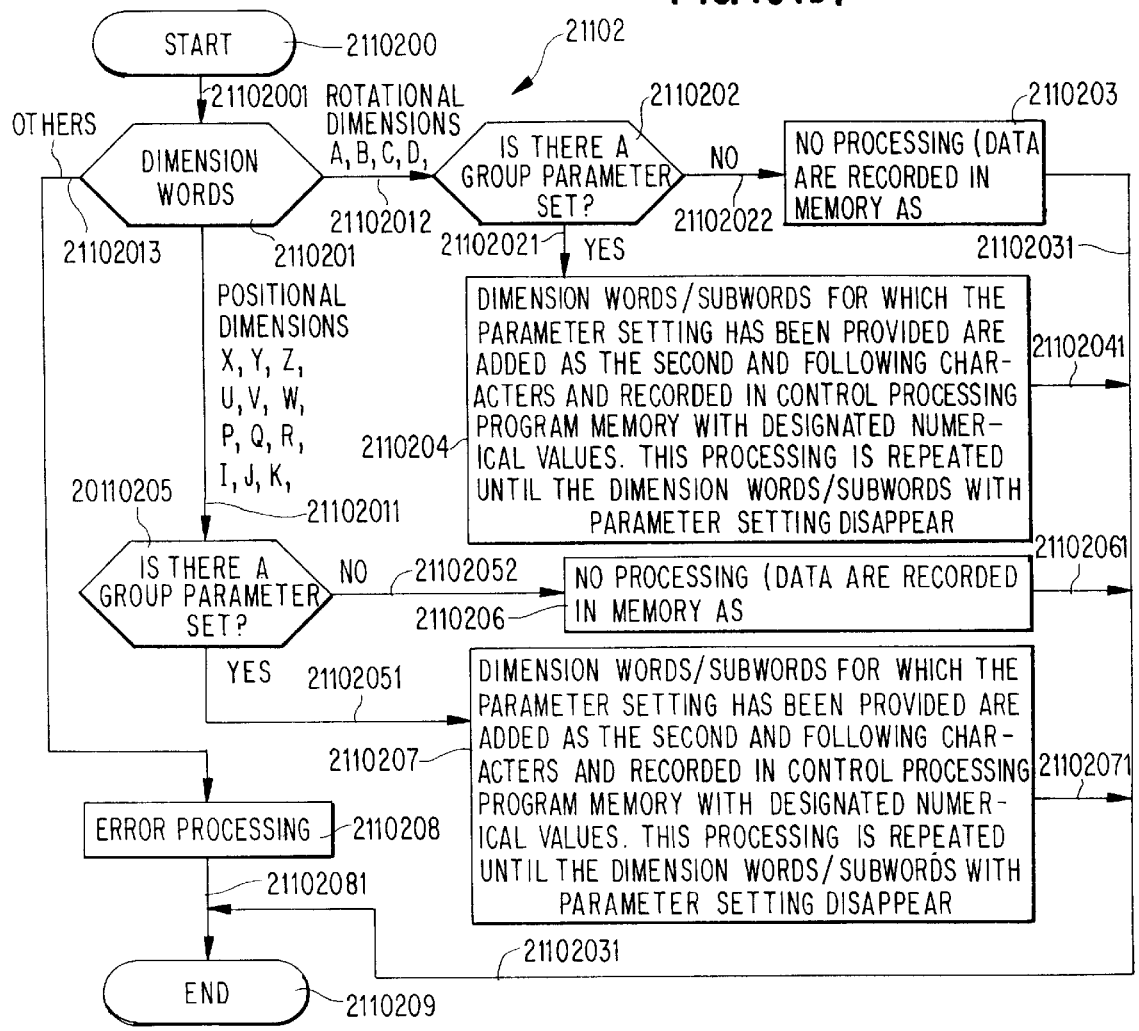
FIG. 10(b) is a detailed flowchart (common dimension word/subword subroutine) of Step 21102 shown in FIG. 10(a)
Figure 10C:
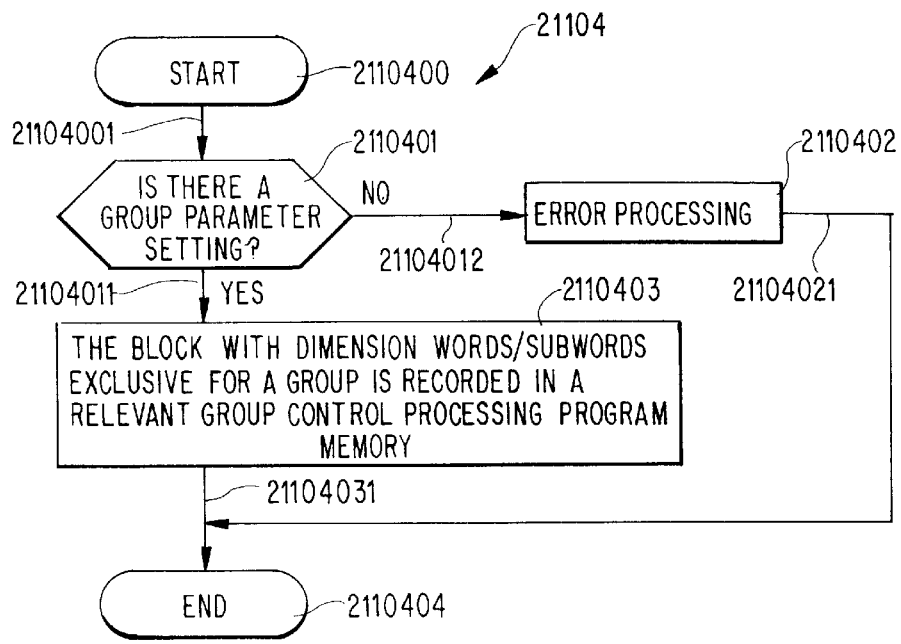
FIG. 10(c) is a detailed flowchart (group dimension word/subword subroutine) of Step 21104 shown in FIG. 10(a)

In FIG. 10(*a*), step 21100, processing is commenced, and in step 21101, a determination is made as to whether or not the dimension word is the only alphabetical character appearing at the beginning of the block. If so, the operation proceeds to step 21102 (FIG. 10(*b*)) to effect processing of a common dimension word subroutine, and, if not, proceeds via route 211011 to step 21103 in which a determination is made as to whether there are two or more characters in the block, including the initial dimension word. If there are, the operation proceeds to step 21104 (FIG. 10(*c*)) to effect the processing of a group dimension subroutine, and if not, the operation proceeds to step 21105 to effect error processing Upon the completion of error processing, the operation is ended in step 21106 via route 211051. When processing in steps 21102 or 21104 is completed, the operation is ended at step 21106 via respective route 211021 or 211041.

A flowchart describing common dimension word subroutine processing (step 21102) is shown in FIG. 10(*b*).

In step 2110200, processing is commenced, and in step 2110201, a determination is made as to whether the dimension word represents a rotational dimension (A, B, C, D), a linear positional dimension (X, Ye Z, U, V, W, P, Q, R, I, J, K) or is something else. In the case of a rotational dimension, the operation proceeds to step 2110202 via route 21102012 to determine the presence of a group parameter setting. If none exists, the operation proceeds via route 21102022 to step 2110203 to store the block in the relevant memory without further processing of its data including, the dimension words/subwords. Upon completion of this operation, the process is ended in step 2110209 via route 21102031.

If it is determined in step 2110202 that a parameter setting has been provided, the operation proceeds via route 21102021 to step 2110204 in which the dimension word subwords for which parameter settings have been provided are added as second and ensuing characters and are, together with the designated numerical values, recorded in the appropriate area of the control program memory. This processing is repeated until the dimension words/subwords for which parameter settings have been provided are exhausted. Upon completion, the operation is ended in step 2110209 via route 21102041.

If it is determined in step 2110201 that the dimension word represents a linear positional dimension, the operation proceeds to step 2110205 via route 21102011 to determine the presence of a group parameter setting. If there is none, the operation proceeds via route 21102052 to step 2110206 to effect processing in which the block is recorded in the relevant memory area without further processing of the data of the block including the dimension word subwords. Upon completion of this operation, end step 2110209 is reached via route 21102061.

If it is determined in step 2110205 that a parameter setting has been provided, the operation proceeds via route 21102051 to step 2110207 in which the dimension word subwords for which parameter settings have been provided are added as second and ensuing characters and are, together with the designated numerical values, recorded in the the appropriate area of the control program memory 115122. This processing is repeated until the dimension word subwords for which parameter settings have been provided are exhausted. Upon completion, the operation is ended in step 2110209 via route 21102071.

In step 2110201, in a case where a dimension other than a rotational dimension (A, B, C, D) or a positional dimension (X, Y, Z, U, V, W, P, Q, R, I, J, K) is specified or where no alphabetical character is provided as the initial character, the operation proceeds to step 2110208 via route 21102013 to effect error processing After this, the operation is ended in step 2110209 via route 21102081 A flowchart illustrating group dimension word subroutine processing (step 21104) is shown in FIG. 10(*c*).

In step 2110400, processing is commenced, following which a determination is made of the presence of a group parameter setting in step 2110400. If the parameter setting has not been provided, the operation proceeds to step 2110402 via route 21104012 to carry out error processing. The operation subsequently ends in step 2110404 via route 21104021.

On the other hand, if a group parameter setting has been provided, the operation proceeds via route 21104011 to step 2110403 in which the block, which has a dimension word/subword used exclusively for a given group, is recorded in the area of the control program memory for that particular group. Upon completion of processing, the operation is ended in step 2110404 via route 21104031.

The processing of step 211 is completed by the above-described operations (4) S processing The processing conducted with respect to spindle speed words, all of which commence with the character "S", will now be described with reference to FIGS. 11(*a*)–11(*c*).

Figure 11A:
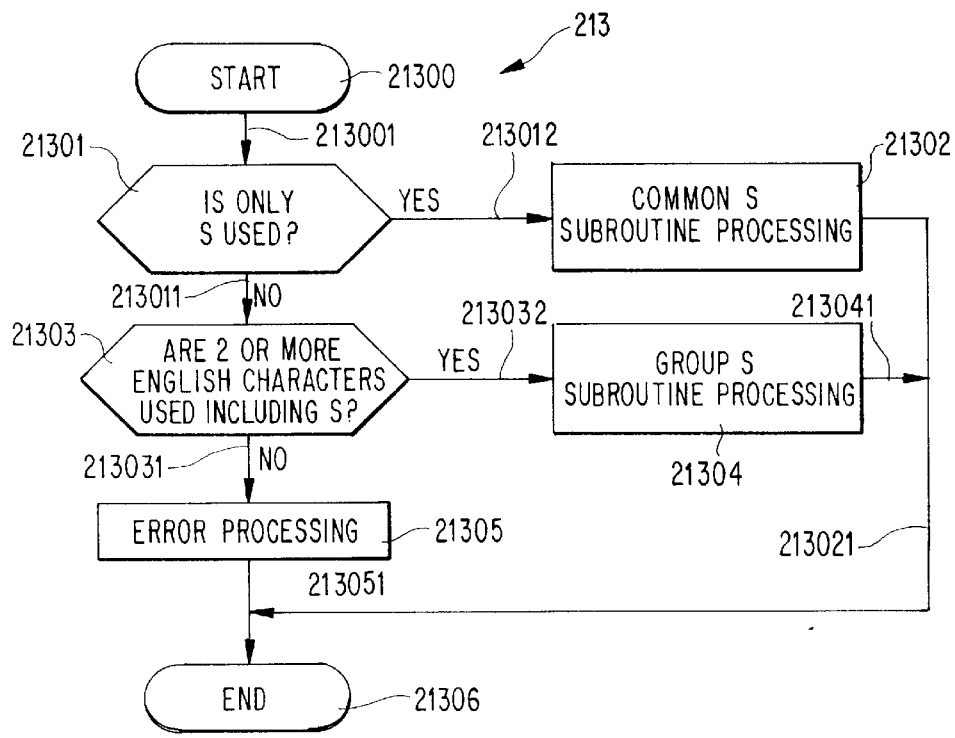
FIG. 11(a) is a detailed flowchart (S processing) of Step 213 shown in FIG. 7.
Figure 11B:
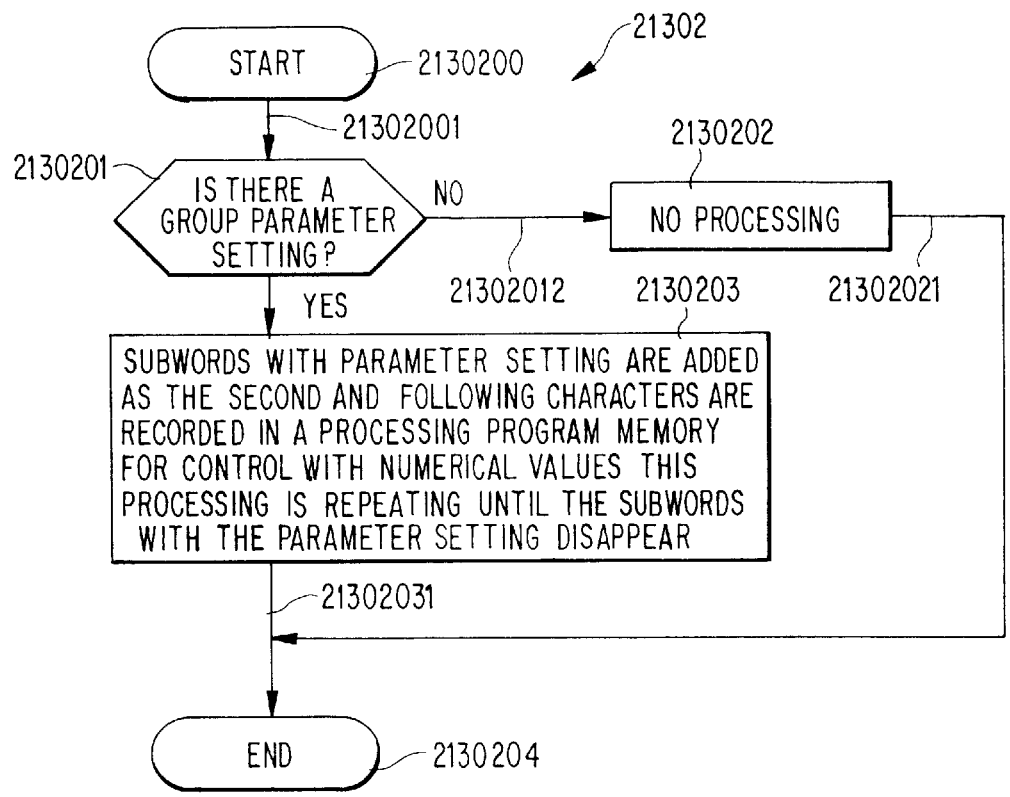
FIG. 11(b) is a detailed flowchart (common S subroutine) of Step 21302 shown in FIG. 11(a)
Figure 11C:
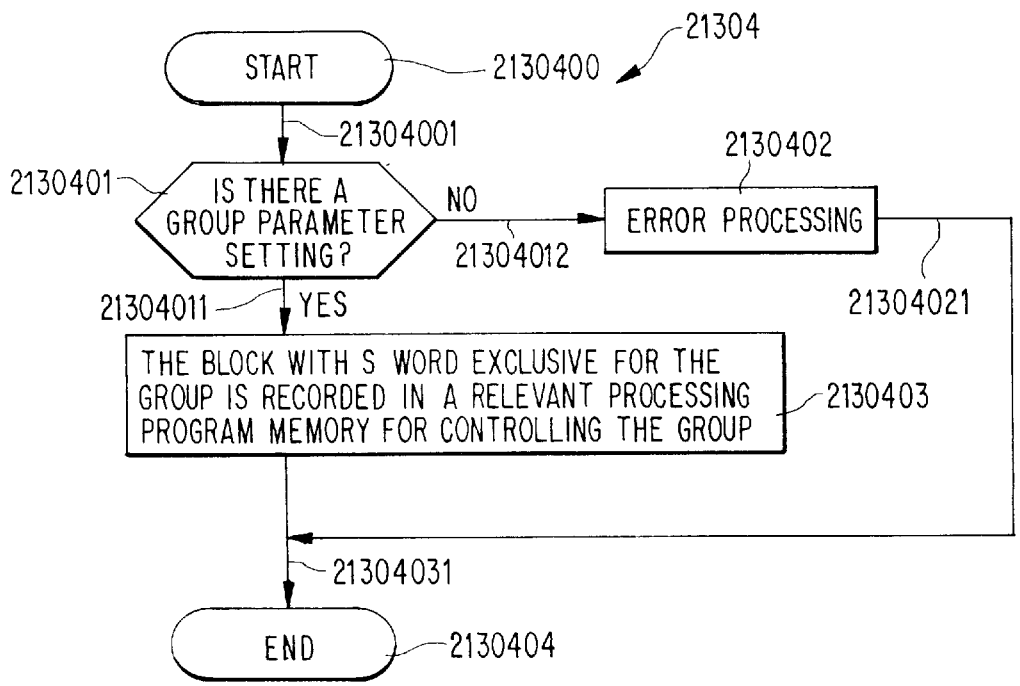
FIG. 11(c) is a detailed flowchart (group S subroutine) of Step 21304 shown in FIG. 11(a)

In FIG. 11(*a*), processing is commenced at step 21300. In step 21301, a determination is made as to whether the block in question has only a single initial alphabetical character "S". If the answer is yes, the operation proceeds to step 21302 via route 213012 to effect processing of a common S subroutine (see FIG. 11(*b*)). In step 21301, if it is determined that there are other characters and not just the single alphabetical character S, the operation proceeds to step 21303 via route 213011 to determine whether there are two or more characters in the block, including the initial alphabetical character S. If the answer is yes, the operation proceeds to step 21304 (FIG. 11(*c*)) via route 213032 to effect S group subroutine processing. If it is determined in step 21303 that S is included as the initial character of the block but two or more characters are not present, the operation proceeds to step 21305 via route 213031 to effect error processing, following which the operation is ended at step 21306 via route 213051.

When the processing of step 21302 or 21304 is completed, the operation ends at step 21306 via routes 213021 or 213041.

The common S subroutine processing of step 21302 is shown in detail in the flowchart of FIG. 11(*b*).

In step 2130200, processing is started, and in step 2130201, the presence of a group parameter setting is determined. If it is determined that no group parameter setting has been provided, the operation proceeds via route 21302012 to step 2130202 so as to record the block in the relevant memory without providing any additional processing of the data of the block. Upon completion of this process, the operation ends at step 2130204 via route 21302021.

If it is determined that a group parameter setting has been provided, the operation proceeds via route 21302011 to step 2130203 in which the subwords for which parameter settings have been provided are added as second and ensuing characters and are, together with their associated numerical values, recorded in the appropriate area of the control program memory. This process is repeated until there are no further subwords for which parameter settings have been provided. Upon completion of this process, the operation ends at step 2130209 via route 21302031.

The S group subroutine processing of step 21304 is shown in detail in the flowchart of FIG. 11(*c*). In step 2130400, processing begins, and in step 2130401, a determination is made as to the presence of a group parameter setting. If the answer is affirmative, the operation proceeds via route 21304011 to step 2120403. Here processing is effected through which a block having an S word which is exclusively for use with a given group is recorded in the relevant memory area for controlling that group. Upon completion of this processing, the operation is ended at step 2130404 reached via route 21304031.

If it is determined in step 2130401 that no group parameter setting has been provided, the operation proceeds to step 2130402 via route 21304012 to effect error processing. Upon completion of this processing, the operation is ended at step 2130404 via route 21304021. The processing of step 213 of FIG. 11(*a*) is completed through the above-described operations.

(5) M processing

The technique by which the miscellaneous function words (M words) are processed will now be described in detail, with reference to FIGS. 12(*a*)–12(*c*).

Figure 12A:
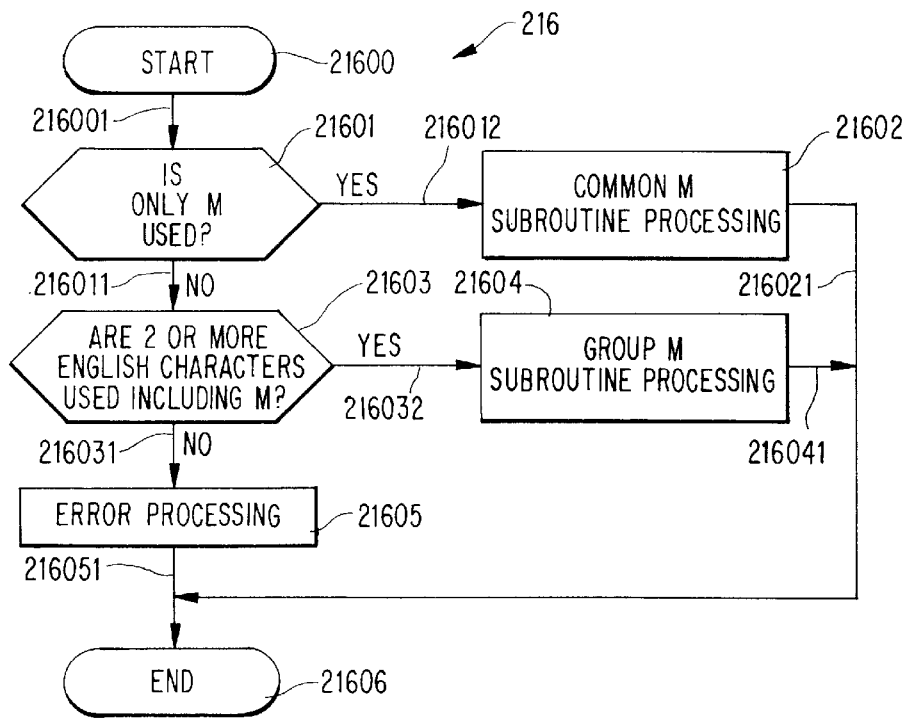
FIG. 12(a) is a detailed flowchart (M processing) of Step 216 shown in FIG. 7.
Figure 12B:
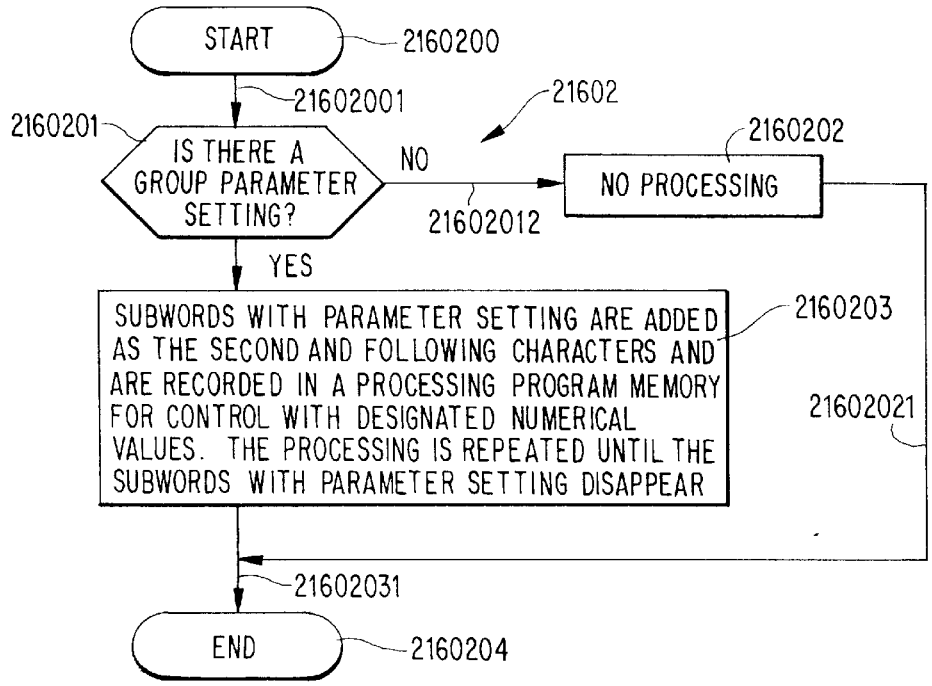
FIG. 12(b) is a detailed flowchart (common M subroutine) of Step 21602 shown in FIG. 12(a)
Figure 12C:
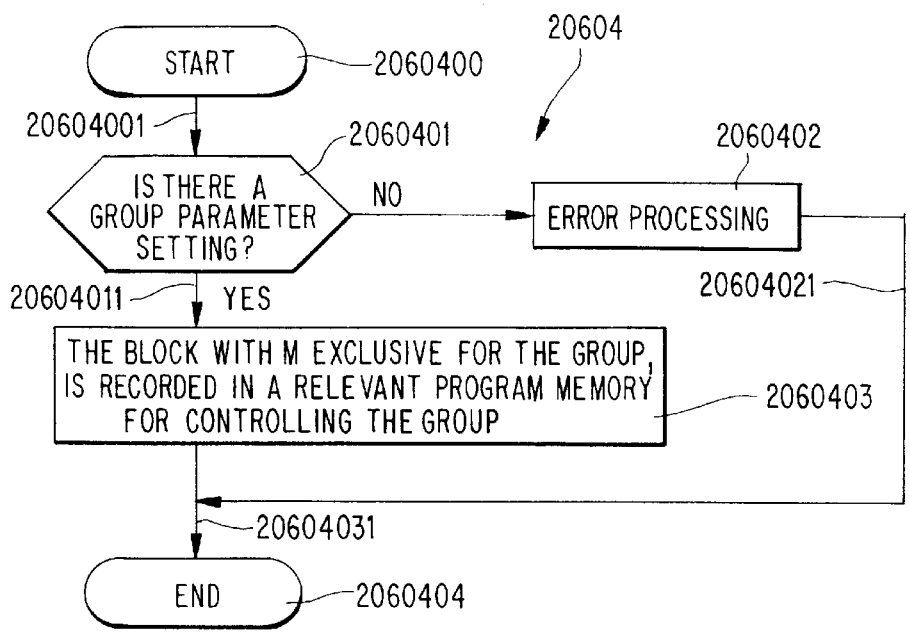
FIG. 12(c) is a detailed flowchart (group M subroutine) of Step 21604 shown in FIG. 12(a)

In step 21600, FIG. 12(*a*), processing is commenced. In step 21601, a determination is made as to whether there is only one initial alphabetical character (M) in the block. If there is only one character, the operation proceeds to step 21602 (FIG. 12(*b*)) via route 216012 to effect the processing of a common M subroutine. If it is determined in step 21601 that not only M is used as the initial character of the block, the operation proceeds via route 216011 to step 21603 in which it is determined whether there are two or more characters in the block, including initial alphabetical character M. If so, the operation proceeds to step 21604 (FIG. 12(*c*)) via route 216032 to effect M group subroutine processing If it is determined via step 21603 that character M is included as the initial character of the block but two or more characters are not present, the operation proceeds to step 21605 via route 216031 to carry out error processing. Upon completion of this processing, operations are ended at step 21606 reached via route 216051.

When the processing of either step 21602 or 21604 is complete, the operation ends at step 21606 via route 216021 or 216041.

Common M subroutine processing (step 21602) is shown in detail in the flowchart of FIG. 12(*b*). In step 2160200, processing is commenced, and in 2160201, a determination is made as to the presence of a group parameter setting. If such is found, the operation proceeds via route 21602011 to step 2160203 in which subwords for which parameter settings have been provided are added as second and ensuing characters and are, together with the designated numerical values of the M word, recorded in the appropriate location in the control program memory. Processing is continued until the subwords for which parameter settings have been provided are exhausted. Upon completion of this processing, the operation ends in step 2160204 reached via route 21602031. On the other hand, if it is determined in step 2160201 that no group parameter setting has been provided, the operation proceeds via route 21602012 to step 2160202 to effect processing in which the block is recorded in the relevant memory without further processing.

Upon completion of such processing, operations end at step 2160204.

M group subroutine processing (step 20604) is shown in detail in the flowchart of FIG. 12(*c*). In step 2060400, processing begins, and in step 2060401, a determination is made as to the presence of a group parameter setting. If a group parameter setting has been provided, the operation proceeds via route 20604011 to step 2060403 to effect processing in which a block in which the M word is used exclusively for a given group is recorded in the relevant control program column (memory) for that group. Upon completion, the operation is ended at step 2060404 via route 20604031.

On the other hand, if it is determined in step 2060401 that no group parameter setting has been provided, the operation proceeds via route 20604012 to step 2060402 to effect error processing, and operations then end at step 2060404.

(6) F processing

The processing undertaken with respect to the feed function words F will now be described, with particular reference to FIGS. 13(*a*)–13(*c*).

Figure 13A:
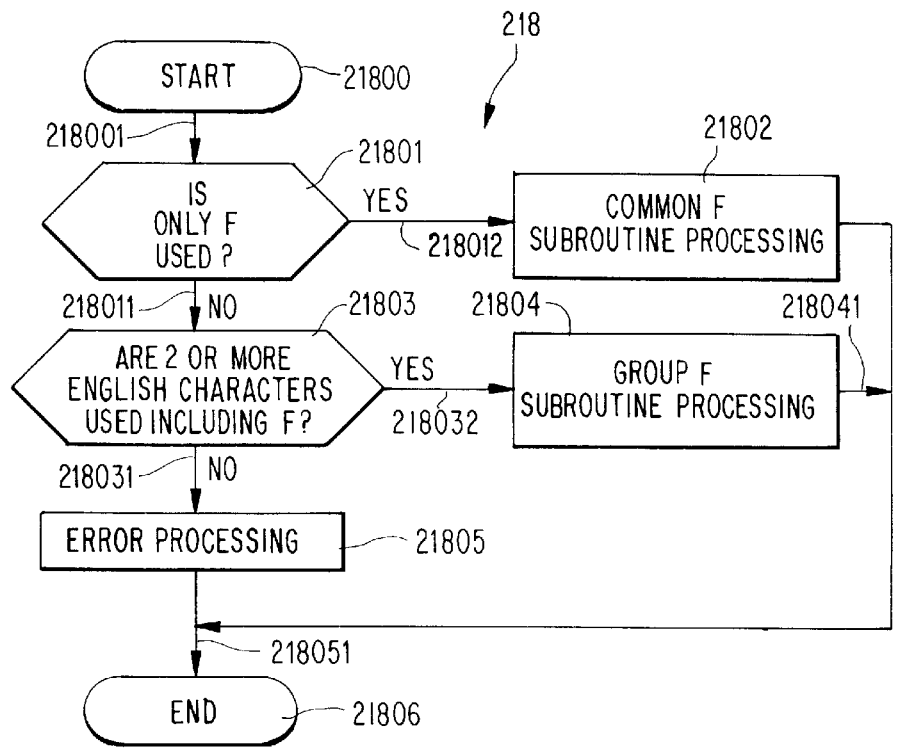
FIG. 13(a) is a detailed flowchart (F processing) of Step 218 shown in FIG. 7.
Figure 13B:
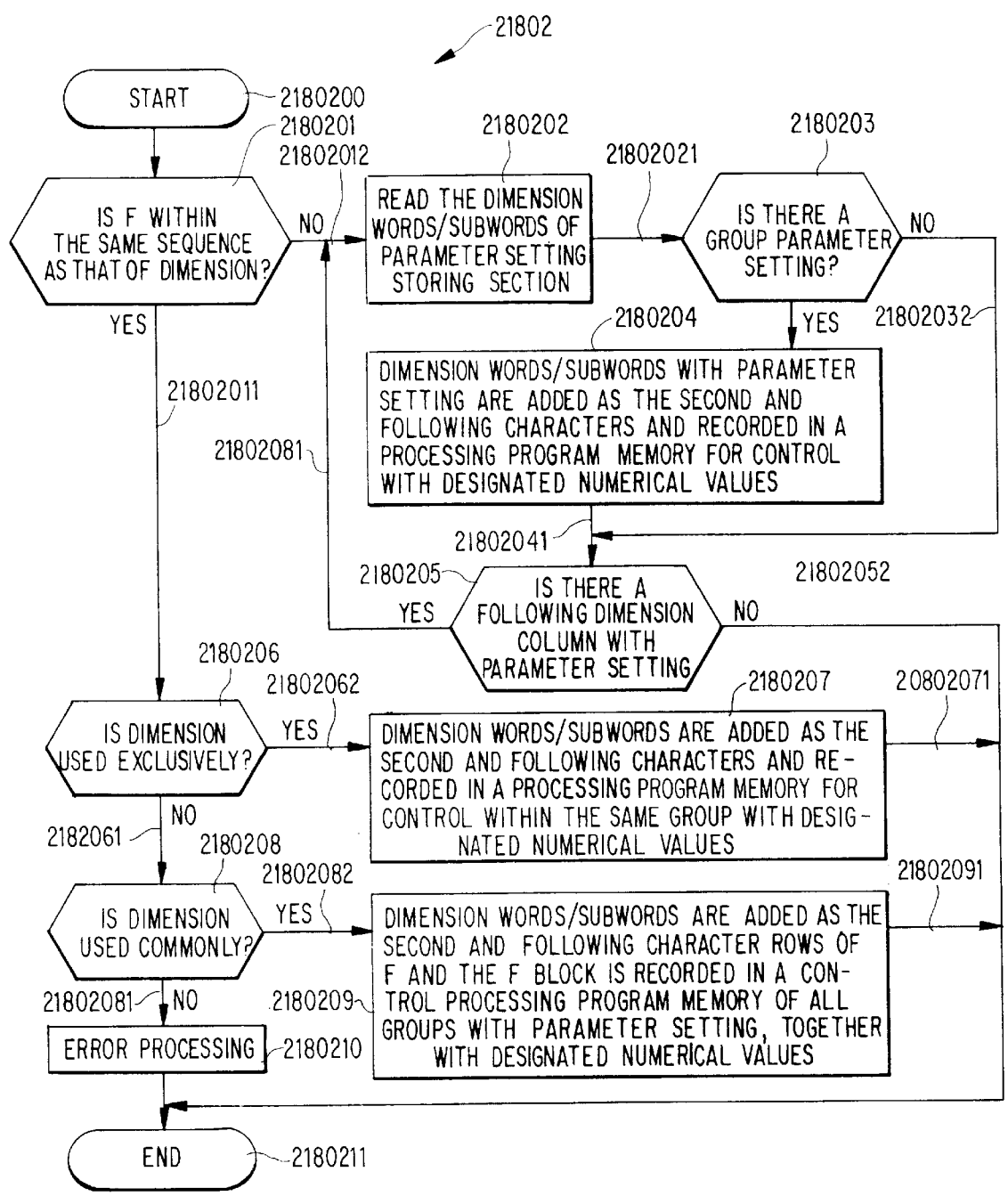
FIG. 13(b) is a detailed flowchart (common F subroutine) of Step 21802 shown in FIG. 13(a)
Figure 13C:
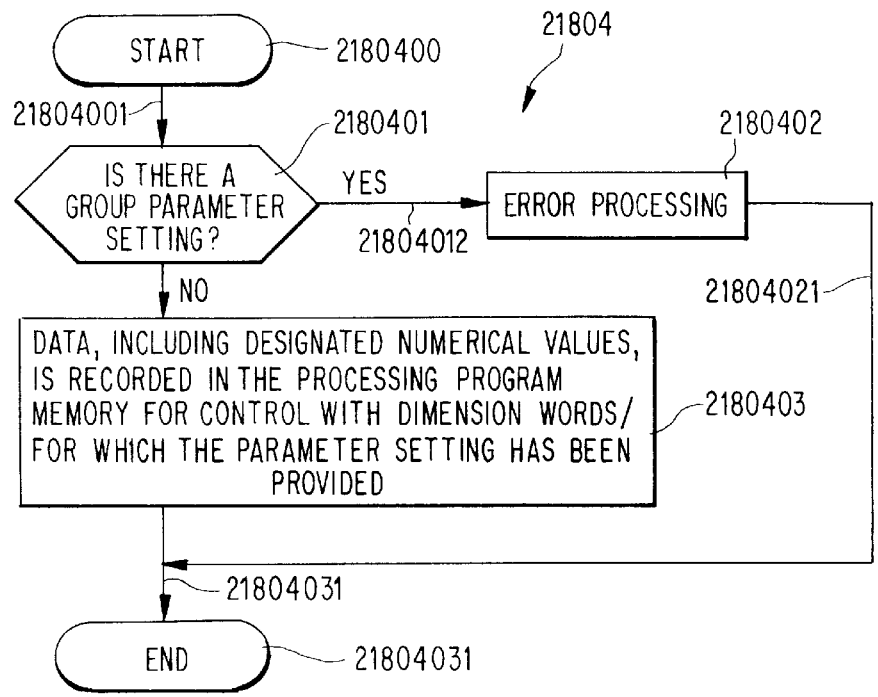
FIG. 13(c) is a detailed flowchart (group F subroutine) of Step 21804 shown in FIGS. 13(a)
Figure 14A:
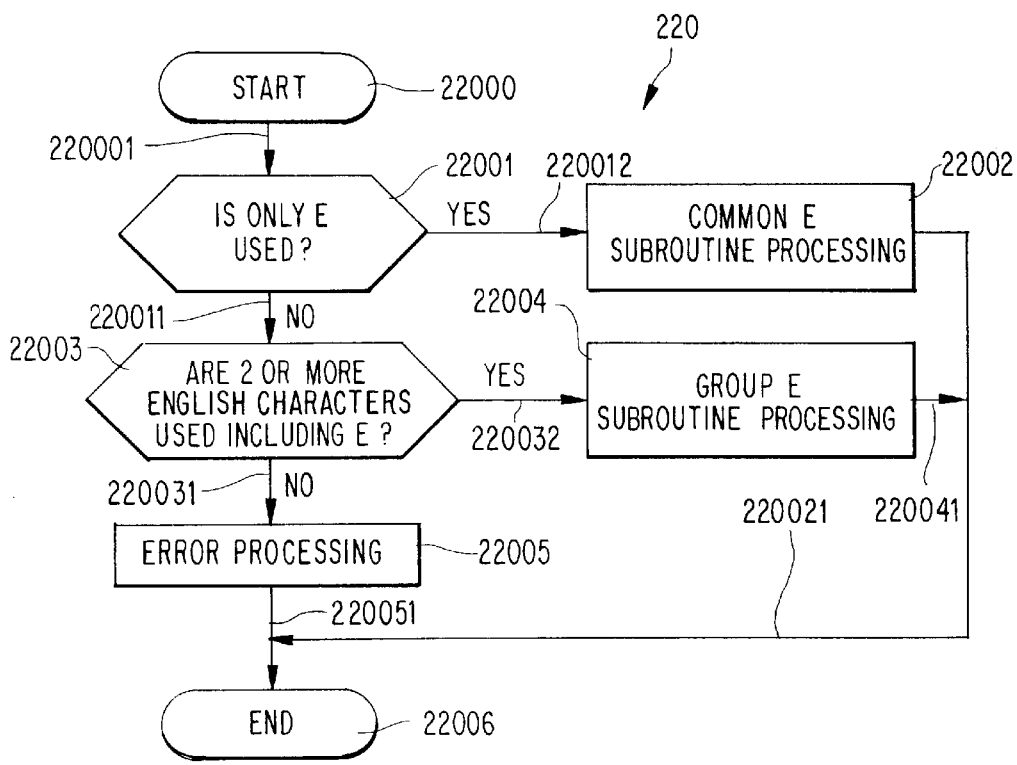
FIG. 14(a) is a detailed flowchart (E processing) of Step 220 shown in FIG. 7.
Figure 14B:
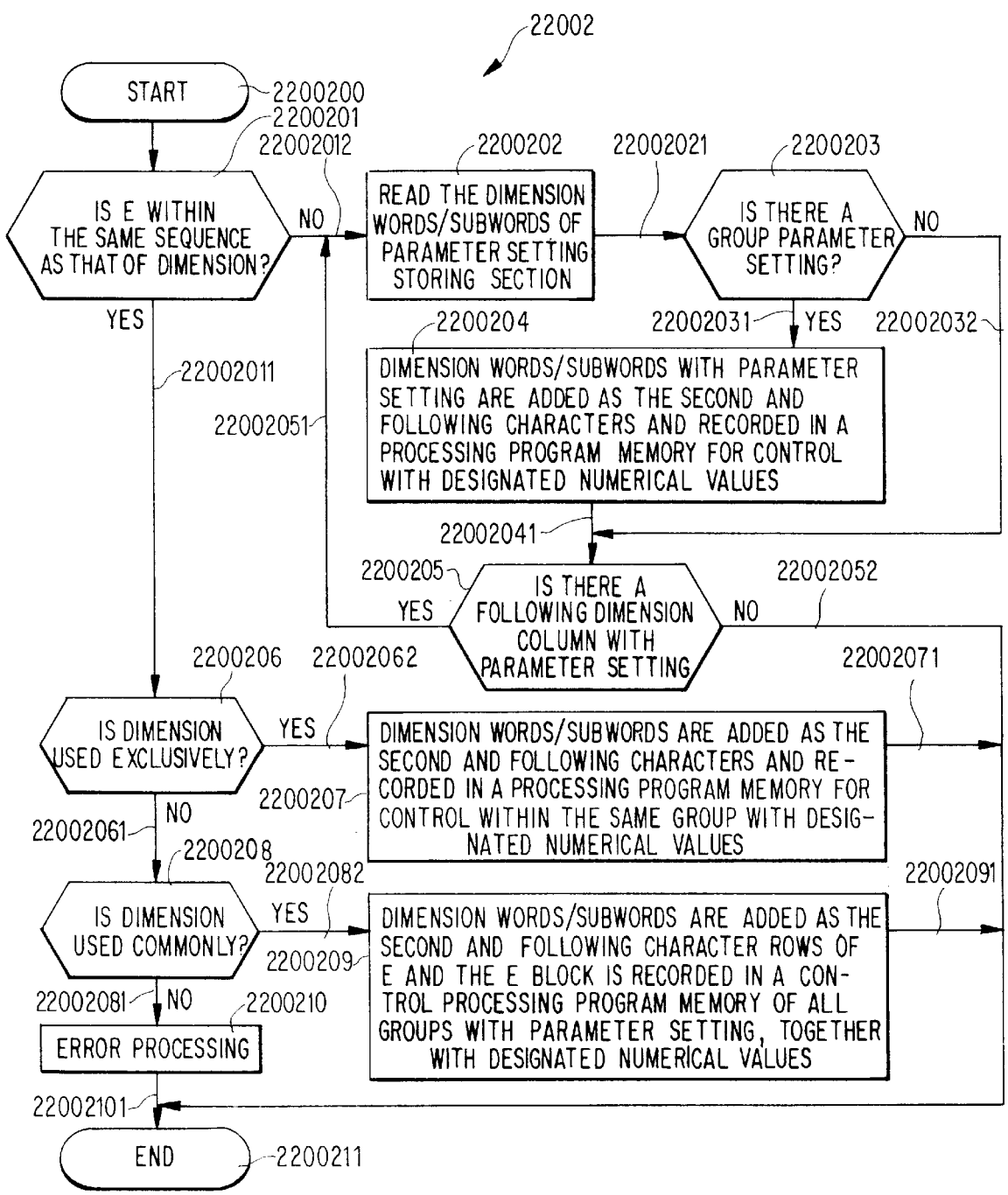
FIG. 14(b) is a detailed flowchart (common E subroutine) of Step 22002 shown in FIG. 14(a)
Figure 14C:
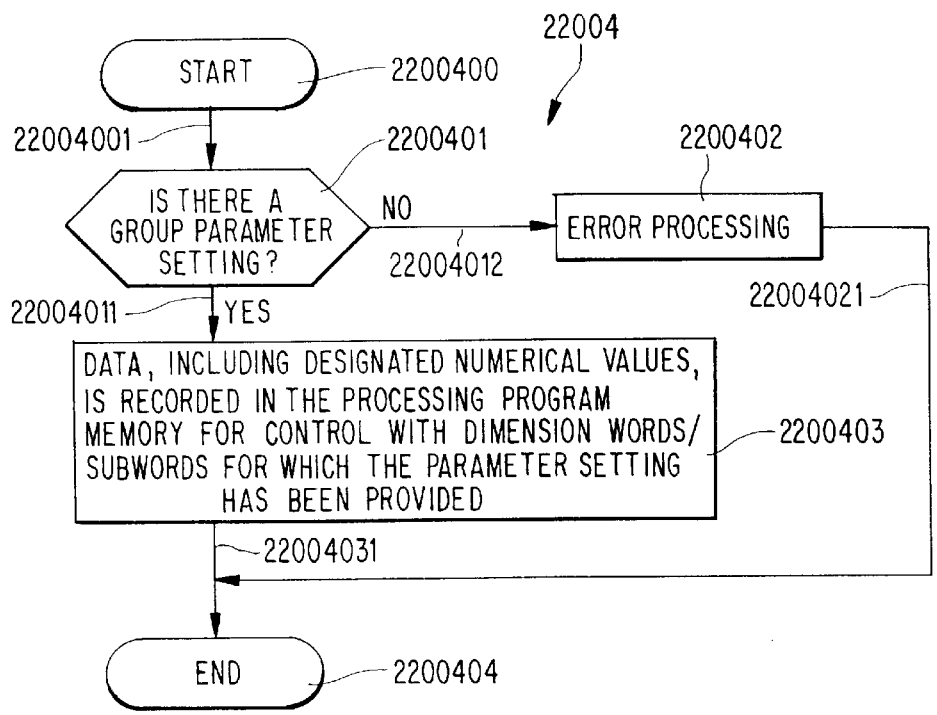
FIG. 14(c) is a detailed flowchart (group E subroutine) of Step 22004 shown in FIG. 14(a)

First in FIG. 13(*a*), processing is begun in step 21800. In step 21801, a determination is made as to whether or not only one initial character (F) is used to begin the block. If so, the operation proceeds to step 21802 (FIG. 13(*b*)) via route 218012 to effect the processing of a common F subroutine. If it is determined in step 21801 that the initial character of the block is not a single character F, the operation proceeds to step 21803 via route 218011 to determine whether there are two or more initial characters in the block, including the initial character F. If there are two or more characters, the operation proceeds to step 21804 (FIG. 13(*c*)) via route 218032 to effect group subroutine processing. If it is determined in step 21803 that F is included as the initial character of the block but two or more characters are not present, the operation proceeds to step 21805 via route 218031 to carry out error processing Upon completion of such processing, the operation is ended at step 21806.

When the processing of steps 21802 or 21804 is completed, the operation is ended at step 21806, reached via respective routes 218021 or 218041.

Common F subroutine processing (step 21802) is illustrated in detail in the flowchart shown in FIG. 13(*b*).

In step 2180200, processing is commenced. In step 2180201, a determination is made as to whether or not this F is within the same sequence as a dimension. If not, the operation proceeds to step 2180202 via route 21802012 to read the dimension words and subwords from the parameter storage, and the operation proceeds via a route 21802021 to step 2180203 to determine whether or not a group parameter setting (FIGS. 2(*a*), 2(*b*)) has been provided. If a group parameter setting has not been provided, the operation proceeds to step 2180205 via route 21802032, and, if a group parameter has been set, the operation proceeds to step 2180204 via route 21802031. In the latter case, processing is performed to add the dimension words/subwords for which parameter settings have been provided (FIG. 2(*c*)) as second and ensuing characters and store them, together with the designated numerical values, in the relevant control program memory. Upon completion of this process, the operation proceeds to step 2180205 via route 21802041 to determine the presence of an ensuing group parameter for which a setting has been provided. If such exists, the operation returns to step 2180202 via route 21802051 to repeat steps 2180202–2180204 until all group parameter "columns" in FIG. 2(*b*) have been processed.

If it is determined in step 2180205 that there is no ensuing group parameter column for which a parameter setting has been provided, the operation ends at step 2180211 reached via route 21802052.

If it is determined in step 2180201 that F appears within the same sequence as a dimension, the operation proceeds to step 2180206 via route 21802011 to determine whether or not the dimension is used exclusively. If so, in step 2180207, processing is performed in which words that are of the same classification as the dimension are added as second and ensuing characters and are, together with their designated numerical values, recorded in the processing control program memory section for given group.

Upon the completion of this processing, operations are ended at step 2180211 reached via route 21802071.

If it is determined in step 2180206 that the dimension is not used exclusively, the operation proceeds to step 2180208 via route 21802061 to determine whether or not the dimension is used commonly. If so, the operation proceeds to step 2180209 via route 21802082 to effect processing in which dimension words/subwords for which parameter settings have been provided are added as second and ensuing characters on F, and the F block is, together with the designated numerical values, recorded in the relevant memory for all groups for which parameter settings have been provided Upon completion of this processing, the operation is ended in step 2180211 via route 21802091.

If it is determined in step 2180208 that the dimension is not used commonly, the operation proceeds to step 2180210 via route 21802081 to carry out error processing. Upon completion of this, the operation is ended in step 2180211.

Group F subroutine processing (step 21804) is described in detail in the flowchart of FIG. 13(*c*). In this figure, step 2180400 indicates the start of processing In step 2180401, a determination is made as to the presence of a group parameter setting If the answer is affirmative, the operation proceeds to step 2180403 via route 21804011 to effect processing in which the block, including the designated numerical values and dimension words/subwords, is recorded in the control program memory areas for the groups for which parameter settings have been provided. Upon the completion of this processing, the operation is ended in step 2180404 via route 21804031.

On the other hand, if it is determined in step 2180401 that no group parameter setting has been provided, the operation proceeds to step 2180402 via route 21804012 to carry out error processing The operation then ends at step 2180404.

(7) E processing

As described previously, character E is used as a feed word according to the invention, in the same manner as character F. Therefore, the treatment of E words is identical to that of F words, that is, the same processing is performed. For purposes of completeness, FIGS. 14(*a*)–14(*c*) illustrate the processing of blocks initiated by E characters, it being understood that the processing conducted is for all practical purposes identical to that described in connection with FIGS. 13(*a*)–13(*c*).

(8) Comma processing

Figure 15:
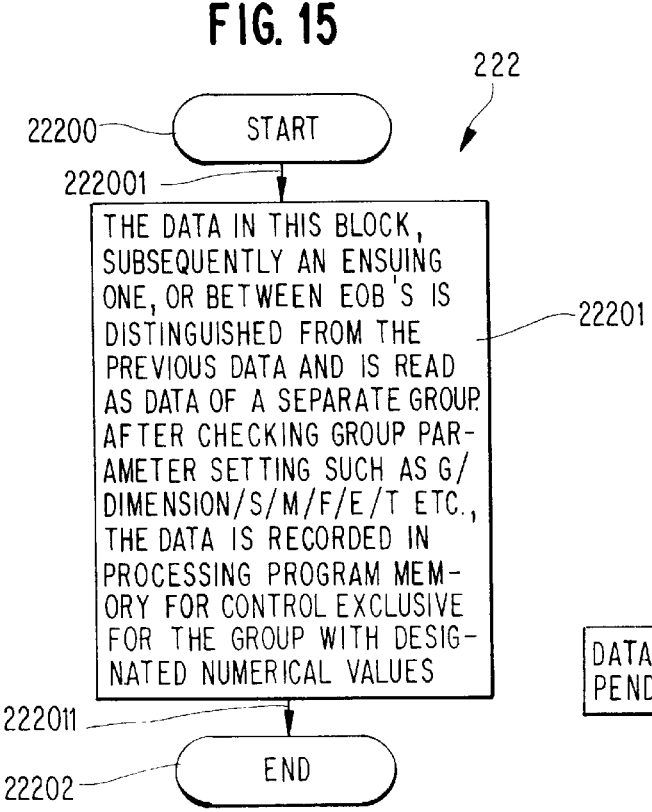

Comma processing, as described in connection with FIG. 7, step 222, is detailed in the flowchart of FIG. 15. As will be recalled from the previous discussion, commas are used to negate simultaneous action in the case of multiple instructions within the same sequence. Here, processing is commenced in step 22200. In step 22201, processing is effected in which the data in this block, i.e., the ensuing block, or that between EOB's is distinguished from previous data, and is read as the data of a separate group. After checking the group parameter settings for G, the dimensions, S, M, F, E, T, etc, the data are, together with their designated numerical values, recorded in the processing control program memory used exclusively for the given group. Upon completion of this processing, the operation is ended in step 22202.

(9) Error processing

Figure 16:
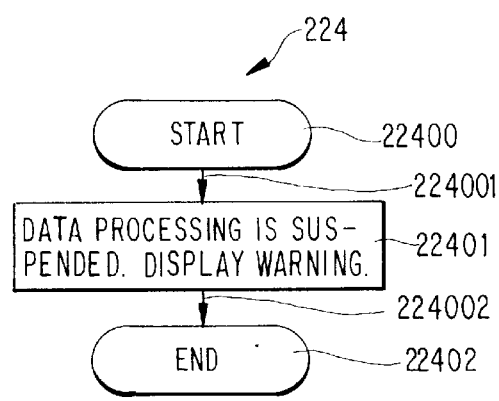

The details of error processing as conducted in step 224 of FIG. 7 are explained in FIG. 16. Here, processing is commenced in step 22400 and step 22401, data processing is suspended. Processing is effected to display a warning corresponding to the content of the error. Upon the completion of this process, the operation is ended at step 22402.

(10) M02/M30 processing

Figure 17:
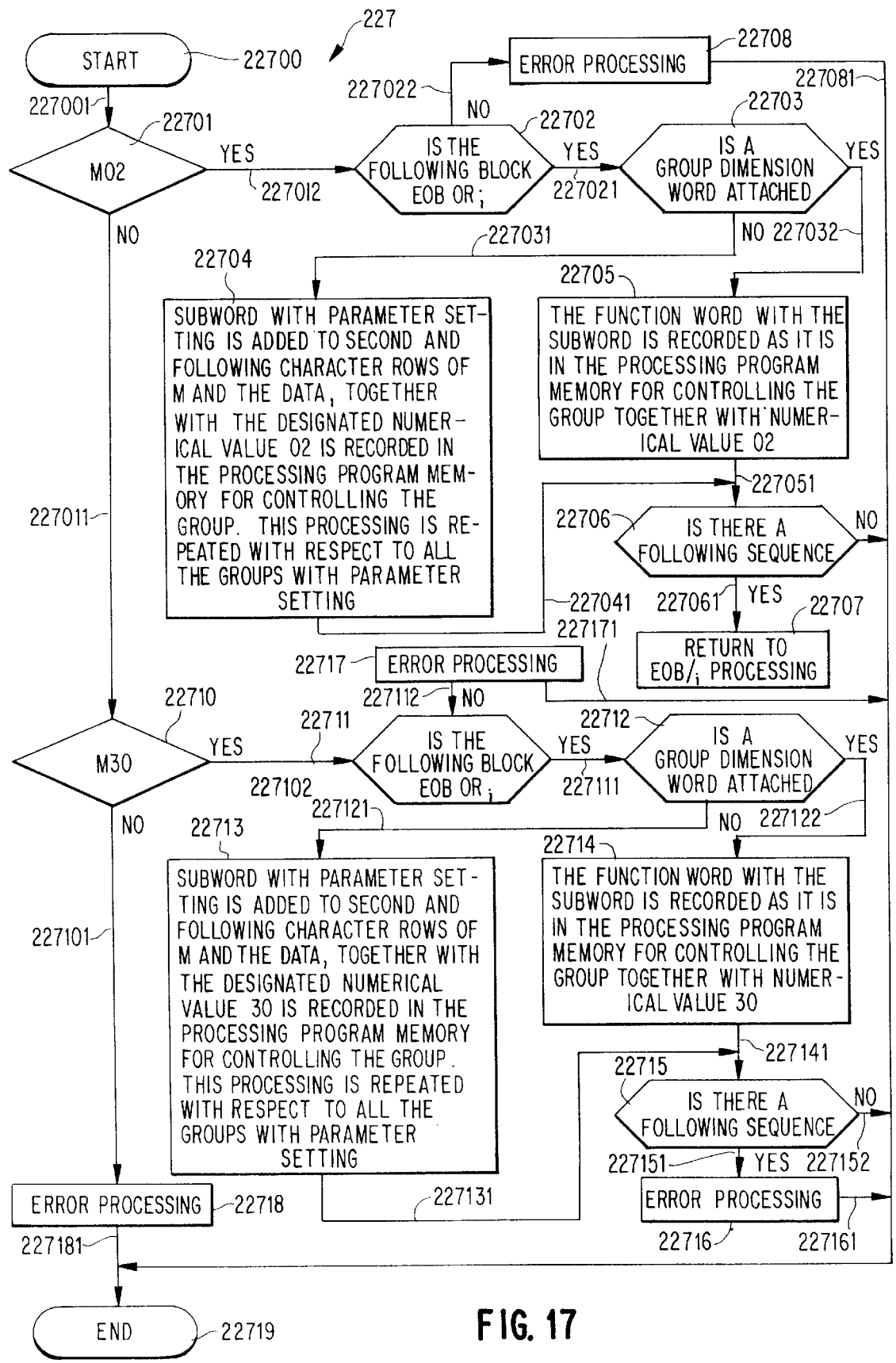
Figure 18:
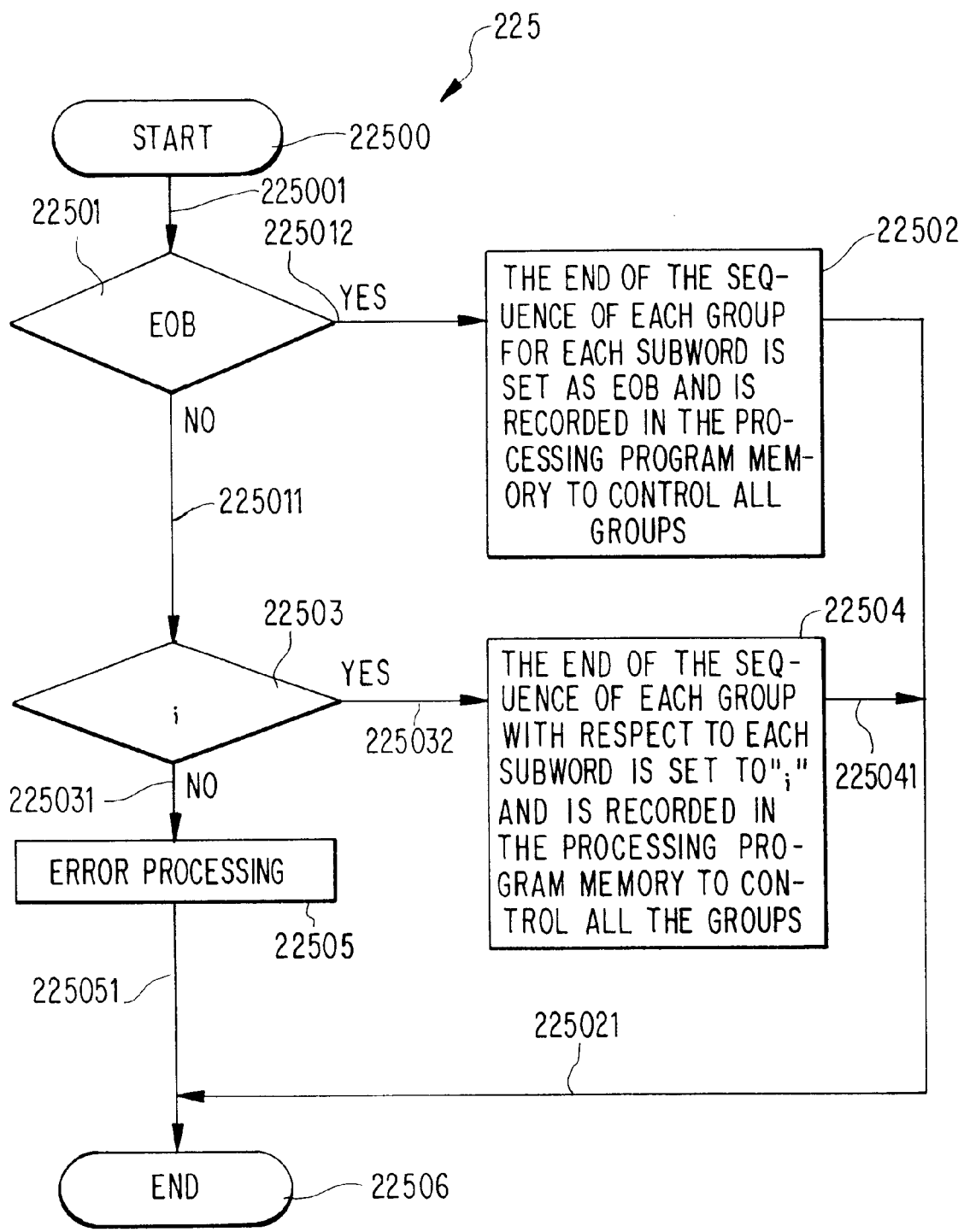

Processing of these particular miscellaneous function words, described previously with respect to step 227 of FIG. 7, will be detailed in the following and illustrated in accompanying FIG. 17.

In step 22700, processing begins, and in step 22701, a determination is made as to whether or not the function word is M02. If it is, the operation proceeds to step 22702 via route 227012 to determine whether or not the ensuing block is EOB or ";". If so, the operation proceeds to step 22703 via route 227021 to determine the presence of an attached subword. If a subword is attached, the operation proceeds to step 22705 via route 227032 to effect processing in which the function word with the attached subword, together with the designated numerical values, is recorded as is in the control program memory for the given group. Upon the completion of this processing, the operation proceeds to step 22706 via route 227051 to determine the presence of an ensuing sequence If one exists, the operation moves to step 22707 via route 227061, where the operation shifts to the EOB/";" processing of step 223 (FIG. 7). On the other hand, if it is determined that there is no ensuing sequence, the operation ends in step 22719 via route 227062.

If it is determined in step 22703 that the function word does not have an attached subword, the operation proceeds via route 227031 to step 22704 in which subwords for which parameter settings have been provided are added as second and ensuing characters on M, and the data is, together with the designated numerical value 02, recorded in the control program memory for the given groups. This processing is repeated with respect to all groups for which a parameter setting has been provided. Upon completion of this processing, the operation is ended at step 22706 reached via route 227041. Step 22706 and the ensuing steps have been described above. If it is determined in step 22702 that an EOB or ";" is not present, the operation proceeds to step 22708 via route 227022 to effect error processing and an appropriate message display, for example, "Program error; no sequence end". The operation then proceeds to step 22719 via route 227081.

If it is determined in step 22701 that the function word is not M02, the operation proceeds to step 22710 via route 227011 to determine the presence of M30. If M30 is present, the operation proceeds to step 22711 where it is determined whether or not the ensuing block is an EOB or a ";". If it is, the flow then proceeds to step 22712 via route 227102 to determine whether or not the function word has a subword attached thereto. If so, the operation proceeds to step 22714 via route 227122 to effect processing in which the function word having the subword attached thereto is, together with the designated numerical value 30, recorded as is in the control program memory section for the corresponding group. Upon completion of this processing, the operation proceeds to step 22715 via route 227141 to determine the presence of an ensuing sequence. If such exists, the operation proceeds to step 22716 via route 227151 to effect error processing and a suitable message display, for instance, "Program end error". Upon completion of this processing, the operation is ended in step 22719 via route 227161.

On the other hand, if it is determined in step 22715 that there is no ensuing sequence, the operation is ended in step 22719 via route 227152.

If it is determined in step 22712 that no subword is attached to the function word, the operation proceeds via route 227121 to step 22713 in which subwords for which parameter settings have been provided are added as second and ensuing characters on M and are, together with the numerical value 30, written in the control program memory for the respective groups. This processing is repeated with respect to all groups for which parameter settings have been provided. When this processing is completed, the operation proceeds to step 22715 via route 227131. This step (22715) and the ensuing steps have already been described.

(11) EOB/";" (sequence end) processing

In step 22500, processing is started, and it is determined in step 22501 whether EOB is present. If the answer is yes, the operation proceeds to step 22502 via route 225012 to effect processing in which the end of the sequence of each group for each subword is set to EOB and is recorded in the control program memory for all the groups. Upon completion of this process, the operation is ended at step 22506 via route 225021. On the other hand, if it is determined in step 22501 that EOB is not present, the operation proceeds to step 22503 via route 225011 to determine the presence of ";". If the answer is affirmative, the operation proceeds to step 22504 to effect processing in which the end of the sequence of each group with respect to each subword is set to "," and is recorded in the processing program memory for controlling all the groups. Upon completion of this processing, the operation is ended at step 22506 via route 225041.

If it is determined in step 22503 that ";" is not present, the operation proceeds to step 22505 via route 225031 to carry out error processing. The operation then ends in step 22506 via route 225051.

In preparing the control programs seen in FIG. 19, for example, unrelated data and unnecessary data are corrected by alarms that are issued automatically via the above-described processes, by CNC program format checking, and by checking of the processing control program format. As one example, program sequence No. N139, SA320, SSB320, M03;, if developed into control sequences for the three group A, B, and C, would be translated as $(n_a)$139 SA320 MA03;, $(n_b)$139 SSB320 MSB03;, $(n_c)$139 MSC03; by the above described program expansion software. However, $(n_c)$139 MSC03 performs no operation because there is no associated speed data (e.g., an S instruction). In all probability, the operator, in writing sequence No. 139, forgot that the use of the common M instruction M03 would result in an entry in the group C column or control program memory, because of the parameter settings. The checking routine takes care of this by automatically erasing a developed program portion such as in this example where there is, for example, no accompanying data. The expanded control programs in the columns of FIGS. 19(*a*) to 19(*o*) show the "cleaned up" sequences for controlling the three groups A, B, and C, stored in the control program memory 115122 in FIG. 1(*c*).

A brief example of operation will now be described with respect to the control of the multiple-system machine tool of FIG. 1, in accordance with an example using the control programs shown in FIGS. 19(*a*) to 19(*o*).

The processing programs created for controlling Groups A, B, and C, unlike the original processing program shown in the leftmost column of FIGS. 19(*a*) to 19(*o*), discriminate the method of control through the use of the common/group and simultaneous/independent labels in the first two columns of each sequence, entered as the processing programs are developed and processed: In the first column, label 1 indicates common sequence processing, and label 2 indicates group processing with respect to a given group or column.

In the second column, label 1 indicates simultaneous starting, label 2 indicates a synchronous operation, and label 0 indicates an arbitrary or independent start with respect to the respective columns.

Describing the three programs from the perspective of the start conditions, the same are arranged as follows:
from n1 to n3: Simultaneous starting for all Groups or Columns A, B, and C
from n4 to n44: Simultaneous starting, synchronous operation or arbitrary starting for Groups A and B, Group C idle
from n45 to n47: Independent starting for Group C
n48: Simultaneous starting of all Groups A, B, and C
from n49 to n103: Simultaneous starting, synchronous operation or independent starting for Groups A and C, Group B idle
n104: Simultaneous starting of Groups A, B, and C
from n105 to n122: Independent starting of Group C, Groups A and B idle
n123: Simultaneous starting of Groups A, B, and C
from n124 to n126: Simultaneous starting or arbitrary starting of Groups A and B, Group C idle
from n127 to n134: Independent operation of Groups A and B, Group C idle
from n135 to n139: Simultaneous starting of Groups A and B, Group C idle
from n140 to n147: Independent starting of Groups A and B, Group C idle
from n148 to n151: Simultaneous starting of all Groups A, B, and C Thus, it is possible to combine Groups A, B, and C into a single complex controlled system, yet allow for independent operation, simultaneous start up, synchronous operations, and arbitrary or independent start up.

To permit a better understanding of the operations performed in response to the sequence instructions, a description will now be given of the operations performed by a part of the program shown in FIGS. 3(*a*) to 3(*i*) and 19(*a*) to 19(*o*) and expanded for the groups in FIGS. 19(*a*) to 19(*o*).

Sequence n1: Simultaneous starting is effected for Groups A, B, and C to confirm that all of their control axes are at their origins. At this juncture, a control axis which has not reached its origin will be returned to its origin, and upon confirming that all the axes have arrived at their origins, the operation proceeds to sequence n2.

Sequence n2: The setting of all the control axes of Groups A, B, and C to an absolute coordinate system 0 is carried out by simultaneous starting. Upon completion, the operation proceeds to n3.

Sequence n3: Common sequence processing for Groups A, B, and C is set. By virtue of this setting, common sequence processing is effected from n4 through n47 until the setting G26 that follows in n48, so that sequences whose labels indicate simultaneous starting or synchronous operation do not start the ensuing sequence operation until the sequence operations of each group are completed.

Sequence n4: Tool 01 and tool correction 01 are set for Groups A, B, with simultaneous starting, to effect tool setting/replacement. Upon completion, the operation proceeds to n5.

Sequence n5: Positioning by rapid traversal is simultaneously started for Groups A and B to position the tools with respect to the workpiece, before beginning the cutting of workpiece faces A and B. Upon completion of this step, the operation proceeds to n6.

Sequence n6: Simultaneous starting is effected for Groups A and B, commanding the forward rotation of the main spindles of their respective main spindle heads at a rotary speed of 400 r.p.m. Upon completion, the operation proceeds to n7.

Sequence n7: A further positioning of the main spindle heads of Groups A and B is simultaneously started to position the tools for cutting of workpiece faces A and B. Upon completion of this step, the operation proceeds to n8.

Sequence n8: Synchronous operations are started for Groups A and B for rough cutting of the left leg end faces of the workpiece, at a cutting speed of 500 mm/minute in each case. Upon completion of this step, the operation proceeds to n9.

Sequence n9: A tool relief process is executed simultaneously for the heads of both Groups A and B. This process retracts the tool after a machining pass, prior to traversing to the start point for the next pass. Upon completion of this step, the operation proceeds to n10.

Sequence n10: Rapid traversal of the heads in the X-direction is effected for both Groups A and B.

Subsequent operations continue to be performed to machine the workpiece into the desired configuration. Those of skill in the art may readily interpret the program listing of FIGS. 19(*a*) to 19(*o*), and therefore a further step-by-step analysis is not believed necessary. However in generals it will be noted that from sequence n32 onwards, since designation 0 for arbitrary or independent starting is indicated for Groups A and B, machining operations are performed by independently advancing the sequences for each group whenever the operation of a preceding sequence is completed. Since simultaneous starting (label="1") is designated in sequence n35, operations subsequent to sequence n34 remain on standby until all of the groups complete n34. After all of the groups complete n34, the operation proceeds to sequence n35, where a simultaneous positioning operation is performed.

With control effected such that operations proceed in the above-described manner, the control of the complex machine tool described by way of example herein, previously requiring three independent numerical controllers and a PLC, can now be accomplished using a single numerical controller.

It will be appreciated that the process of converting a processing program into plural control programs may involve one of two methods: preprocessing; where the development of a processing program into plural control programs is carried out prior to controlling the machine tool, as has been described above; and simultaneous processing; where the control programs are stepwise separated into memories classified by the type of control and the group of the machine tool controlled at the same time that the sequence instructions are read. Preprocessing or simultaneous processing can be freely selected by providing a flag column for selectively setting the same inside the parameter memory section 115112 of the numerical controller. In the case of simultaneous processing, the same processing as in the aforementioned preprocessing operation is executed, although incrementally, and machine control is effected in exactly the same manner in terms of outer appearance. The advantage of simultaneous processing lies in saving the time of reading a long processing tape before starting machining operations.

Sequence No. 54 of the processing program illustrates one additional advantage of this invention. Here, an instruction, for example, the instruction GC01 XB-2559.009 YC+159.099 FC500 (n54 of the control program of FIG. 19) has been, according to the parameter settings, expanded so that a control axis (in this example, XB) not included in a group is in fact effectively included in the group (in this example, Group C) (see the Group C column of FIGS. 19(a) to 19(o) at sequence n54). With a parameter setting arranged to make this shift, and with the shift not involving any risk of collision (e.g., with independent motion not negated by the parameter table or the like), this type of control can be performed with a consequent reduction in overall processing time, or with additional functionality of the machine being made available. For example, with this capability, composite circular motion among axes of different groups is made possible, whereas such circular interpolation would not have been easily possible when carrying out instructions independently on a group by group control basis. It is possible in this manner to effect control by freely combining groups (in this example, C and B) in such a manner as to extend over plural groups.

In addition to the above example, with respect to one-system, multiple-axis control systems as well, control has become possible by effecting program development/rearrangement in an identical manner to that above described.

Figure 1E:
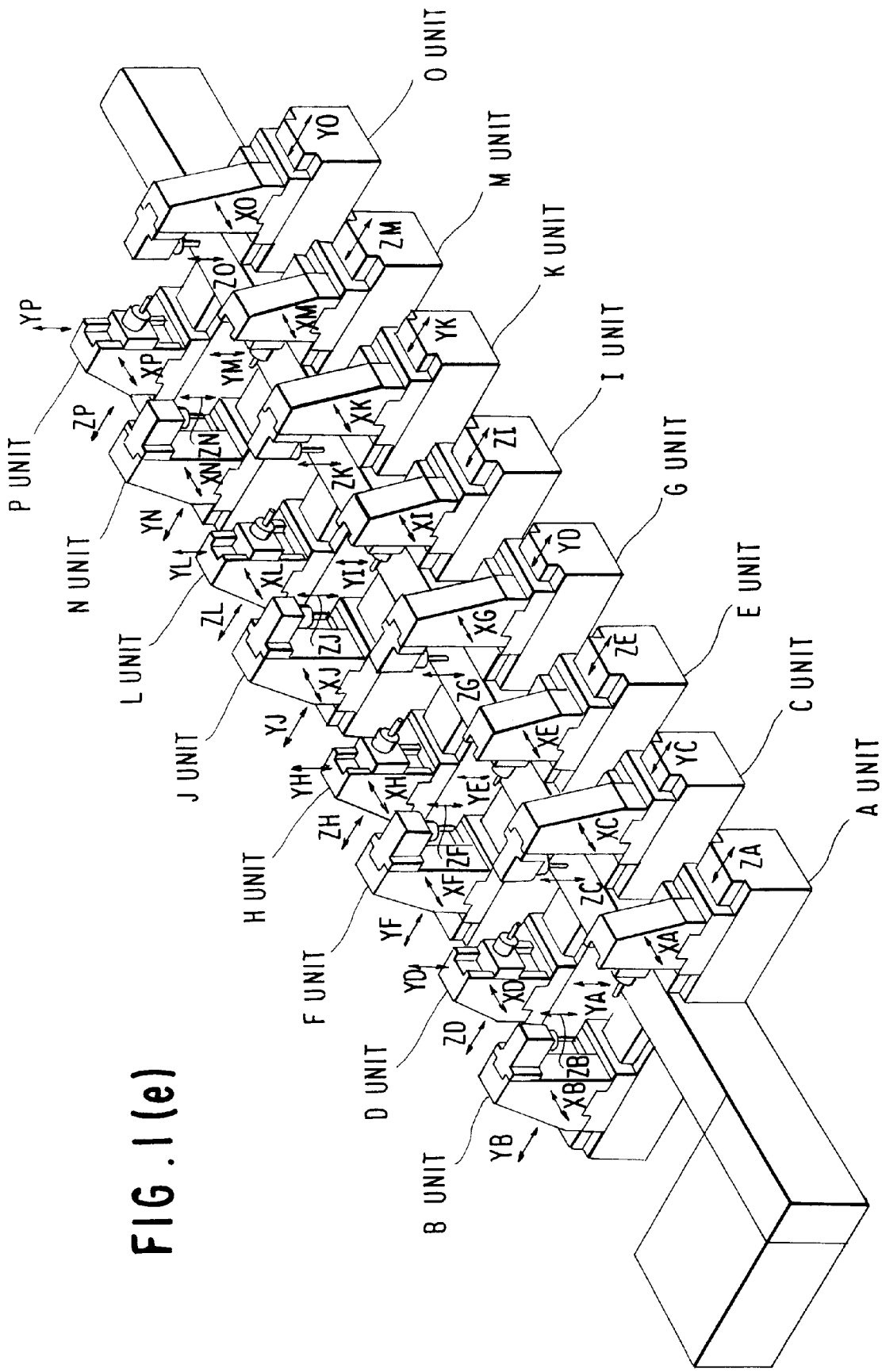
FIG. 1(e) is a diagram illustrating a transfer machine, which is one example of a multi-stage machine tool.

In an example involving a work transfer-type multistage machine (FIG. 1(e)) a similar system can be adopted.

Figure 1F:
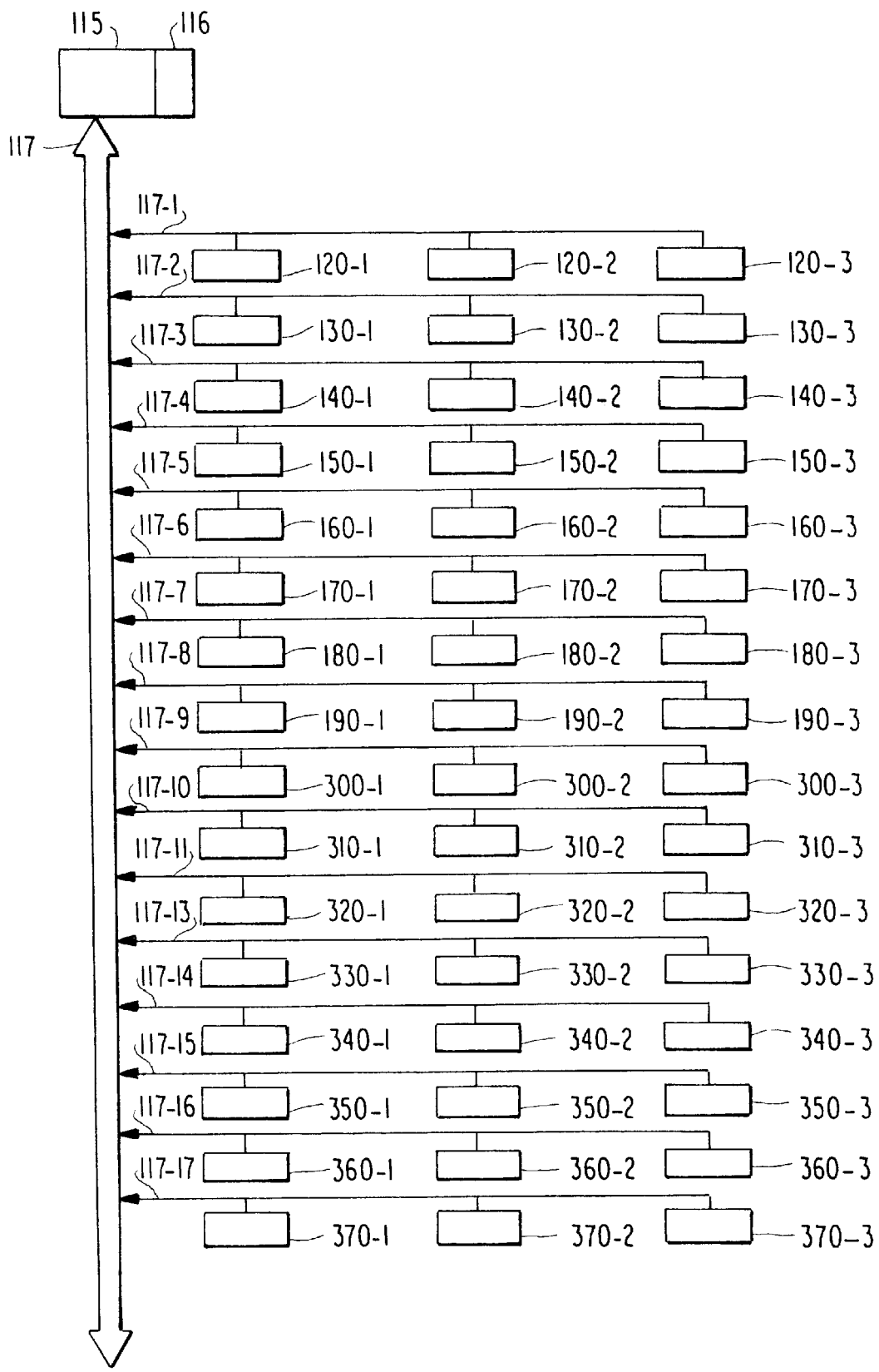
FIG. 1(f) is a diagram illustrating the system configuration of a numerically controlled multi-stage machine tool.

In these examples, processing programs with instructions classified by group in the same way as in the foregoing embodiment are read by an input device (116 in FIG. 1(f)) such as a paper tape reader, and are developed/rearranged into plural control programs and stored in the numerical controller (115 in FIG. 1(f)) in the same manner as in the foregoing embodiment. As a result, separate programs for Groups A to P are generated and retained in the control program area (115112 in FIG. 1(c)) of the numerical controller. These programs are subjected to arithmetic processing by the main control program 115113 (FIG. 1(c)) in the numerical controller to produce control outputs, and the data is stored in data memory area 115123 in FIG. 1(c) as partially shown in FIG. 2(d). The control outputs are supplied to a group of servo motors/detectors (120-1, 120-2, 120-3, 130-1, etc. in FIG. 1(f)) for the respective groups via a group of cables (117-1 through 117-17 in FIG. 1(f)).

Feedback signals generated by the detectors are input to the servo memory (11514, FIG. 1(c)) of the numerical controller via the mentioned cables, servo amplifiers 1156 (FIG. 1(c)) and servo interface 1155 and are used for feedback control output processing. With this arrangement, and with operations effected in the same way as in the complex machining center of the foregoing example, control of multiple-stage units becomes possible.

If, for instance, processing unit D (the unit having XD-, YD-, and ZD-axes) in FIG. 1(e) fails, its function and its operating program may be distributed to other processing units, for example, units H, L, and P (the units having XH- . . . , XL- . . . , and XP . . . -axes in FIG. 1(e)) having an identical function. In order to make this change, it is necessary only to divide up the Group B program and distribute it to Groups H, L, and P, with the group name of the Group B processing program portions changed from B to H, from B to L, and from B to P in correspondence with the group to which the various portions of the processing program are distributed. The input processing program can be developed/separated into control programs with all the processing content and data unchanged, so that processing can be easily effected by Groups H, L and P in replacement of the failed unit. For the sake of safety, when such a failure occurs, the parameter settings provided for Group B should be deleted, so that processing and control will be surely effected with the understanding that processing unit B is not present in the multi-stage machine tool. In the case of a failed unit, the program is expeditiously obtained by merely reading out the separated program for the failed unit, and "stripping off" the group subwords.

In the disclosed embodiment, letters of the alphabet have been used as subwords, but naturally it is also possible to use other codes, characters, numbers, letters, etc.

Further, although a description has been given of the control of a multiplicity of systems, primarily using group-designating subwords, if, as another embodiment, dimension words serving as subwords are added to the sequence number, preparatory function word, interpolation parameter, feed function words, spindle-speed word, tool function words, and miscellaneous function word, control becomes possible for each dimension word. In this case, the control functions of a one-system, multiple-axis control scheme can be expanded by a large measure from control for each system to control for each dimension, i.e., control in terms of the relevant control axis.

In addition, although in this embodiment a description has been made regarding a numerical controller per se, it is possible for the same functions to be carried out using an appropriately programmed computer, even a personal computer, to which a system is added to transfer data to appropriate machine controllers.

The highlights of the foregoing description can be summarized as follows:

There is provided a numerical controller or an appropriately programmed computer having associated therewith control units for a machine tool, a robot, a laser, a welding machine, a wood working machine, or the like, characterized in that a processing program for controlling a multiplicity of systems, each having a multiplicity of axes and a multiplicity of stages, is prepared by adding a subword to one or more of the sequence number of the numerical control input format, the preparatory function words, dimension words including interpolation parameters and angular dimensions, the feed function words, the spindle-speed function words, the tool function words, and the miscellaneous function words. The processing program including the subwords in accordance with the present invention is processed, i.e., developed and rearranged, into plural control programs classified according to the system to be controlled, and accordingly stored. Program processing is effected by software incorporated in the numerical controller or the appropriately programmed computer in accordance with the invention, the software having the functions of program development and rearrangement to prepare control programs as well as storage and control. Through the use of this system, the number of control axes and functions which can be instructed via direct control is greatly expanded, thereby permitting free control over the operation of the machine tool, robot, laser beam machine, welding machine, wood working machine, or the like having a multiplicity of systems each having multiple axes and multiple stages.

As the aforementioned subword, codes such as alphabetic, numerical and other characters may be used, and the codes can be used independently, or in a combination or mix. The dimension words, tool function words, and the spindle-speed function words may all use the subwords.

In additions the invention enjoys even greater control capabilities due to the following advantages:

(1) All input information (the processing program) including the subword designations may be read by one input device;

(2) Input information (the processing program) including the subword designations is subjected to software processing in such a manner as to permit the following simplifications in the input format:
* Preparatory function words which are common to the groups indicated in a given sequence instruction are represented by the preparatory function word without need of a subword;
* A format is provided which makes it possible to input information for different groups in the same sequence;
* Within the same sequence instruction, a feed function word value may be used commonly for dimensions in multiple groups;
* A feed function word combined with a dimension word in the same sequence is set as a common word and the subword may be omitted;
* Independent starting for each coordinate system/group in the same sequence is input by dividing each group to be started arbitrarily with a ",";
* The subword for the given unit is added to the sequence function words in the case of a multi-stage machine, and, at the time of changing over to another unit, the common sequence word N alone is used, and the subword of the unit is added in the new unit.
(3) A table of system control parameters is provided in a storage device, and the configuration and a control system for the machine tool and the like can be combined freely by, for instance, assuming a control axis outside a given group to be in that group;
(4) A means is provided for discriminating a preparatory function for common sequence processing and a preparatory function for group processing;
(5) A storage area is provided for recording and storing, for each of the subword groups, the results of development of the processing program into control programs;
(6) The control programs attach a label for discriminating between common or group sequence processing;
(7) The control programs attach a label to distinguish between simultaneous starting, synchronous starting, and arbitrary or independent starting; and
(8) It is possible to select between preprocessing and simultaneous processing methods in processing the input program to form the control programs.

It is of course possible to achieve the above advantages through the use of an appropriately programmed computer and associated control units, rather than by using a numerical controller per se.

Moreover, it is also possible to apply the present invention to the control of an apparatus other than a numerically controlled machine tool.

According to the invention, the system is provided with the following additional advantageous functions through the use of combinations of the subwords:
* A dimension word for a rectangular coordinate system or that for a plane coordinate system including a center of rotation may be added to an angular dimension word, so as to increase the kinds of angular dimension words and facilitate inputting of the processing program and clarify the program;
* A dimension word may be added to a preparatory function word so as to clarify that this preparatory function corresponds to a given control axis, thereby attaining fine control and independently controlled axes;
* A dimension word may be added to the feed function word to enable independent feed control in correspondence with the control axes;
* A dimension word defining a plane may be added to the tool function word so that the planar limitation and the types of tool can be clearly discriminated;
* A plane rotation dimension word may be added to the spindle-speed function word so as to enable a plane rotation control input;
* The tool function word may be added to the spindle-speed function word to enable the input of the speed of a rotary tool via main spindle control;
* A dimension word may be added to the miscellaneous function word to enable the input to discriminate each dimension; the tool function word may be added to the same so as to enable an input for each tool; and the spindle-speed function word may be added to the same so as to enable control of each main spindle and control over each rotation of coordinates.

As described above, in accordance with the present invention, a subword, a preparatory function for common sequence processing, and a preparatory function for group processing are added to the input format of a numerical controller, and software for developing, rearranging, and storing the processing program and for controlling a machine tool or the like is incorporated in a computer, inclusive of a numerical controller As a result, it becomes possible to remove the prior restriction on the number of control axes of the machine tool and expand the control functions for each dimension. Hence, in multiple-system control, it is possible to avoid restrictions on the number of axes which can be directly controlled without a separately provided additional controller, thereby expanding the degree of freedom in controlling the machine tool or the like.

What is claimed is:

1. A numerically controlled system including one or more multiple axis, multiple function controlled machines, of the type wherein control is exercised through the use of a processing program directly executable by said one or more machines, the program being made up of a plurality of control words for respectively controlling functions of said one or more machines, said numerically controlled system further comprising:

means for defining an expanded set of control words by adding one or more subwords to said control words, at least a portion of said subwords being specific to at least one of a control group within which said control words will be effective for an axis or plane in which said control word will operate;

wherein said control group consists of one or more of said machines; and means for interpreting said expanded control words and for expanding said processing program, which is directly executable by said one or more machines and contains said expanded control words, into a plurality of control programs, at least a portion of which are specific to respective ones of said control groups;

whereby each axis of each of said one or more machines, and each function to be performed by each of said one or more machines, may be uniquely specified through the use of one or more of said control words in combination with one or more of said subwords.

2. A numerically controlled system including one or more multiple axis, multiple function controlled machines, of the type wherein control is exercised through the use of a processing program directly executable by said one or more machines, the program being made up of a plurality of control words for respectively controlling functions of said one or more machines, said numerically controlled system further comprising:

means for defining an expanded set of control words by adding one or more subwords to said control words, at least a portion of said subwords being specific to at least one of a control group within which said control words will be effective for an axis or plane in which said control word will operate;

wherein said control group consists of one or more of said machines; and means for interpreting said expanded control words and for expanding said processing program, which is directly executable by said one or more machines and contains said expanded control words, into a plurality of control programs, at least a portion of which are specific to respective ones of said control groups; said means for interpreting further including means for recognizing generically used control words or expanded control words, and applying said generically used words to at least each control group in which said word is a valid command;

whereby each axis of each of said one or more machines, and each function to be performed by each of said one or more machines, may be uniquely specified through the use of one or more of said control words in combination with one or more of said subwords.

3. A numerically controlled system including one or more multiple axis, multiple function controlled machines, of the type wherein control is exercised through the use of a processing program directly executable by said one or more machines, the program being made up of a plurality of control words for respectively controlling functions of said one or more machines, the control words being arranged within sequences, said numerically controlled system further comprising:

means for defining an expanded set of control words by adding one or more subwords to said control words, at least a portion of said subwords being specific to at least one of a control group within which said control words will be effective for an axis or plane in which said control word will operate;

wherein said control group consists of one or more of said machines; and means for interpreting said expanded control words and for expanding said processing program, which is directly executable by said one or more machines and contains said expanded control words, into a plurality of control programs, at least a portion of which are specific to respective ones of said control groups, wherein respective control words within the same sequence may be directed to more than one control group;

whereby each axis of each of said one or more machines, and each function to be performed by each of said one or more machines, may be uniquely specified through the use of one or more of said control words in combination with one or more of said subwords.

4. A numerically controlled system including one or more multiple axis, multiple function controlled machines, of the type wherein control is exercised through the use of a processing program directly executable by said one or more machines, the program being made up of a plurality of control words for respectively controlling functions of said one or more machines, said numerically controlled system further comprising:

means for defining an expanded set of control words by adding one or more dimension words to said control words, at least a portion of said dimension words being specific to at least one of a dimension within which said control words will be effective; and means for interpreting said expanded control words and for expanding said processing program, which is directly executable by said one or more machines and contains said expanded control words, into a plurality of control programs, at least a portion of which are specific to respective ones of said dimensions; said means for interpreting further including means for recognizing generically used control words or expanded control words, and for applying said generically used words to at least each dimension in which said words is a valid command;

wherein said dimension designates one or more of a plurality of axes;

whereby each axis of each of said one or more machines, and each function to be performed by each of said one or more machines, may be uniquely specified through the use of one or more of said control words in combination with one or more of said dimension words.

5. A numerically controlled system including one or more multiple axis, multiple function controlled machines, of the type wherein control is exercised through the use of a processing program directly executable by said one or more machines, the program being made up of a plurality of control words for respectively controlling functions of said one or more machines, the control words being arranged within sequences, said numerically controlled system further comprising:

means for defining an expanded set of control words by adding one or more subwords to said control words, at least a portion of said subwords being specific to at least one of a control group within which said control words will be effective or an axis or plane in which said control word will operate;

wherein said control group consists of one or more of said machines; and means for interpreting said expanded control words and for expanding said processing program, which is directly executable by said one or more machines and contains said expanded control words, into a plurality of control programs, at least a portion of which are specific to respective ones of said control groups, wherein respective control words within the same sequence may be directed to more than one control group, said interpreting means including at least one parameter table which specifies valid control words and expanded control words within said controlled system, and includes information by which said control words may be expanded to form expanded control words specific to at least one of said control groups;

whereby each axis of each of said one or more machines, and each function to be performed by each of said one or more machines, may be uniquely specified through the use of one or more of said control words in combination with one or more of said subwords.

* * * * *

UNITED STATES PATENT AND TRADEMARK OFFICE
CERTIFICATE OF CORRECTION

PATENT NO. : 5,914,876
DATED : June 22, 1999
INVENTOR(S) : Hayao Hirai

It is certified that error appears in the above-identified patent and that said Letters Patent is hereby corrected as shown below:

Title page, item [56] insert the following:

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | EP | 0 | 3 | 2 | 7 | 2 | 8 | 5 | 08/09/89 | Europe | | | | |

Signed and Sealed this

Twenty-first Day of September, 1999

Attest:

Q. TODD DICKINSON

Attesting Officer

Acting Commissioner of Patents and Trademarks